US012508255B2

(12) United States Patent
Robker et al.

(10) Patent No.: US 12,508,255 B2
(45) Date of Patent: Dec. 30, 2025

(54) METHODS AND PRODUCTS FOR IMPROVING SPERM QUALITY

(71) Applicant: THE UNIVERSITY OF ADELAIDE, South Australia (AU)

(72) Inventors: Rebecca Louise Robker, South Australia (AU); Macarena Bermudez Gonzalez, South Australia (AU)

(73) Assignee: The University of Adelaide, South Australia (AU)

( * ) Notice: Subject to any disclaimer, the term of this patent is extended or adjusted under 35 U.S.C. 154(b) by 0 days.

(21) Appl. No.: 18/949,880

(22) Filed: Nov. 15, 2024

(65) Prior Publication Data

US 2025/0073221 A1 Mar. 6, 2025

Related U.S. Application Data

(63) Continuation of application No. 16/649,222, filed as application No. PCT/AU2018/051040 on Sep. 21, 2018, now abandoned.

(30) Foreign Application Priority Data

Sep. 22, 2017 (AU) .................. 2017903857

(51) Int. Cl.
*A61K 31/4545* (2006.01)
*A01N 1/126* (2025.01)
*C12N 5/076* (2010.01)

(52) U.S. Cl.
CPC .......... *A61K 31/4545* (2013.01); *A01N 1/126* (2025.01); *C12N 5/061* (2013.01); *C12N 2501/724* (2013.01)

(58) Field of Classification Search
CPC .... A61K 31/4545; A01N 1/126; C12N 5/061; C12N 2501/724
See application file for complete search history.

(56) References Cited

U.S. PATENT DOCUMENTS

2019/0201389 A1 7/2019 Jensen et al.

FOREIGN PATENT DOCUMENTS

| EP | 1468690 A1 | 10/2004 |
|---|---|---|
| HU | 207988 B | 7/1993 |
| WO | WO1999055354 A1 | 11/1999 |
| WO | WO2001079174 A1 | 10/2001 |
| WO | WO20131052995 A1 | 4/2013 |

OTHER PUBLICATIONS

Varghese et al. "Loss of heat shock protein 70 from apical region of buffalo (*Bubalus bubalis*) sperm head after freezing and thawing," Theriogenology 85 (2016) 828-834 (Year: 2016).*

Banoth, et al., "New chemo-enzymatic synthesis of {R)-1-chloro-3-{piperidin-1-yl) propan-2-ol," Tetrahedron: Asymmetry, vol. 23, 2012, pp. 1564-1570.
Budzynski, et al. "Chaperone co-inducer BGP-15 inhibits histone deacetylases and enhances the heat shock response through increased chromatin accessibility", Cell Stress & Chaperones, Published May 4, 2017, vol. 22, pp. 717-728.
Celik-Ozenci, et al., "Role of poly(ADP-ribose) polymerases in male reproduction", Spermatogenesis, vol. 3, Issue 2, Artilce e24194, Published 2013.
Erata, et al. "The role of heat shock protein 70 (Hsp 70) in male infertility: is it a line of defense against sperm DNA fragmentation? ," Fertility and Sterility, vol. 90, Issue 2, Published Aug. 2008, pp. 322-327.
Hong, et al., "The inhibitory action of procaine, (+)-propranolol and (+/-)-propranolol on human sperm motility: 1: tntagonism by caffeine," British Journal of Clinical Pharmacology, 1981, vol. 12, No. 5, pp. 751-753.
Katib, "Mechanisms linking obesity to male infertility," Cent European J Ural., vol. 68, No. 1, 2015, pp. 79-85.
Lucio, et al., "Oxidative stress at different stages of two-step semen cryopreservation procedures in dogs", Theriogenology, vol. 85, Issue 9, Published Jun. 2016, pp. 1568-1575.
Office Action for U.S. Appl. No. 16/649,222, Dated Jan. 26, 2024, 19 pages.
Office Action for U.S. Appl. No. 16/649,222, Dated Dec. 13, 2021, 19 pages.
Office Action for U.S. Appl. No. 16/649,222, Dated Dec. 9, 2022, 17 pages.
Office Action for U.S. Appl. No. 16/649,222, Dated Jun. 27, 2023, 19 pages.
Office Action for U.S. Appl. No. 16/649,222, Dated Jul. 28, 2022, 21 pages.
Parab, et al., "HDAC6 deacetylates alpha tubulin in sperm and modulates sperm motility in Holtzman rat", Cell & Tissue Research, vol. 359, Published Nov. 20, 2014, pp. 665-678.
Rickard, et al., "The identification of proteomic markers of sperm freezing resilience in ram seminal plasma", Journal of Proteomics, vol. 126, Published Aug. 3, 2015, pp. 303-311.
Robker et al., "Improving gamete quality to increase IVF outcomes," The University of Adelaide, 2018, https:11www.canberra-ip.com/technology/27777, 2 pages.
Sapra, et al., "The samll-molecule BGP-15 protects against heart failure and atrial fibrillation in mice," Nature Communications, Dec. 9, 2014, pp. 1-16.
Spinaci et al. Immunolocalization of heat shock protein 70 (Hsp 70) in boar spermatozoa and its role during fertilization, Molecular Reproduction & Development, Published Sep. 2, 2005, vol. 72, pp. 534-541.
International Search Report, dated Nov. 28, 2018, from corresponding PCT application No. PCT/AU2018/051040.

(Continued)

*Primary Examiner* — Adam C Milligan
*Assistant Examiner* — William Y Lee
(74) *Attorney, Agent, or Firm* — C. Rachal Winger; Lee & Hayes PC

(57) ABSTRACT

Disclosed are methods and products for improving the quality of sperm, methods for treating subjects to improve sperm quality or improve fertility, and use of sperm with improved quality in assisted reproductive technologies, including exposing the sperm to BGP-15 and/or a derivative thereof, such as BGP-15, propanolol, bimoclomol, arimoclomal, NG94, iroxanadine, and/or a pharmaceutically acceptable derivative, prodrug, solvate, salt, tautomer, stereoisomer, and/or racemate thereof.

13 Claims, 29 Drawing Sheets

(56) References Cited

OTHER PUBLICATIONS

Stanger, "The Effect of Catecholamines and Their Antagonists on the Fertilization of Cumulus-Free Mouse Pva In Vitro at a Suboptimal Spermatozoa! Density," Gamete Research 7:111-122 (1983).
Sumegi, et al., "BGP-15 Protects against Oxidative Stress-or Lipopolysaccharide-induced Mitochondrial bestablilization and Reduces Mitochondrial Production of Reactive Oxygen Species," PLOS One, Jan. 3, 2017, pp. 1-19.

Szabados, et al., "BGP-15, a nicotinic amidoxime derivate protecting heart from ischemia reperfusion injury through modulation of poly(ADP-ribose) polymerase," Biochemical Pharmacology, vol. 59, No. 8, Apr. 15, 2000, pp. 937-945.
Wu, et al., "Mitochondrial dysfunction in oocytes of obese mothers: transmission to offspring and reversal by pharmacological endoplasmic reticulum stress inhibitors," The Company of Biologists Ltd, 2015, pp. 681-691.
Zhang, et al., "Association of heat shock protein 70 with motility of frozen-thawed sperm in bulls," Czech Journal of r Animal Science, 2015, vol. 60, No. 6, pp. 256-262.

* cited by examiner

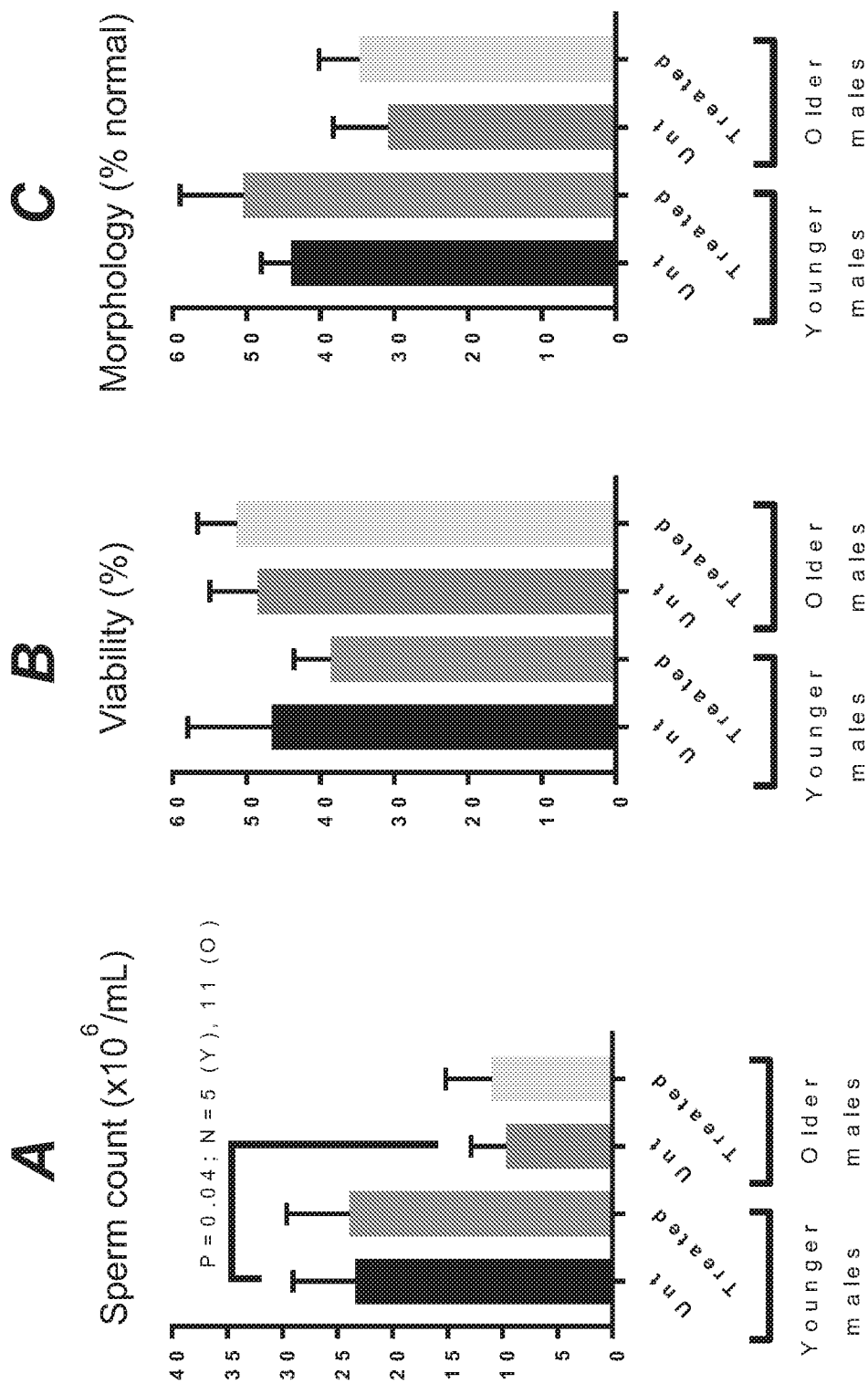

A  2-cell (%)

B  Blastocysts from 2-cell (%)

METHODS AND PRODUCTS FOR IMPROVING SPERM QUALITY

PRIORITY CLAIM

This application is a continuation of U.S. application Ser. No. 16/649,222 filed on Mar. 30, 2022 which is a National Phase Application based on PCT/AU1851040 filed on Sep. 21, 2018 which claims priority to Australian Provisional Patent Application 2017903857 filed on 22 Sep. 2017, the entire contents of each of which are incorporated by reference herein.

FIELD

The present disclosure relates to methods and products for improving the quality of sperm, methods for treating subjects to improve sperm quality or improve fertility, and use of sperm with improved quality in assisted reproductive technologies.

BACKGROUND

Despite numerous advances in reproductive medicine, a significant proportion of couples are unable to conceive due to reduced male fertility. Although there are numerous causes for reduced male fertility, in some cases the sperm have reduced sperm quality. Many of the reasons for a reduction in the quality of sperm are still unknown.

For example, various studies have indicated that sperm function reduces as a function of increasing age. Given that there is a trend of increasing paternal age, clearly age related reductions in sperm quality are of concern.

In addition, the rate of male obesity in reproductive-age men has increased significantly over the last few decades and coincides with an increase in male infertility worldwide. There is emerging evidence that being overweight or obese impacts negatively on male reproductive potential, including by reducing sperm quality. Recent studies indicate that the reduction in sperm quality is not simply due to the amount of sperm produced or a reduction in motility.

Previous studies have also indicated that men who smoke are less fertile. Whilst studies have reported that cigarette smoke may negatively affect sperm parameters, seminal plasma, and various other fertility factors, the actual effect of smoking on male fertility remains unclear.

The pharmacological interventions available to improve sperm quality are limited. Some supplements are available to assist with improving male fertility, which often rely on vitamins and antioxidants to improve pregnancy rates. Assisted reproductive techniques have also allowed intervention to treat poor fertility, and in some cases can be used to assist with achieving pregnancy where one of the reasons for sub-fertility is due to reduced sperm quality. However, despite the numerous advances made in the field of assisted reproduction, the rate of success of assisted reproductive techniques still remains generally low. The lower rates of success of assisted reproductive techniques such as in vitro fertilization (IVF), intracytoplasmic sperm injection (ICSI) and (IUI) may in part be due to use of sperm of reduced quality.

Assisted reproductive technologies are also used extensively in animals, particularly for animals of high genetic merit. Improving sperm quality may have advantages in improving rates of reproduction in animals and/or the quality of the animals produced, which provides economic advantages.

In wildlife species, assisted reproductive technologies are urgently needed to improve the fertility of captive and/or endangered species in order to maintain biodiversity.

Accordingly, for a variety of reasons there is a need for new methods and products to improve sperm quality.

SUMMARY

The present disclosure relates to methods and products for improving the quality of sperm, methods for treating subjects to improve sperm quality or treat reduced fertility, and use of sperm with improved quality in assisted reproductive technologies.

Certain embodiments of the present disclosure provide a method of improving quality of sperm, the method comprising exposing the sperm to BGP-15 and/or a derivative thereof and thereby improving the quality of the sperm.

Certain embodiments of the present disclosure provide isolated sperm produced by exposing the sperm to BGP-15 and/or a derivative thereof as described herein.

Certain embodiments of the present disclosure provide a method of treating a subject to improve sperm quality, the method comprising administering to the subject an effective amount of BGP-15 and/or a derivative thereof and thereby improving sperm quality in the subject.

Certain embodiments of the present disclosure provide a method of treating reduced sperm quality in a subject, the method comprising administering to the subject an effective amount of BGP-15 and/or a derivative thereof and thereby treating the subject.

Certain embodiments of the present disclosure provide use of BGP-15 and/or a derivative thereof in a composition for improving sperm quality.

Certain embodiments of the present disclosure provide a pharmaceutical composition for improving sperm quality, the composition comprising an effective amount of BGP-15 and/or a derivative thereof.

Certain embodiments of the present disclosure provide a method of treating a subject to improve sperm quality, the method comprising administering to the subject a pharmaceutical composition as described herein.

Certain embodiments of the present disclosure provide a method of improving developmental competence of an embryo produced by a sperm fertilizing an oocyte, the method comprising exposing the sperm to BGP-15 and/or a derivative thereof and thereby improving the developmental competence of the embryo.

Certain embodiments of the present disclosure provide a method of assisted reproduction using sperm, the method comprising exposing the sperm to BGP-15 and/or a derivative thereof and using the sperm exposed to the BGP-15 and/or a derivative thereof in the method of assisted reproduction.

Certain embodiments of the present disclosure provide an animal produced using an assisted reproductive method as described herein.

Certain embodiments of the present disclosure provide an in vitro fertilization method, the method comprising:
  exposing sperm in vitro to BGP-15 and/or a derivative thereof; and
  fertilizing an oocyte with the sperm exposed to the BGP-15 and/or a derivative thereof.

Certain embodiments of the present disclosure provide a kit or product for improving quality of sperm, the kit or product comprising BGP-15 and/or a derivative thereof for exposure to the sperm.

Certain embodiments of the present disclosure provide a kit or product for use in an assisted reproductive technology, the kit or product comprising BGP-15 and/or a derivative thereof for exposure to sperm.

Certain embodiments of the present disclosure provide an in vitro fertilization medium for fertilizing an oocyte with a sperm, the medium comprising BGP-15 and/or a derivative thereof.

Certain embodiments of the present disclosure provide an in vitro fertilization medium for sperm, the medium comprising BGP-15 and/or a derivative thereof.

Certain embodiments of the present disclosure provide a sperm preparation medium, the medium comprising BGP-15 and/or a derivative thereof.

Certain embodiments of the present disclosure provide a method of freezing sperm, the method comprising exposing the sperm to BGP-15 and/or a derivative thereof at one or more of before, during and/or after freezing of the sperm.

Certain embodiments of the present disclosure provide a sperm freezing medium, the medium comprising BGP-15 and/or a derivative thereof.

Certain embodiments of the present disclosure provide a method of screening for an agent to improve sperm quality, the method comprising determining the ability of a derivative of BGP-15 to improve quality of sperm and identifying the derivative as an agent to improve sperm quality.

Other certain embodiments are disclosed herein.

BRIEF DESCRIPTION OF THE FIGURES

Certain embodiments are illustrated by the following figures. It is to be understood that the following description is for the purpose of describing particular embodiments only and is not intended to be limiting with respect to the description.

DETAILED DESCRIPTION

Figure 1:
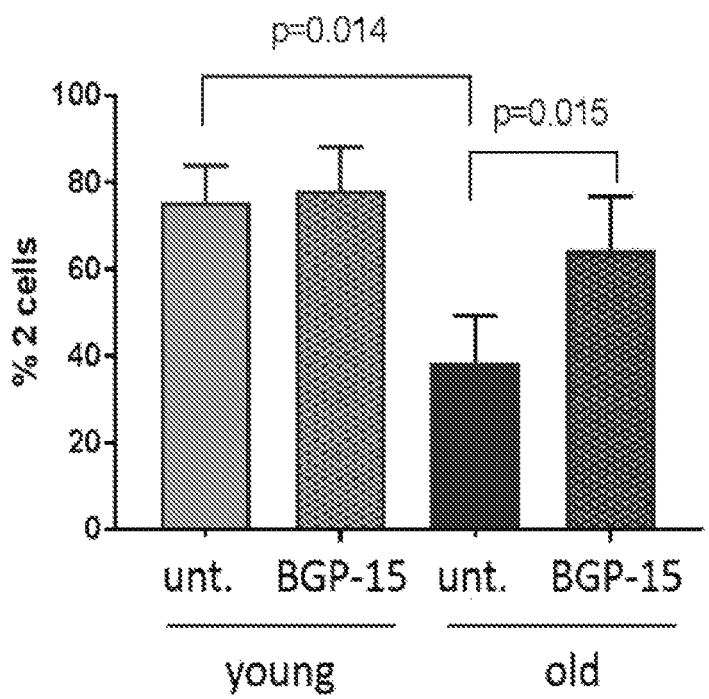
FIG. 1 effects of in vitro treatment with BGP-15 on restoring sperm function. Sperm was collected from epididymis and vas deferens of male mice that were 'young' (~6 weeks old) or 'old' (~1 year old) and was allowed to undergo capacitation (maturation) for one hour in vitro in control media (untreated) or media containing 10 uM BGP-15. Subsequently sperm was used for in vitro fertilization of oocytes from young female mice and development of putative zygotes was assessed. A) Percentage of putative zygotes that had completed cleavage 24 h post-IVF. B) Percentage of 2 cell embryos that completed blastocyst development by day 5. C) Percentage of blastocysts that had initiated hatching. Each developmental milestone was impaired in embryos that were conceived using sperm from old mice however each developmental parameter was improved by the 1 h treatment of 'old' sperm in vitro with BGP-15. N=6-12 mice per treatment group. Analysis was paired t-test comparing untreated and BGP-15-treatment within each age group and unpaired t-test comparing young and old.
Figure 1:
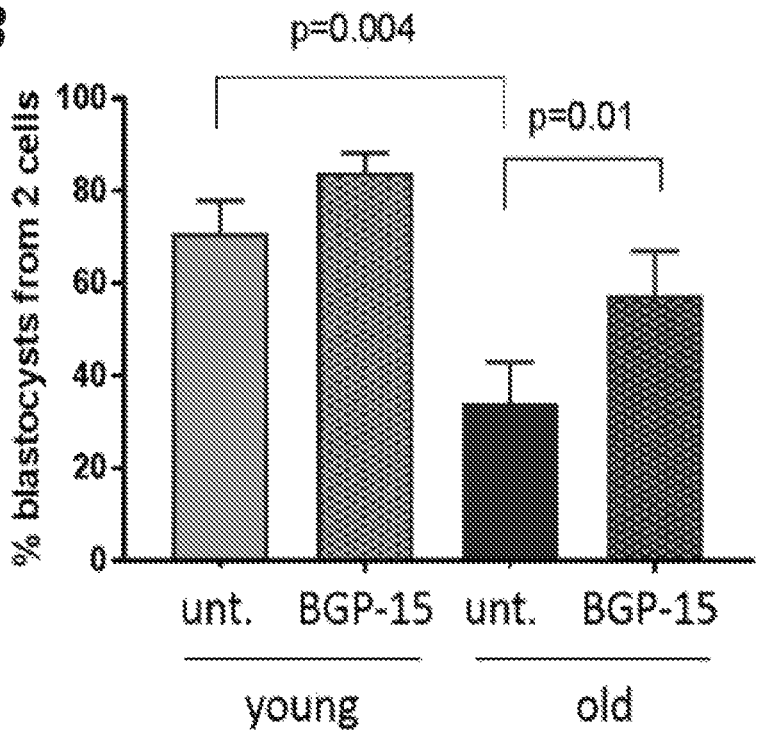
Figure 1:
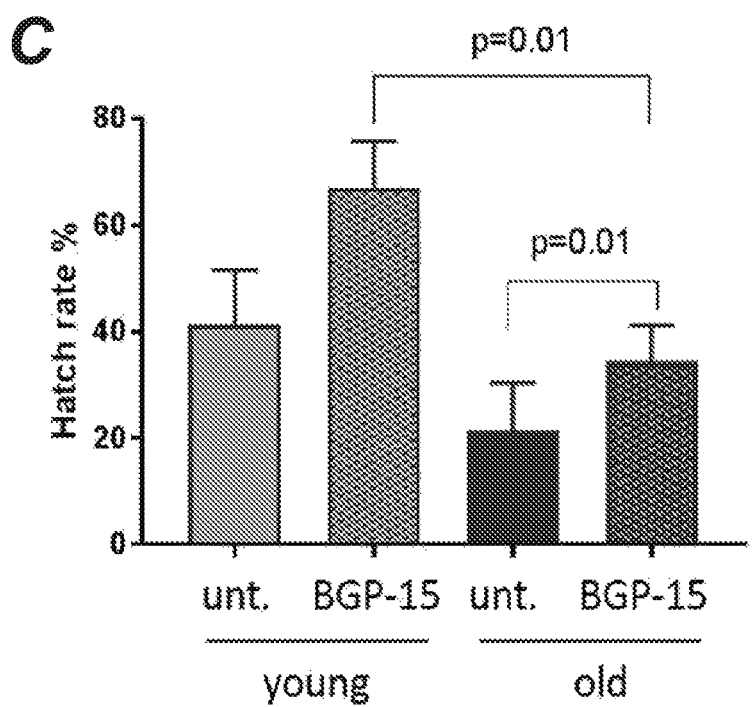

The present disclosure relates to methods and products for improving the quality of sperm, methods for treating subjects to improve sperm quality, and use of sperm with improved quality in assisted reproductive technologies.

The present disclosure is based, at least in part, upon the recognition that BGP-15, and/or a derivative thereof, improves sperm quality in vitro and in vivo, and in particular has the result of improving developmental capacity of embryos produced from sperm treated with BGP-15, particularly for sperm from aged subjects.

Certain embodiments of the present disclosure provide a method of improving quality of sperm.

Certain embodiments of the present disclosure provide a method of improving quality of sperm, the method comprising exposing the sperm to BGP-15 and/or a derivative thereof and thereby improving the quality of the sperm.

The term "sperm" as used herein refers to the male reproductive cell or a spermatozoon, and includes one or more spermatozoa.

In certain embodiments, the BGP-15 and/or a derivative thereof comprises BGP-15 (O-[3-piperidino-2-hydroxy-1-propyl]-nicotinic amidoxime):

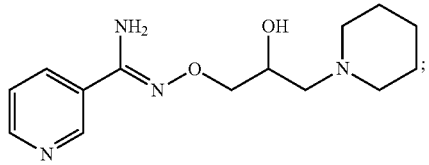 [SMILES: N/C(=N\OCC(O)CN1CCCCC1)c1cccnc1]

and/or an acceptable derivative, prodrug, solvate, salt, tautomer, stereoisomer, and/or racemate thereof.

BGP-15 is commercially available (typically as a suitable salt) or can be synthesized by a method known in the art. Examples of commercial sources of BGP-15 include Sigma-Aldrich (Product #B4813 SIGMA) and Cayman Chemicals (Product #17503).

In certain embodiments, the derivative of BGP-15 comprises propanolol, bimoclomol, arimoclomal, NG-94, iroxanadine, and/or a pharmaceutically acceptable derivative, prodrug, solvate, salt, tautomer, stereoisomer, and/or racemate of any of the aforementioned. The chemical structures of propanolol, bimoclomol, arimoclomal, NG-94, iroxanadine are as follows:

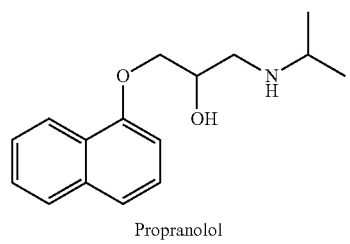

Propranolol

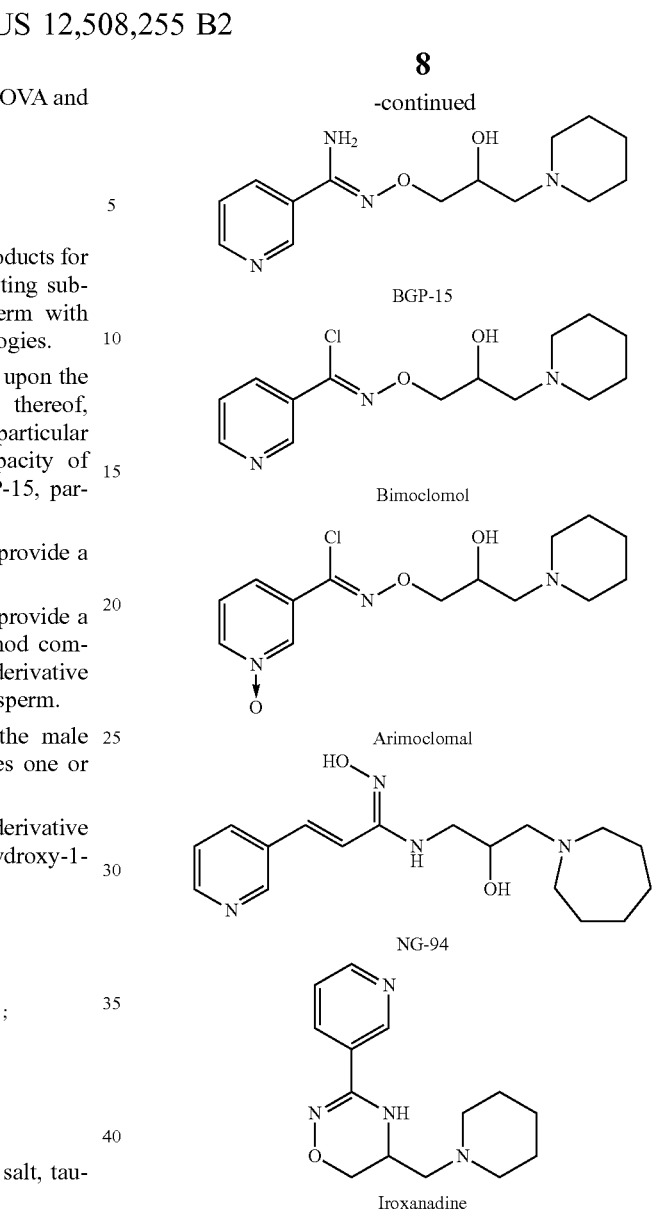

The above compounds may be synthesized by a method known in the art or are commercially available.

Propranolol (CAS #318-98-9) may be synthesized by a method known in the art or obtained commercially from LGM Pharma (USA). Bimoclomol ((3Z)-N-(2-hydroxy-3-piperidin-1-ylpropoxy)pyridine-3-carboximidoyl chloride) may be synthesized by a method known in the art, for example as described in Hungarian Patent No. 207,988 (1988). Arimoclomol (3-[chloro({[(2R)-2-hydroxy-3-(piperidin-1-yl)propoxy]imino})methyl]pyridin-1-ium-1-olate) may be synthesized by a method known in the art, for example as described in international patent application WO0179174 or in *Tetrahedron: Asymmetr.* 2012, 23: 1564-1570. NG-094 may be synthesized by a method known in the art. Iroxanaadine may be synthesized by a method known in the art and is commercially available from 360 Reagent.

In certain embodiments, the quality of the sperm comprises fertilization capacity. In certain embodiments, the fertilization capacity comprises ability to fertilize an oocyte, ability to produce a zygote, and/or developmental competence of an embryo produced from the sperm.

In certain embodiments, the quality of the sperm comprises one or more of the ability to produce a zygote that has completed cleavage fertilization within the optimal timeframe ('on-time') for that species, the ability of a two cell embryo to complete blastocyst development within the optimal timeframe ('on-time') for that species, and/or the ability of a blastocyst to initiate hatching.

In certain embodiments, the quality of the sperm comprises DNA integrity. Examples of measures of DNA integrity include damage to DNA, fragmentation of DNA, breaks in DNA and DNA conformation. Assays are known in the art for assessing DNA integrity, and include for example assays where DNA fragmentation is measured directly by incorporating probes at the site of damage to detect actual DNA strand breaks, such as Terminal deoxynucleotidyl transferase mediated dUTP nick end labeling assay (TUNEL) and in situ nick translation (ISNT), and assays which utilize the property of fragmented DNA to more easily denature under certain conditions. Sperm chromatin dispersion (SCD), single cell gel electrophoresis (SCGE) or comet assay, sperm chromatin structure assay (SCSA), acridine orange staining are examples where sperm DNA may be subjected to denaturation treatment and then the DNA damage is quantified.

In certain embodiments, the quality of the sperm is the ability to freeze/cryopreserve the sperm.

In certain embodiments, the sperm is from a donor suffering from, or susceptible to, a condition that is associated with reduced fertility and/or reduced sperm quality.

In certain embodiments, the sperm is from an aged donor. In certain embodiments, the sperm is from an older donor. In certain embodiments, the sperm is from a donor suffering from, or susceptible to, a condition of ageing that is associated with reduced fertility. In certain embodiments, the sperm is from an obese or an overweight donor.

In certain embodiments, the sperm is from a donor with an age of greater than 40 years. In certain embodiments, the sperm is from a donor with an age of greater than 45 years.

In certain embodiments, the sperm is from a donor who smokes or has smoked. In certain embodiments, the sperm is from a donor suffering from, or susceptible to, a condition or state associated with reduced fertility associated with smoking.

In certain embodiments, the sperm is used in an assisted reproductive method or technology.

Examples of assisted reproductive technologies include artificial insemination (also known as intra-uterine insemination), in vitro fertilization (IVF), gamete intrafallopian transfer (GIFT), placement of oocytes and sperm into the fallopian tube), zygote intrafallopian transfer (ZIFT), tubal embryo transfer (TET), peritoneal oocyte and sperm transfer (POST), intracytoplasmic sperm injection (ICSI), testicular sperm extraction (TESE), and microsurgical epididymal sperm aspiration (MESA).

Assisted reproductive technologies are known in the art, for example as described in Textbook of Assisted Reproduction: Laboratory and Clinical Perspectives (2003) Editors Gardner, D. K., Weissman, A., Howies, C M., Shoham, Z. Martin Dunits Ltd, London, UK; and Gordon, I. (2003) Laboratory Production of Cattle Embryos 2nd Edition CABI Publishing, Oxon, UK.

In certain embodiments, the method is used to produce sperm for use in in vitro fertilization (IVF), intracytoplasmic sperm injection (ICSI) or intra-uterine insemination (IUI).

Methods for performing assisted reproduction technologies in both humans and animals are known in the art.

The term "exposing" and variants thereof such as "expose" or "exposure" as used herein also includes exposing in vitro, exposing ex vivo, or exposing in vivo. Examples of exposing include exposing to an agent in a liquid medium, exposing to a pre-agent that is altered or metabolized to an active agent, or exposing to one agent that induces the expression of the target agent.

In certain embodiments, the method is used to expose the sperm in vitro to BGP-15 and/or a derivative thereof to improve the quality.

In certain embodiments, the sperm is in vitro.

In certain embodiments, the sperm is present in seminal fluid, or a diluted form thereof.

In certain embodiments, the sperm is in a suitable medium. In certain embodiments, the sperm is diluted in a suitable medium.

In certain embodiments, the sperm is enriched for a particular characteristic, such as motility, viability, vitality, capacitation, increased or higher DNA integrity, or reduced or lower DNA quality.

In certain embodiments, the sperm is sorted, for example by density gradient centrifugation, by a swim-up technique, or by flow cytometry. Methods for sorting sperm are known in the art.

In certain embodiments, the sperm is present in a sperm preparation medium. Sperm preparation media are known in the art and commercially available. In certain embodiments, the sperm is present in a sperm washing medium.

In certain embodiments, the sperm is exposed to the BGP-15 and/or a derivative thereof prior to, during and/or after capacitation. In certain embodiments, the sperm is exposed to the BGP-15 and/or a derivative thereof prior to, during and/or after maturation.

In certain embodiments, the sperm is present in an in vitro fertilization (IVF) medium. IVF media are known in the art and commercially available.

In certain embodiments, the sperm is present in a freezing or cryopreservation medium. Freezing/cryopreservation medium are known in the art and commercially available.

In certain embodiments, the method comprises exposing the sperm to the BGP-15 and/or a derivative thereof at a concentration in the range of 1 µm to 100 µM, 2 µm to 100 µM, 5 µm to 100 µM, 10 µm to 100 µM, 20 µm to 100 µM, 50 µm to 100 µM, 1 µm to 50 µM, 2 µm to 100 µM, 5 µm to 50 µM, 10 µm to 50 µM, 20 µm to 50 µM, 1 µm to 20 µM, 2 µm to 20 µM, 5 µm to 20 µM, 5 µm to 10 µM, 1 µm to 5 µM, 2 µm to 5 µM, or 1 µm to 2 µM. Other ranges are contemplated.

In certain embodiments, the method comprises exposing the sperm to a medium comprising the BGP-15 and/or a derivative thereof. In certain embodiments, the method comprises exposing the sperm to a medium comprising a concentration of BGP-15 and/or a derivative thereof in the range of 1 µm to 100 µM, 2 µm to 100 µM, 5 µm to 100 µM, 10 µm to 100 µM, 20 µm to 100 µM, 50 µm to 100 µM, 1 µm to 50 µM, 2 µm to 100 µM, 5 µm to 50 µM, 10 µm to 50 µM, 20 µm to 50 µM, 1 µm to 20 µM, 2 µm to 20 µM, 5 µm to 20 µM, 5 µm to 10 µM, 1 µm to 5 µM, 2 µm to 5 µM, or 1 µm to 2 µM. Other ranges are contemplated.

In certain embodiments, the sperm is exposed to the BGP-15 and/or a derivative thereof for 24 hours or less, 18 hours or less, 12 hours or less, 6 hours or less, 5 hours or less, 4 hours of less, 3 hours or less, 2 hours of less, or 1 hour or less.

Methods for assessing sperm quality are known in the art.

In certain embodiments, the assessment of sperm quality comprises assessing fertilization capacity of the sperm. In certain embodiments, the assessment of sperm quality comprises assessing the ability of the sperm to fertilize an oocyte, and/or the developmental competence of an embryo produced from the sperm fertilizing an oocyte. In certain embodiments, the assessment of sperm quality comprises assessing the ability of the sperm to produce a zygote that has completed cleavage 'on-time', the ability of the sperm to produce a two cell embryo which completes blastocyst development 'on-time', and the ability of the sperm to produce blastocyst which initiates hatching.

In certain embodiments, the assessment of sperm quality comprises assessing DNA integrity or DNA quality.

In certain embodiments, the assessment of sperm quality comprises assessing one or more characteristics of an embryo produced from the sperm, such as embryo health, ability to develop and/or postnatal fitness. Methods for assessing such characteristics are known in the art.

In certain embodiments, the method comprises improving the quality of the sperm by at least 10%, at least 20%, at least 30%, at least 40%, at least 50%, at least 60%, or at least 70%.

In certain embodiments, the method is used to expose the sperm in a subject to BGP-15 and/or a derivative thereof to improve the quality. In certain embodiments, the sperm is in vivo in a subject. Methods for exposing a subject to BGP-15 and/or a derivative thereof are described herein.

In certain embodiments, the subject has sperm with a reduced fertilization capacity. In certain embodiments, the subject is suffering from, or susceptible to reduced fertility. In certain embodiments, the subject is suffering from, or susceptible to, a disease, condition or state associated with reduced fertility. In certain embodiments, the subject has sperm with reduced DNA integrity or DNA quality.

In certain embodiments, the subject is an aged or older subject. In certain embodiments, the subject has an age of greater than 40 years. In certain embodiments, the subject has an age of greater than 45 years.

In certain embodiments, the subject is an obese or overweight subject.

In certain embodiments, the subject smokes, or has smoked.

In certain embodiments, the method improves the quality of sperm in a subject, thereby allowing the subject to produce (or have an increased likelihood of producing) a successful pregnancy in a suitable female subject. In certain embodiments, the method improves the quality of sperm in a subject, thereby allowing the subject to produce (or have an increased likelihood of producing) a successful pregnancy by natural means in a suitable female subject. In certain embodiments, the method improves the quality of sperm in a subject, thereby allowing the subject to produce (or have an increased likelihood of producing) a successful pregnancy utilizing an assisted reproductive technology. In certain embodiments, the method improves the quality of the progeny produced.

In certain embodiments the subject is a human subject.

In certain embodiments, the subject is an animal subject, such as a livestock animal (such as a horse, a cow, a sheep, a goat, a pig), a domestic animal (such as a dog or a cat) and other types of animals, such as monkeys, rabbits, mice, rats and laboratory animals, and wildlife species.

In certain embodiments, the exposing of the sperm to the BGP-15 and/or a derivative thereof comprises administering the BGP-15 and/or a derivative thereof to the subject. In certain embodiments, the quality of the sperm produced by the subject is improved. In certain embodiments, the quality of the sperm produced by the subject for in vitro fertilization purposes is improved.

In certain embodiments, the BGP-15 and/or a derivative thereof is administered to a subject to provide a blood or plasma concentration in the range of 1 µM to 100 µM, 5 µM to 100 µM, 10 µM to 100 µM, 50 µM to 100 µM, 1 µM to 50 µM, 5 µM to 50 µM, 10 µM to 50 µM, 1 µM to 10 µM, 5 µM to 10 µM, or 1 µM to 5 µM. Other ranges are contemplated.

In certain embodiments, the BGP-15 and/or a derivative thereof is administered to the subject in an amount ranging from one of the following selected ranges: 1 µg/kg to 1000 mg/kg, 1 µg/kg to 100 mg/kg; 1 µg/kg to 10 mg/kg; 1 µg/kg to 1 mg/kg; 1 µg/kg to 100 µg/kg; 1 µg/kg to 10 µg/kg; 10 µg/kg to 1000 mg/kg, 10 µg/kg to 100 mg/kg; 10 µg/kg to 10 mg/kg; 10 µg/kg to 1 mg/kg; 10 µg/kg to 100 µg/kg; 10 µg/kg to 1000 mg/kg, 100 µg/kg to 100 mg/kg; 100 µg/kg to 10 mg/kg; 100 µg/kg to 1 mg/kg; 1 mg/kg to 1000 mg/kg, 1 mg/kg to 100 mg/kg; 1 mg/kg to 10 mg/kg; 10 mg/kg to 1000 mg/kg; 10 mg/kg to 100 mg/kg; and 100 mg/kg to 1000 mg/kg body weight. Other ranges are contemplated.

In certain embodiments, the BGP-15 and/or a derivative thereof is administered once a day, twice, multiple times a day, or continuously. Other administration regimes are contemplated.

A suitable administration period may be selected. In certain embodiments, the BGP-15 and/or a derivative thereof is administered to the subject for a period of at least 1 day, at least 2 days, at least 3 days, at least 4 days, at least 5 days, at least 6 days, at least 7 days, at least 2 weeks, at least 3 weeks, or at least 4 weeks. In certain embodiments, the administration is for a continuous period. Other administration periods are contemplated.

In certain embodiments, the BGP-15 and/or a derivative thereof is administered to the subject in an amount ranging from one of the following selected ranges: 1 µg/kg/day to 1000 mg/kg/day, 1 µg/kg/day to 100 mg/kg/day; 1 µg/kg/day to 10 mg/kg/day; 1 µg/kg/day to 1 mg/kg/day; 1 µg/kg/day to 100 µg/kg/day; 1 µg/kg/day to 10 µg/kg/day; 10 µg/kg/day to 1000 mg/kg/day, 10 µg/kg/day to 100 mg/kg/day; 10 µg/kg/day to 10 mg/kg/day; 10 µg/kg/day to 1 mg/kg/day; 10 µg/kg/day to 100 µg/kg/day; 10 µg/kg/day to 1000 mg/kg/day, 100 µg/kg/day to 100 mg/kg/day; 100 µg/kg/day to 10 mg/kg/day; 100 µg/kg/day to 1 mg/kg/day; 1 mg/kg/day to 1000 mg/kg/day, 1 mg/kg/day to 100 mg/kg/day; 1 mg/kg/day to 10 mg/kg/day; 10 mg/kg/day to 1000 mg/kg/day; 10 mg/kg/day to 100 mg/kg/day; and 100 mg/kg/day to 1000 mg/kg/day body weight. Other ranges are contemplated.

The BGP-15 and/or a derivative thereof may be administered to the subject in a suitable form. In this regard, the terms "administering" or "providing" includes administering the agent, or administering a prodrug, or a derivative, that will form an effective amount of the desired agent within the body of the subject. The terms include routes of administration that are systemic (e.g., via injection such as intravenous injection, orally in a tablet, pill, capsule, or other dosage form useful for systemic administration), and topical (e.g., creams, solutions, pastes, ointment, including solutions such as mouthwashes, for topical oral administration). Other routes of administration are contemplated.

In certain embodiments, the BGP-15 and/or a derivative thereof is administered orally. In certain embodiments, the BGP-15 and/or a derivative thereof is administered intravenously. In certain embodiments, the BGP-15 and/or a derivative thereof is administered via injection, such as intravenous injection. In certain embodiments, the BGP-15 and/or a derivative thereof is administered by nebulized administration, by aerosolized administration or by being instilled into the lung. Other forms/routes of administration are contemplated.

The BGP-15 and/or a derivative thereof may be administered alone or may be delivered in a mixture with other therapeutic agents and/or agents that, for example, enhance, stabilize or maintain the activity of the agent. In certain embodiments, an administration vehicle is used (e.g., pill, tablet, implant, injectable solution, etc.) and would contain both the BGP-15 and/or a derivative thereof and additional agent(s).

The methods as described herein may also include combination therapy. In this regard, the subject may be treated or given another drug or treatment modality in conjunction with the BGP-15 and/or a derivative thereof as described herein. This combination therapy can be sequential therapy where the subject is treated first with one and then the other, or the two or more treatment modalities are given simultaneously.

"Co-administering" or "co-administration" refers to the administration of two or more therapeutic agents together at one time. The two or more therapeutic agents can be co-formulated into a single dosage form or "combined dosage unit", or formulated separately and subsequently combined into a combined dosage unit, typically for intravenous administration or oral administration.

When administered to a subject the therapeutically effective dosage of an agent may vary depending upon the particular agent utilized, the mode of administration, the condition, and severity thereof, as well as the various physical factors related to the subject being treated. The dosages are expected to vary with route of administration, and the nature of the agent administered and any other agents administered. In certain embodiments, the methods comprise administering to the subject escalating doses of the BGP-15 and/or a derivative thereof and/or repeated doses.

In certain embodiments, the BGP-15 and/or a derivative thereof is administered orally. In certain embodiments, the BGP-15 and/or a derivative thereof is administered intravenously. In certain embodiments, the BGP-15 and/or a derivative thereof is administered via injection, such as intravenous injection. In certain embodiments, the BGP-15 and/or a derivative thereof is administered parenterally. In certain embodiments, the BGP-15 and/or a derivative thereof is administered by direct introduction to the lungs, such as by aerosol administration, by nebulized administration, and by being instilled into the lung. In certain embodiments, the BGP-15 and/or a derivative thereof is administered by implant. In certain embodiments, the BGP-15 and/or a derivative thereof is administered by subcutaneous injection, intraarticularly, rectally, intranasally, intraocularly, vaginally, or transdermally. Methods of administration are known in the art.

"Intravenous administration" is the administration of substances directly into a vein.

"Oral administration" is a route of administration where a substance is taken through the mouth, and includes buccal, sublabial and sublingual administration, as well as enteral administration. Typical forms for the oral administration of therapeutic agents includes the use of tablets or capsules.

In certain embodiments, the BGP-15 and/or a derivative thereof is administered as a continuous release formulation.

In certain embodiments, the BGP-15 and/or a derivative thereof is administered as an immediate release formulation. The term "immediate release formulation" is a formulation which is designed to quickly release a therapeutic agent in the body over a shortened period of time. Immediate release formulations are known in the art.

In certain embodiments, the BGP-15 and/or a derivative thereof is administered as a sustained release formulation. The term "sustained release formulation" is a formulation which is designed to slowly release a therapeutic agent in the body over an extended period of time. Sustained release formulations are known in the art.

In certain embodiments, the BGP-15 and/or a derivative thereof is administered as a pharmaceutically acceptable salt. In this regard, the term "pharmaceutically acceptable salt" refers to acid addition salts or metal complexes which are commonly used in the pharmaceutical industry. Metal complexes include zinc, iron, and the like. Suitable acids for use in the preparation of pharmaceutically acceptable salts include, but are not limited to, acetic acid, 2,2-dichloroacetic acid, acylated amino acids, adipic acid, alginic acid, ascorbic acid, L-aspartic acid, benzenesulfonic acid, benzoic acid, A-acetamidobenzoic acid, boric acid, (+)-camphoric acid, camphorsulfonic acid, (+)-(S)-camphor-10-sulfonic acid, capric acid, caproic acid, caprylic acid, cinnamic acid, citric acid, cyclamic acid, cyclohexanesulfamic acid, dodecylsulfuric acid, ethane-1,2-disulfonic acid, ethanesulfonic acid, 2-hydroxy-ethanesulfonic acid, formic acid, fumaric acid, galactaric acid, gentisic acid, glucoheptonic acid, D-gluconic acid, D-glucuronic acid, L-glutamic acid, oxo-glutaric acid, glycolic acid, hippuric acid, hydrobromic acid, hydrochloric acid, hydroiodic acid, (+)-L-lactic acid, (+)-DL-lactic acid, lactobionic acid, lauric acid, maleic acid, (−)-L-malic acid, malonic acid, (±)-DL-mandelic acid, methanesulfonic acid, naphthalene-2-sulfonic acid, naphthalene-1,5-disulfonic acid, 1-hydroxy-2-naphthoic acid, nicotinic acid, nitric acid, oleic acid, orotic acid, oxalic acid, palmitic acid, pamoic acid, perchloric acid, phosphoric acid, L-pyroglutamic acid, saccharic acid, salicylic acid, 4-aminosalicylic acid, sebacic acid, stearic acid, succinic acid, sulfuric acid, tannic acid, (+)-L-tartaric acid, thiocyanic acid, p-toluenesulfonic acid, trifluoroacetic acid, undecylenic acid, suberic acid, valeric acid and the like.

Suitable bases for use in the preparation of pharmaceutically acceptable salts, including, but not limited to, inorganic bases, such as magnesium hydroxide, calcium hydroxide, potassium hydroxide, zinc hydroxide, or sodium hydroxide; and organic bases, such as primary, secondary, tertiary, and quaternary, aliphatic and aromatic amines, including L-arginine, benethamine, benzathine, choline, deanol, diethanolamine, diethylamine, dimethylamine, dipropylamine, diisopropylamine, 2-(diethylamino)-ethanol, ethanolamine, ethylamine, ethylenediamine, isopropylamine, N-methylglucamine, hydrabamine, IH-imidazole, L-lysine, morpholine, 4-(2-hydroxyethyl)-morpholine, methylamine, piperidine, piperazine, propylamine, pyrrolidine, 1-(2-hydroxyethyl)-pyrrolidine, pyridine, quinuclidine, quinoline, isoquinoline, secondary amines, triethanolamine, trimethylamine, triethylamine, N-methyl-D-glucamine, 2-amino-2-(hydroxymethyl)-1,3-propanediol, tromethamine, and the like.

Methods for assessing in vivo sperm quality are known in the art.

In certain embodiments, the assessment of the sperm quality comprises assessing the rate at which a suitable female subject falls pregnant.

In certain embodiments, the assessment of sperm quality comprises obtaining sperm from the subject and assessing fertilization capacity of the sperm. In certain embodiments, the assessment of sperm quality comprises obtaining sperm from the subject and assessing the ability of the sperm to fertilize an oocyte, and/or the developmental competence of an embryo produced from the sperm. In certain embodiments, the assessment of sperm quality comprises obtaining sperm from the subject and assessing the ability of the sperm to produce a zygote that has completed cleavage with appropriate timing post fertilization, the ability of the sperm to produce a two cell embryo which completes blastocyst development within appropriate timeframe, and the ability of the sperm to produce a blastocyst which initiates hatching. In certain embodiments, the assessment of sperm quality comprises assessing DNA integrity and/or DNA quality. In certain embodiments, the assessment of sperm quality comprises assessing mitochondrial activity. In certain embodiments, the assessment of sperm quality comprises assessing sperm motility.

In certain embodiments, the method improves the quality of the sperm by at least 10%, at least 20%, at least 30%, at least 40%, at least 50%, at least 60%, at least 70%, at least 80%, at least 90%, at least 100%, at least 200%, at least 300%, at least 400% or at least 500%.

In certain embodiments, the method is used to prevent and/or treat reduced sperm quality in a subject, to treat a subject with reduced fertility, or to treat a subject to improve sperm quality. In certain embodiments, the method is used to prevent or treat a condition or state as described herein.

Certain embodiments of the present disclosure provide isolated sperm produced by exposing the sperm to BGP-15 and/or a derivative thereof as described herein.

In certain embodiments, the isolated sperm are sperm exposed to the BGP-15 and/or a derivative thereof in vitro. Methods for exposing sperm in vitro to BGP-15 and/or a derivative thereof are as described herein. Sperm so treated may, for example, be used in an assisted reproductive technology. The sperm may, for example, be used directly, or be subject to further treatment, isolation or enrichment.

In certain embodiments, the isolated sperm are sperm isolated from a subject exposed to the BGP-15 and/or a derivative thereof in vivo. In certain embodiments, the isolated sperm are sperm isolated from a subject exposed to the BGP-15 and/or a derivative thereof. Methods for exposing sperm in vivo to BGP-15 and/or a derivative thereof are as described herein. The sperm may, for example, be used directly, or be subject to further treatment, isolation or enrichment.

In certain embodiments, the sperm so treated (exposed in vitro and/or in vivo) are used to produce embryos with improved developmental competence.

In certain embodiments, the isolated sperm are used in an assisted reproductive method. Assisted reproductive technologies are as described herein. In certain embodiments, the sperm so isolated are used to produce embryos with improved developmental competence.

Certain embodiments of the present disclosure provide a method of assisted reproduction comprising using sperm with improved quality as described herein.

Certain embodiments of the present disclosure provide a method of assisted reproduction comprising using isolated sperm as described herein.

Certain embodiments of the present disclosure provide a method of treating a subject to improve sperm quality using a method as described herein.

Certain embodiments of the present disclosure provide a method of treating a subject to improve sperm quality, the method comprising administering to the subject an effective amount of BGP-15 and/or a derivative thereof and thereby improving sperm quality in the subject.

Certain embodiments of the present disclosure provide a method of treating reduced sperm quality in a subject using a method as described herein.

Certain embodiments of the present disclosure provide a method of treating reduced sperm quality in a subject, the method comprising administering to the subject an effective amount of BGP-15 and/or a derivative thereof and thereby treating the subject.

Certain embodiments of the present disclosure provide use of a BGP-15 and/or a derivative thereof for improving sperm quality.

Certain embodiments of the present disclosure provide use of BGP-15 and/or a derivative thereof in a composition for improving sperm quality.

In certain embodiments, the BGP-15 and/or a derivative thereof is used in a composition at a concentration in the range of 1 μm to 100 μM, 2 μm to 100 μM, 5 μm to 100 μM, 10 μm to 100 μM, 20 μm to 100 μM, 50 μm to 100 μM, 1 μm to 50 μM, 2 μm to 100 μM, 5 μm to 50 μM, 10 μm to 50 μM, 20 μm to 50 μM, 1 μm to 20 μM, 2 μm to 20 μM, 5 μm to 20 μM, 5 μm to 10 μM, 1 μm to 5 μM, 2 μm to 5 μM, or 1 μm to 2 μM. Other concentration ranges are contemplated.

In certain embodiments, the composition is a sperm preparation medium. Sperm preparation media are known in the art and commercially available. For example, a sperm preparation media may be used for collection of semen, washing of spermatozoa and/or isolation of sperm.

In certain embodiments, the composition is an in vitro fertilization medium. IVF media are known in the art and commercially available.

In certain embodiments, the composition is a sperm freezing or cryopreservation medium. Sperm freezing or cryopreservation media are known in the art and commercially available.

Certain embodiments of the present disclosure provide a sperm preparation medium, the medium comprising BGP-15 and/or a derivative thereof. BGP-15 and derivatives are as described herein.

In certain embodiments, the sperm preparation medium comprises a concentration of BGP-15 and/or a derivative thereof in the range of 1 μm to 100 μM, 2 μm to 100 μM, 5 μm to 100 μM, 10 μm to 100 μM, 20 μm to 100 μM, 50 μm to 100 μM, 1 μm to 50 μM, 2 μm to 100 μM, 5 μm to 50 μM, 10 μm to 50 μM, 20 μm to 50 μM, 1 μm to 20 μM, 2 μm to 20 μM, 5 μm to 20 μM, 5 μm to 10 μM, 1 μm to 5 μM, 2 μm to 5 μM, or 1 μm to 2 μM. Other ranges are contemplated.

Certain embodiments of the present disclosure provide a method of preparing sperm, the method comprising exposing the sperm to a sperm preparation medium as described herein. Methods for sperm preparation are known in the art.

Certain embodiments of the present disclosure provide an in vitro fertilization medium for sperm, the medium comprising BGP-15 and/or a derivative thereof. BGP-15 and derivatives are as described herein.

In certain embodiments, the in vitro fertilization medium comprises a concentration of BGP-15 and/or a derivative thereof in the range of 1 μm to 100 μM, 2 μm to 100 μM, 5 μm to 100 μM, 10 μm to 100 μM, 20 μm to 100 μM, 50 μm to 100 μM, 1 μm to 50 μM, 2 μm to 100 μM, 5 μm to 50 μM, 10 μm to 50 μM, 20 μm to 50 μM, 1 μm to 20 μM, 2 μm to 20 μM, 5 μm to 20 μM, 5 μm to 10 μM, 1 μm to 5 μM, 2 μm to 5 μM, or 1 μm to 2 μM. Other ranges are contemplated IVF media are known in the art and typically comprise the following components: calcium chloride; gentamicin sulphate; glucose; human (or animal) albumin solution; magnesium sulfate; potassium chloride; sodium bicarbonate; sodium chloride; sodium phosphate; sodium pyruvate; and synthetic serum replacement.

Certain embodiments of the present disclosure provide a method of in vitro fertilization, the method comprising exposing the sperm to an in vitro fertilization medium as described herein. Methods for in vitro fertilization are known in the art.

Certain embodiments of the present disclosure provide a sperm freezing or cryoprotection medium, the medium comprising BGP-15 and/or a derivative thereof. BGP-15 and derivatives are as described herein.

In certain embodiments, the sperm freezing or cryoprotection medium comprises a concentration of BGP-15 and/or a derivative thereof in the range of 1 µm to 100 µM, 2 µm to 100 µM, 5 µm to 100 µM, 10 µm to 100 µM, 20 µm to 100 µM, 50 µm to 100 µM, 1 µm to 50 µM, 2 µm to 100 µM, 5 µm to 50 µM, 10 µm to 50 µM, 20 µm to 50 µM, 1 µm to 20 µM, 2 µm to 20 µM, 5 µm to 20 µM, 5 µm to 10 µM, 1 µm to 5 µM, 2 µm to 5 µM, or 1 µm to 2 µM. Other ranges are contemplated.

Certain embodiments of the present disclosure provide a method of freezing sperm, the method comprising exposing the sperm to a sperm freezing or cryoprotection medium as described herein. Methods for freezing or cryoprotecting sperm are known in the art.

Certain embodiments of the present disclosure provide a method of freezing sperm, the method comprising exposing the sperm to BGP-15 and/or a derivative thereof at one or more of before, during and/or after freezing of the sperm. BGP-15 and derivatives are as described herein.

Certain embodiments of the present disclosure provide medicaments or pharmaceutical compositions containing BGP-15 and/or a derivative thereof. The medicaments or pharmaceutical compositions may be used in methods of treating subjects as described herein.

Certain embodiments of the present disclosure provide a pharmaceutical composition for improving sperm quality, the composition comprising an effective amount of BGP-15 and/or a derivative thereof. BGP-15 and derivatives are as described herein.

In certain embodiments, a pharmaceutical composition further comprises a pharmaceutically acceptable carrier and/or suitable excipient(s).

In certain embodiments, the BGP-15 and/or a derivative thereof is present in a pharmaceutical composition so as to provide an amount of BGP-15 and/or a derivative thereof in blood or plasma at a concentration in the range of 0.1 µM to 30 µM, 0.5 µM to 30 µM, 1 µM to 30 µM, 5 µM to 30 µM, 10 µM to 30 µM, 20 µM to 30 µM, 0.1 µM to 20 µM, 0.5 µM to 20 µM, 1 µM to 20 µM, 5 µM to 20 µM, 10 µM to 20 µM, 0.1 µM to 10 µM, 0.5 µM to 10 µM, 1 µM to 10 µM, 5 µM to 10 µM, 0.1 µM to 5 µM, 0.5 µM to 5 µM, 1 µM to 5 µM, or 0.1 µM to 0.5 µM. Other ranges are contemplated.

In certain embodiments, the BGP-15 and/or a derivative thereof is present in a pharmaceutical composition so as to provide an amount of BGP-15 and/or a derivative thereof for administration to the subject in an amount ranging from one of the following selected ranges: 1 µg/kg to 1000 mg/kg, 1 µg/kg to 100 mg/kg; 1 µg/kg to 10 mg/kg; 1 µg/kg to 1 mg/kg; 1 µg/kg to 100 µg/kg; 1 µg/kg to 10 µg/kg; 10 µg/kg to 1000 mg/kg, 10 µg/kg to 100 mg/kg; 10 µg/kg to 10 mg/kg; 10 µg/kg to 1 mg/kg; 10 µg/kg to 100 µg/kg; 10 µg/kg to 1000 mg/kg, 100 µg/kg to 100 mg/kg; 100 µg/kg to 10 mg/kg; 100 µg/kg to 1 mg/kg; 1 mg/kg to 1000 mg/kg, 1 mg/kg to 100 mg/kg; 1 mg/kg to 10 mg/kg; 10 mg/kg to 1000 mg/kg; 10 mg/kg to 100 mg/kg; and 100 mg/kg to 1000 mg/kg body weight. Other ranges are contemplated.

In certain embodiments, the BGP-15 and/or a derivative thereof is present in a pharmaceutical composition so as to provide an amount of BGP-15 and/or a derivative thereof for administration to the subject in an amount ranging from one of following selected ranges: 0.1 mg/kg to 10 mg/kg, 0.5 mg to 10 mg/kg, 1 mg/kg to 10 mg/kg, 5 mg/kg to 10 mg/kg. 0.1 mg/kg to 5 mg/kg, 0.5 mg/kg to 5 mg/kg, 1 mg/kg to 5 mg/kg, 0.1 mg/kg to 1 mg/kg or 0.5 mg/kg to 1 mg/kg. Other ranges are contemplated.

In certain embodiments, the BGP-15 and/or a derivative thereof is present in a pharmaceutical composition so as to provide an amount of BGP-15 and/or a derivative thereof for administration to the subject in an amount ranging from one of the following selected ranges: 1 µg/kg/day to 1000 mg/kg/day, 1 µg/kg/day to 100 mg/kg/day; 1 µg/kg/day to 10 mg/kg/day; 1 µg/kg/day to 1 mg/kg/day; 1 µg/kg/day to 100 µg/kg/day; 1 µg/kg/day to 10 µg/kg/day; 10 µg/kg/day to 1000 mg/kg/day, 10 µg/kg/day to 100 mg/kg/day; 10 µg/kg/day to 10 mg/kg/day; 10 µg/kg/day to 1 mg/kg/day; 10 µg/kg/day to 100 µg/kg/day; 10 µg/kg/day to 1000 mg/kg/day, 100 µg/kg/day to 100 mg/kg/day; 100 µg/kg/day to 10 mg/kg/day; 100 µg/kg/day to 1 mg/kg/day; 1 mg/kg/day to 1000 mg/kg/day, 1 mg/kg/day to 100 mg/kg/day; 1 mg/kg/day to 10 mg/kg/day; 10 mg/kg/day to 1000 mg/kg/day; 10 mg/kg/day to 100 mg/kg/day; and 100 mg/kg/day to 1000 mg/kg/daybody weight. Other ranges are contemplated.

In certain embodiments, the BGP-15 and/or a derivative thereof is present in a pharmaceutical composition so as to provide an amount of BGP-15 and/or a derivative thereof for administration to the subject in an amount ranging from one of the following selected ranges: 0.1 mg/kg/day to 10 mg/kg/day, 0.5 mg/kg/day to 10 mg/kg/day, 1 mg/kg/day to 10 mg/kg/day, 5 mg/kg/day to 10 mg/kg/day, 0.1 mg/kg/day to 5 mg/kg/day, 0.5 mg/kg/day to 5 mg/kg/day, 1 mg/kg/day to 5 mg/kg/day, 0.1 mg/kg/day to 1 mg/kg/day, or 0.5 mg/kg/day to 1 mg/kg/day. Other ranges are contemplated.

In certain embodiments, the pharmaceutical composition is suitable for delivery to the subject by one or more of intravenous administration, intratracheal administration, by nebulized administration, by aerosolized administration, by instillation into the lung, by oral administration, by parenteral administration, by implant, by subcutaneous injection, intraarticularly, rectally, intranasally, intraocularly, vaginally, or transdermally. Other routes of administration are contemplated.

In certain embodiments, the BGP-15 and/or a derivative thereof is provided with a pharmaceutically acceptable carrier suitable for administering the pharmaceutical composition to a subject. The carriers may be chosen based on various considerations including the route of administration, the agent(s) being delivered and the time course of delivery of the agents. The term "pharmaceutically acceptable carrier" refers to a substantially inert solid, semi-solid or liquid filler, diluent, excipient, encapsulating material or formulation auxiliary of any type. An example of a pharmaceutically acceptable carrier is physiological saline. Other physiologically acceptable carriers and their formulations are known in the art. Some examples of materials which can serve as pharmaceutically acceptable carriers include sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols such as propylene glycol; esters such as ethyl oleate and ethyl laurate; agar; detergents such as TWEEN 80; buffering agents such as magnesium hydroxide and aluminium hydroxide; alginic acid; pyrogen-free water; isotonic saline; Ringer's solution; ethyl alcohol; and phosphate buffer solutions, as well as other non-toxic compatible lubricants such as sodium lauryl sulfate and magnesium stearate, as well as colouring agents, releasing agents, coating agents, sweetening, flavouring and perfuming agents, preservatives and antioxidants can also be present.

In certain embodiments, the BGP-15 and/or a derivative thereof is provided with a pharmaceutically acceptable excipient.

For example, suitable excipients for use in the form of a tablet include a tablet with a tablet core and a film coat as follows: tablet core—maize starch, pregelatinised starch, sodium starch glycollate, povidone, glycerol dibehenate, magnesium stearate; film coat—hypromellose, glycerol triacetate, talc, titanium dioxide (E171), iron oxide yellow (E172), iron oxide red (E172), ethylcellulose. Other excipients are contemplated.

For example, a tablet with BGP-15 and/or a derivative thereof may include an amount of the agent as a hydrate and a tablet core with maize starch, pregelatinised starch, sodium starch glycollate, povidone, glycerol dibehenate, and magnesium stearate, and a film coat with hypromellose, glycerol triacetate, talc, titanium dioxide (E171), iron oxide yellow (E172), iron oxide red (E172), and ethylcellulose.

In certain embodiments, the BGP-15 and/or a derivative thereof may be administered, or present in a pharmaceutical composition, as a pharmaceutically acceptable salt.

In certain embodiments, the BGP-15 and/or a derivative thereof may be administered, or present in a pharmaceutical composition, as a pharmaceutically acceptable hydrate. A hydrate is a solid adduct containing both the parent compound (e.g., the anhydrate of a drug or excipient) and water.

In certain embodiments, the pharmaceutical composition as described herein comprises other therapeutic agents and/or agents that enhance, stabilise or maintain the activity of the active.

Oral formulations as described herein may comprise any conventionally used oral forms, including tablets, capsules, buccal forms, troches, lozenges and oral liquids, suspensions or solutions. Capsules may contain mixtures of the active compound(s) with inert fillers and/or diluents such as the pharmaceutically acceptable starches (e.g. corn, potato or tapioca starch), sugars, artificial sweetening agents, powdered celluloses, such as crystalline and microcrystalline celluloses, flours, gelatins, gums, etc. Useful tablet formulations may be made by conventional compression, wet granulation or dry granulation methods and utilize pharmaceutically acceptable diluents, binding agents, lubricants, disintegrants, surface modifying agents (including surfactants), suspending or stabilizing agents, including magnesium stearate, stearic acid, talc, sodium lauryl sulfate, microcrystalline cellulose, carboxymethylcellulose calcium, polyvinylpyrrolidone, gelatin, alginic acid, acacia gum, xanthan gum, sodium citrate, complex silicates, calcium carbonate, glycine, dextrin, sucrose, sorbitol, dicalcium phosphate, calcium sulfate, lactose, kaolin, mannitol, sodium chloride, talc, dry starches and powdered sugar. Surface modifying agents include nonionic and anionic surface modifying agents. Representative examples of surface modifying agents include, but are not limited to, poloxamer 188, benzalkonium chloride, calcium stearate, cetostearl alcohol, cetomacrogol emulsifying wax, sorbitan esters, colloidol silicon dioxide, phosphates, sodium dodecylsulfate, magnesium aluminium silicate, and triethanolamine. Oral formulations may utilize standard delay or time-release formulations to alter the absorption of the peptides. The oral formulation may also consist of administering the active ingredient in water or a fruit juice, containing appropriate solubilizers or emulsifiers as needed. Oral formulations are known in the art and may be formulated by a skilled person.

In certain embodiments, it may be desirable to administer the pharmaceutical composition directly to the airways in the form of an aerosol. Formulations for the administration of aerosol forms are known in the art and may be formulated by a skilled person.

In certain embodiments, a composition may also be administered parenterally (such as directly into the joint space) or intraperitoneally. For example, solutions or suspensions of agents in a non-ionized form or as a pharmacologically acceptable salt can be prepared in water suitably mixed with a surfactant such as hydroxy-propylcellulose. Dispersions can also be prepared in glycerol, liquid polyethylene glycols and mixtures thereof in oils. Under ordinary conditions of storage and use, these preparations typically contain a preservative to prevent the growth of microorganisms. Parenteral formulations are known in the art and may be formulated by a skilled person.

In certain embodiments, the compositions may also be administered by injection. Pharmaceutical forms suitable for injectable use include sterile aqueous solutions or dispersions and sterile powders for the extemporaneous preparation of sterile injectable solutions or dispersions. The carrier can be a solvent or dispersion medium containing, for example, water, isotonic saline, ethanol, polyol (e.g., glycerol, propylene glycol and liquid polyethylene glycol), suitable mixtures thereof, and vegetable oils. Injectable formulations are known in the art and may be formulated by a skilled person.

In certain embodiments, the pharmaceutical compositions may also be administered intravenously. Compositions suitable for intravenous administration are known in the art and may be formulated by a skilled person. For example, isotonic saline may be used in an intravenous composition containing an antagonist.

In certain embodiments, the pharmaceutical compositions may also be administered transdermally. Transdermal administrations are understood to include all administrations across the surface of the body and the inner linings of bodily passages including epithelial and mucosal tissues. Such administrations may be carried out using an active agent as described herein, or pharmaceutically acceptable salts thereof, in lotions, creams, foams, patches, suspensions, solutions, and suppositories (rectal and vaginal).

Transdermal administration may also be accomplished through the use of a transdermal patch containing the active compound and a carrier that is inert to the active compound, is non toxic to the skin, and allows delivery of the agent for systemic absorption into the blood stream via the skin. The carrier may take any number of forms such as creams and ointments, pastes, gels, and occlusive devices. The creams and ointments may be viscous liquid or semisolid emulsions of either the oil-in-water or water-in-oil type. Pastes comprised of absorptive powders dispersed in petroleum or hydrophilic petroleum containing the active ingredient may also be suitable. A variety of occlusive devices may be used to release the active ingredient into the blood stream such as a semi-permeable membrane covering a reservoir containing the active ingredient with or without a carrier, or a matrix containing the active ingredient. Transdermal formulations are known in art and may be formulated by a skilled person.

In certain embodiments, the pharmaceutical composition may also be administered by way of a suppository. Suppository formulations may be made from traditional materials, including cocoa butter, with or without the addition of waxes to alter the suppository's melting point, and glycerin. Water soluble suppository bases, such as polyethylene glycols of various molecular weights, may also be used. Suppository formulations are known in the art and may be formulated by a skilled person.

Additional numerous various excipients, dosage forms, dispersing agents and the like that are suitable for use in connection with administration and/or the formulation into medicaments or pharmaceutical compositions. Formulations are known and described in, for example, Remington's Pharmaceutical Sciences, 17th ed., Mack Publishing Company, Easton, Pa., 1985, which is incorporated herein by reference in its entirety.

Certain embodiments of the present disclosure provide a method of treating a subject by administering to the subject a pharmaceutical composition as described herein.

Certain embodiments of the present disclosure provide a method of treating a subject to improve sperm quality, the method comprising administering to the subject a pharmaceutical composition as described herein.

Certain embodiments of the present disclosure provide a method of treating reduced sperm quality in a subject, the method comprising administering to the subject a pharmaceutical composition as described herein.

Certain embodiments of the present disclosure provide a method of improving developmental competence of an embryo by using sperm exposed to BGP-15 and/or a derivative thereof. BGP-15 and derivatives are as described herein.

Certain embodiments of the present disclosure provide a method of improving developmental competence of an embryo produced by a sperm fertilizing an oocyte, the method comprising exposing the sperm to BGP-15 and/or a derivative thereof and thereby improving the developmental competence of the embryo. BGP-15 and derivatives are as described herein.

In certain embodiments, the BGP-15 and/or a derivative thereof comprises one or more of BGP-15, propanolol, bimoclomol, arimoclomal, NG-94, iroxanadine, and/or a pharmaceutically acceptable derivative, prodrug, solvate, salt, tautomer, stereoisomer, or racemate of any of the aforementioned.

In certain embodiments, the BGP-15 and/or a derivative thereof comprises BGP-15.

The term "developmental competence" as used herein includes one or more of: (i) the ability and/or likelihood of the oocyte to produce an embryo (for example, upon fertilization of an oocyte or by other mechanisms, such as parthenogenic activation); (ii) one or more of the ability, likelihood and rate of an oocyte to progress through blastocyst development upon formation of an embryo; and (iii) the quality of the embryo (for example, as determined by morphological and/or biochemical assessments) achieved upon the production of an embryo from the oocyte.

Methods for determining the developmental competence are known in the art.

For example, the ability of an embryo produced from an oocyte exposed to the sperm to progress through blastocyst development may be improved and/or has one or more of an increased ability to progress through blastocyst development, an increased fertilization rate, an increased likelihood of progression through blastocyst development, an increased rate of forming a two cell embryo, an increased rate of forming a four cell embryo, an increased rate of forming a blastocyst, an increased rate of progressing through blastocyst development, and an increased rate of blastocyst hatching.

In certain embodiments, the method comprises exposing the oocyte to sperm in vitro. In certain embodiments, the method comprises exposing the oocyte to sperm in vivo.

Sperm, and donors of sperm, are as described herein.

Certain embodiments of the present disclosure provide a method of assisted reproduction using sperm exposed to BGP-15 and/or a derivative thereof. BGP-15 and derivatives are as described herein.

Certain embodiments of the present disclosure provide a method of assisted reproduction using sperm, the method comprising exposing the sperm to BGP-15 and/or a derivative thereof and using the sperm exposed to the BGP-15 and/or a derivative thereof in the method of assisted reproduction. BGP-15 and derivatives are as described herein.

Assisted reproduction technologies are as described herein.

In certain embodiments, the assisted reproduction technology comprises in vitro fertilization. In certain embodiments, the assisted reproduction technology comprises artificial insemination.

In certain embodiments, the sperm is from an aged donor or an older donor. In certain embodiments, the sperm is from a donor with an age of greater than 40 years. In certain embodiments, the sperm is from a donor with an age of greater than 45 years. In certain embodiments, the sperm is from an obese or overweight donor. In certain embodiments, the sperm is from a donor subject who smokes, or has smoked.

In certain embodiments, the sperm is from a subject with reduced fertility. In certain embodiments, the sperm is from a subject suffering from, or susceptible to, a disease, condition or state associated with reduced fertility.

In certain embodiments, the sperm is exposed to the BGP-15 and/or a derivative thereof in vitro. Methods for in vitro exposing sperm to BGP-15 and/or a derivative thereof are as described herein.

In certain embodiments, the sperm is exposed to the BGP-15 and/or a derivative thereof in vivo. Methods for exposing sperm in vivo to BGP-15 and/or a derivative thereof by administering the BGP-15 and/or a derivative thereof to a subject are as described herein.

In certain embodiments, the method is an assisted reproduction technology in a human.

In certain embodiments, the method is an assisted reproduction in an animal.

Certain embodiments of the present disclosure provide an isolated embryo produced by an assisted reproductive technology as described herein. In certain embodiments, the isolated embryo is an animal embryo.

Certain embodiments of the present disclosure provide an animal produced using an assisted reproductive technology as described herein.

Certain embodiments of the present disclosure provide a method of artificial insemination, the method comprising:
  exposing a sperm in vitro to BGP-15 and/or a derivative thereof; and
  artificially inseminating a subject with the sperm exposed to the BGP-15 and/or a derivative thereof.

Certain embodiments of the present disclosure provide a method of artificial insemination, the method comprising:
  obtaining sperm from a subject exposed to BGP-15 and/or a derivative thereof; and artificially inseminating a subject with the sperm.

Certain embodiments of the present disclosure provide an in vitro fertilization method, the method comprising:
exposing sperm in vitro to BGP-15 and/or a derivative thereof; and
fertilizing an oocyte with the sperm exposed to the BGP-15 and/or a derivative thereof.

Certain embodiments of the present disclosure provide an in vitro fertilization method, the method comprising:
obtaining sperm from a subject exposed to BGP-15 and/or a derivative thereof and fertilizing an oocyte with the sperm.

IVF relates to the fertilization of an oocyte in vitro, wherein the oocyte is isolated from the subject and typically incubated in liquid media with sperm to allow fertilization of the oocyte. It is contemplated that fertilization of the oocyte by the sperm will generally occur greater than 24 hours, but usually not later than 60 hours, after the oocyte collection step, such that maturity of the oocyte is at a sufficient stage to maximize the success of subsequent steps in the IVF procedure.

Certain embodiments of the present disclosure provide a kit or product for performing a method as described herein.

The kit or product may contain one or more reagents and/or components as described herein, and/or instructions for performing a method as described herein.

In certain embodiments, the kit or product is used for improving quality of sperm.

Certain embodiments of the present disclosure provide a kit or product for improving quality of sperm, the kit or product comprising BGP-15 and/or a derivative thereof for exposure to the sperm. BGP-15 and derivatives are as described herein.

For example, a kit or product may contain BGP-15 and/or a derivative thereof in a suitable form and a sperm preparation medium (or components thereof) for combining to treat sperm.

In certain embodiments, the kit or product is used in an assisted reproductive technology.

Certain embodiments of the present disclosure provide a kit or product for use in an assisted reproductive technology, the kit or product comprising BGP-15 and/or a derivative thereof for exposure to sperm. BGP-15 and derivatives are as described herein.

Certain embodiments of the present disclosure provide a combination product.

Certain embodiments of the present disclosure provide a combination product comprising:
(i) a sperm preparation medium;
(ii) BGP-15 and/or a derivative thereof; and optionally instructions for exposing sperm to the BGP-15 and/or a derivative thereof in the sperm preparation medium.

Certain embodiments of the present disclosure provide a combination product comprising:
(i) an IVF medium;
(ii) BGP-15 and/or a derivative thereof; and optionally instructions for use of BGP-15 and/or a derivative thereof in the IVF medium.

Certain embodiments of the present disclosure provide a combination product comprising:
(i) a sperm freezing medium;
(ii) BGP-15 and/or a derivative thereof; and optionally instructions for exposing sperm to the BGP-15 and/or a derivative thereof in the sperm freezing medium.

Certain embodiments of the present disclosure provide a method for screening for an agent that improves sperm quality.

Certain embodiments of the present disclosure provide a method of screening for an agent to improve sperm quality, the method comprising determining the ability of a derivative of BGP-15 to improve quality of sperm and identifying the derivative as an agent to improve sperm quality.

Methods for determining sperm quality are as described herein.

In certain embodiments, the method comprises determining the ability of the derivative in vitro to improve the quality of the sperm. Methods for exposing sperm to agents in vitro are as described herein.

In certain embodiments, the method comprises the use of animal sperm to assess the ability of the derivative to improve sperm quality.

In certain embodiments, the method comprises the use of human sperm to assess the ability of the derivative to improve sperm quality.

In certain embodiments, the method comprises determining the ability of the derivative in vivo to improve the quality of the sperm. Methods for exposing sperm in a subject to agents are as described herein.

In certain embodiments, the method comprises the use of animal subject or animal model to assess the ability of the derivative to improve sperm quality in vivo.

In certain embodiments, the derivative comprises a derivative of one of propanolol, bimoclomol, arimoclomal, NG-94, or iroxanadine.

In certain embodiments, the derivative comprises a substituted derivative.

In certain embodiments, the derivative comprises an altered functional group.

The present disclosure is further described by the following examples. It is to be understood that the following description is for the purpose of describing particular embodiments only and is not intended to be limiting with respect to the above description.

Example 1—Treatment of Sperm In Vitro with BGP-15 Restores Sperm Function in Older Mice A preclinical study examined whether BGP-15 treatment in vitro can improve the quality of sperm that has been negatively affected by aging. Sperm was collected from C57BL6 mice that were either "old" (>12 months old) or "young" (<6 months old), treated with BGP-15 (or vehicle), used to fertilize oocyte of young female mice and embryo development assessed.

Materials and Methods: Chemicals were purchased from Sigma-Aldrich (St. Louis, Mo., USA) unless otherwise indicated. Stock concentration (1 mM) of BGP-15 (kindly provided by N-Gene Research Laboratories) was prepared in MilliQ water prior to use.

All experimental procedures were approved by the University of Adelaide Animal Ethics Committee and were performed in accordance with the Australian Code of Practice for the Care and Use of Animals for Scientific Purposes. C57BL/6 mice were obtained from the University of Adelaide Laboratory Animal Services or the Animal Resources Centre (WA), and housed in the Animal Facility under a 14:10 hour light:dark cycle with ad libitum access to food and water. Male mice were either young (<6 months of age) or old (>12 months of age) and of proven fertility. Each male mouse was 'time-mated' to a young (6-8 weeks old) naturally cycling female mouse 4 to 7 days prior to sperm collection. Male mice were humanely killed by cervical dislocation and both cauda epididymides dissected for isolation of sperm for IVF.

To generate oocytes for IVF, female mice (6 to 8 weeks of age) were hormonally induced to ovulate by intraperitoneal (i.p.) injection of 5 IU (international units) per 12 g body weight of Pregnant Mare Serum Gonadotrophin (PMSG; National Hormone and Peptide Program, Torrance, Calif., USA) followed 48 h later by 5 IU per 12 g body weight human chorionic gonadotrophin (hCG; Merck, Sharp and Dohme), each in 0.1 mL 0.9% saline. Female mice were humanely killed by cervical dislocation 15 h post-hCG and COCs obtained from oviducts and collected in HEPES-buffered α-minimum essential medium (MEM) handling media (Life Technologies, Invitrogen, Carlsbad, Calif., USA) supplemented with 1% fetal calf serum (FCS) (Life Technologies, Invitrogen, Carlsbad, Calif., USA) and pre-warmed to 37° C. prior to use.

One cauda epididymis and vas deferens from each mouse was at random placed into 500 uL of warm (37° C.) fertilization media containing 10 uM BGP-15 or not. The content of the seminiferous tubules, containing the seminal fluid and the spermatozoa, was then extracted into the media and the remaining tissue discarded. Spermatozoa were left in the media and placed in an incubator to capacitate for 1 hour at 37° C. and 6% CO2, 5% O2, nitrogen balance. Following capacitation, 10 ul of fertilization media containing spermatozoa was added to each 90 ul fertilization (see below).

Ovulated COCs collected into a-MEM handling media were washed in fresh α-MEM handling media and then transferred to warmed (37° C.) Cook wash media (Cook Medical, Queensland, Australia) before fertilization with sperm. Fertilization, wash and embryo culture media were Research Vitro Fertilization, Research Vitro Wash and Research Vitro Cleave respectively from Cook Medical. Ten μL of capacitated sperm (35,000 sperm/mL) from each treatment group was added to the 90 μL fertilization drop, which contained the washed COCs (15-20 COCs per drop), followed by co-incubation for 4 h at 37° C. in an atmosphere of 6% $CO_2$, 5% $O_2$, nitrogen balance.

The presumptive zygotes were then collected and transferred to Cook cleave medium. Zygotes were cleaned of spermatozoa still attached to the zona pellucida, and left to grow for 5 days at 37° C. in an atmosphere of 6% CO2, 5% O2, nitrogen balance, at a concentration of 20 embryos per 20 uL.

On Day 2, fertilization was assessed and embryos were scored for first cleavage. 2-cell embryos were then transferred into a fresh 20 μL drop of Cook cleave medium (10-15 embryos per drop) and cultured at 37° C. in an atmosphere of 5% $CO_2$, 5% $O_2$, nitrogen balance. Embryos were cultured until day 5, when assessed for blastocyst formation and hatching status. Embryo morphology was classified as appropriately developed ('on-time') using the following criteria; on Day 2, embryos at the 2-cell stage and on Day 5, blastocysts or hatching blastocysts. Development rate was assessed on Day 2 as the percentage of embryos meeting the on-time development criteria from starting number of oocytes; while development on Day 5 as the percentage of embryos meeting the on-time development criteria from 2-cell embryos.

Statistical Analyses

All data were tested for normality of distribution prior to analyses. All measures are reported as mean SEM. Statistical significance was determined as indicated, by Student's-test, using GraphPad Prism v008 (GraphPad Software, La Jolla, Calif., USA) for Windows.

The data is shown in FIG. 1, which shows the effect of in vitro treatment with BGP-15 on restoring sperm function. Sperm was collected from epididymis and vas deferens of male mice that were 'young' (6 weeks old) or 'old' (1 year old) and was allowed to undergo capacitation (maturation) for one hour in vitro in control media (untreated) or media containing 10 uM BGP-15. Subsequently sperm was used for in vitro fertilization of oocytes from young female mice and development of putative zygotes was assessed as follows: A) Percentage of putative zygotes that had completed cleavage 24 h post-IVF; B) Percentage of 2 cell embryos that completed blastocyst development by day 5; and C) Percentage of blastocysts that had initiated hatching. N=6-12 mice per treatment group. Analysis was paired t-test comparing untreated and BGP-15-treatment within each age group and unpaired t-test comparing young and old.

For the data relating to the percentage of zygotes to complete cleavage 24 hours post-IVF, there was greater than a 70% improvement in sperm from an aged donor to generate an embryo that completed cleavage following treatment with BGP-15. BGP-15 also marginally increased the embryo cleavage rate of sperm from young donors.

For the data relating to the percentage of 2 cell embryos to complete blastocyst development by day 5, there was greater than a 70% improvement in sperm from an aged donor to generate embryos that complete blastocyst development following treatment with BGP-15. BGP-15 also marginally increased the rate of embryo blastocyst development in sperm from young donors.

For the data relating to the percentage of blastocyst that initiated hatching, there was greater than a 50% improvement in sperm from an aged donor to generate embryos that initiate hatching following treatment with BGP-15. BGP-15 also increased the rate of embryo blastocyst development in sperm from young donors by greater than 60%.

Each developmental milestone was impaired in embryos that were conceived using sperm from old mice, however each developmental parameter was improved by the 1 h treatment of 'old' sperm in vitro with BGP-15.

Example 2—In Vivo Treatment with BGP-15 Restores Sperm Function in Older Mice

An experiment examined whether BGP-15 treatment in vivo can improve the quality of sperm that has been negatively affected by aging. C57BL6 male mice that were either "old" (>12 months old) or "young" (<6 months old) were treated with BGP-15 (or vehicle), followed by collection of sperm, fertilization of oocytes of young female mice and assessment of embryo development.

Materials and Methods

Chemicals were purchased from Sigma-Aldrich (St. Louis, Mo., USA) unless otherwise indicated. Stock concentration (1 mM) of BGP-15 (kindly provided by N-Gene Research Laboratories) was prepared in MilliQ water prior to use.

All experimental procedures were approved by the University of Adelaide Animal Ethics Committee and were performed in accordance with the Australian Code of Practice for the Care and Use of Animals for Scientific Purposes. C57BL/6 mice were obtained from the University of Adelaide Laboratory Animal Services or the Animal Resources Centre (WA), and housed in the Animal Facility under a 14:10 hour light:dark cycle with ad libitum access to food and water.

Male mice were either young (<6 months of age) or old (>12 months of age) and of proven fertility. Each male mouse was 'time-mated' to a young (6-8 weeks old) naturally cycling female mouse 4 to 7 days prior to sperm collection. Male mice were humanely killed by cervical dislocation and both cauda epididymides dissected for isolation of sperm for IVF.

To generate oocytes for IVF, female mice (6 to 8 weeks of age) were hormonally induced to ovulate by intraperitoneal (i.p.) injection of 5 IU (international units) per 12 g body weight of Pregnant Mare Serum Gonadotrophin (PMSG; National Hormone and Peptide Program, Torrance, Calif., USA) followed 48 h later by 5 IU per 12 g body weight human chorionic gonadotrophin (hCG; Merck, Sharp and Dohme), each in 0.1 mL 0.9% saline. Female mice were humanely killed by cervical dislocation 15 h post-hCG and COCs obtained from oviducts and collected in HEPES-buffered $\alpha$-minimum essential medium (MEM) handling media (Life Technologies, Invitrogen, Carlsbad, Calif., USA) supplemented with 1% fetal calf serum (FCS) (Life Technologies, Invitrogen, Carlsbad, Calif., USA) and pre-warmed to 37° C. prior to use.

For the in vivo BGP-15 treatment experiments, males were time-mated, then received an IP injection of 15 mg/Kg body weight BGP-15 in 0.9% NaCl solution for 4 days prior to sperm collection. Sperm was then collected and capacitated to use for in-vitro fertilization as previously described (above).

Ovulated COCs collected into a-MEM handling media were washed in fresh $\alpha$-MEM handling media and then transferred to warmed (37° C.) Cook wash media (Cook Medical, Queensland, Australia) before fertilization with sperm. Fertilization, wash and embryo culture media were Research Vitro Fertilization, Research Vitro Wash and Research Vitro Cleave respectively from Cook Medical (Queensland, Australia). Ten µL of capacitated sperm (35,000 sperm/mL) from each treatment group was added to the 90 µL fertilization drop, which contained the washed COCs (15-20 COCs per drop), followed by co-incubation for 4 h at 37° C. in an atmosphere of 6% $CO_2$, 5% $O_2$, nitrogen balance.

The presumptive zygotes were then collected and transferred to Cook cleave medium. Zygotes were cleaned of spermatozoa still attached to the zona pellucida, and left to grow for 5 days at 37° C. in an atmosphere of 6% $CO_2$, 5% $O_2$, nitrogen balance, at a concentration of 20 embryos per 20 uL.

On Day 2, fertilization was assessed and embryos were scored for first cleavage. 2-cell embryos were then transferred into a fresh 20 µL drop of Cook cleave medium (10-15 embryos per drop) and cultured at 37° C. in an atmosphere of 5% $CO_2$, 5% $O_2$, nitrogen balance. Embryos were cultured until day 5, when assessed for blastocyst formation and hatching status. Embryo morphology was classified as appropriately developed ('on-time') using the following criteria; on Day 2, embryos at the 2-cell stage and on Day 5, blastocysts or hatching blastocysts. Development rate was assessed on Day 2 as the percentage of embryos meeting the on-time development criteria from starting number of oocytes; while development on Day 5 as the percentage of embryos meeting the on-time development criteria from 2-cell embryos.

Figure 2:
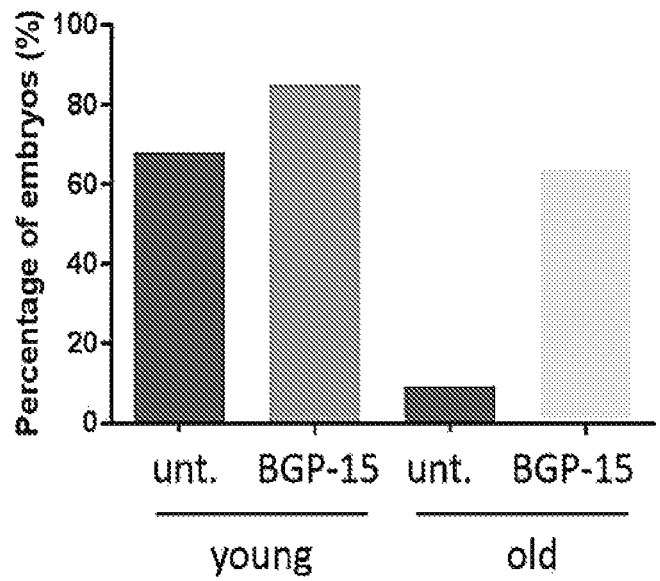
FIG. 2 shows effects of in vivo treatment with BGP-15 on restoring sperm function. Male mice that were 'young' (~6 weeks old) or 'old' (~1 year old) were 'untreated' or treated with BGP-15 (15 mg/kg) i.p once daily for 4 days. Approximately 12 h following the last injection sperm was collected from the epididymis and vas deferens and used for in vitro fertilization of oocytes from young female mice and development of putative zygotes was assessed. A) Percentage of putative zygotes that had completed cleavage 24 h post-IVF. B) Percentage of 2 cell embryos that completed blastocyst development by day 5. C) Percentage of blastocysts that had initiated hatching. Each developmental milestone was impaired in embryos that were conceived using sperm from old mice however each developmental parameter was improved by treating the 'old' mouse with BGP-15. N=1 mouse per treatment group.
Figure 2:
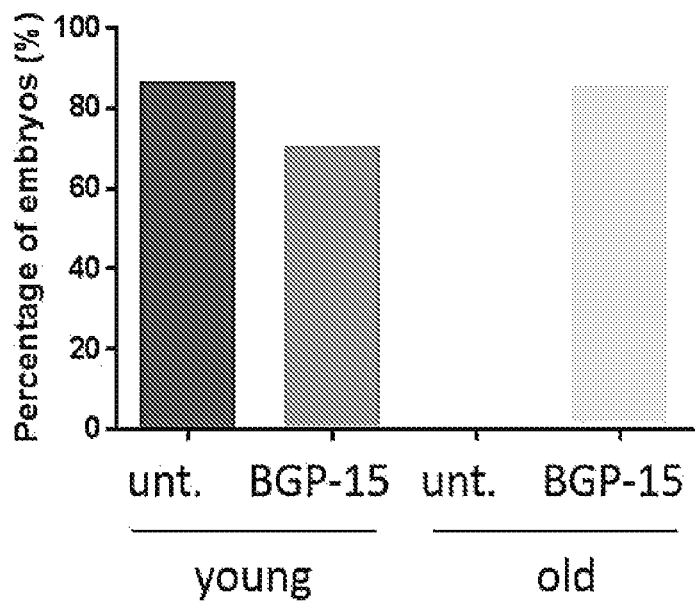
Figure 2:
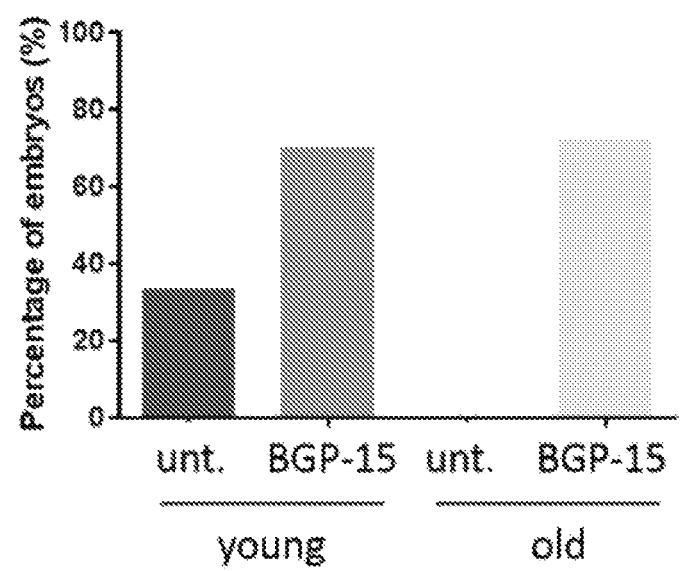

The data is shown in FIG. 2, which shows the effects of in vivo treatment with BGP-15 on restoring sperm function. Male mice that were 'young' (6 weeks old) or 'old' (1 year old) were 'untreated' or treated with BGP-15 (15 mg/kg) i.p once daily for 4 days. Approximately 12 h following the last injection sperm was collected from the epididymis and vas deferens and used for in vitro fertilization of oocytes from young female mice and development of putative zygotes was assessed: A) Percentage of putative zygotes that had completed cleavage 24 h post-IVF; B) Percentage of 2 cell embryos that completed blastocyst development by day 5; and C) Percentage of blastocysts that had initiated hatching. N=1 mouse per treatment group.

For the data relating to the percentage of zygotes to complete cleavage 24 hours post-IVF, there was greater than a 500% improvement in sperm from an aged donor to generate embryos that complete cleavage following treatment with BGP-15 compared to an untreated aged male. BGP-15 also increased the cleavage rate by 30% in sperm from a young treated donor compared to an untreated male.

For the data relating to the percentage of 2 cell embryos to complete blastocyst development by day 5, there was an extensive improvement in sperm from an aged donor to generate an embryo that completed blastocyst development following treatment with BGP-15 compared to an aged donor that received no treatment.

For the data relating to the percentage of blastocyst that initiated hatching, there was an extensive improvement in the ability of sperm from an aged donor to generate a hatching blastocyst following treatment with BGP-15 treatment. BGP-15 also increased blastocyst development to hatching in sperm from a young donor by greater than 100% compared to sperm from an untreated young donor.

Each developmental milestone was impaired in embryos that were conceived using sperm from old mice however each developmental parameter was improved by treating the 'old' mouse with BGP-15.

Example 3—Older Mice Produce Fewer Pregnancies, Smaller Offspring and Higher Neonatal Mortality Male mice were mated with naturally cycling females (1:1 ratio) to assess their fertility status. Females were checked for the presence of a vaginal copulatory plug 16-18 h after pairing, which indicated successful mating. Females were then separated from the males, and kept for approximately 3 weeks to check for signs of pregnancy or the appearance of litters. Male mice were classified as fertile (when they produced a pregnancy after confirmed mating) or subfertile (when they did not produce a pregnancy after confirmed mating). Pregnancies produced by fertile males were selected for further study of offspring phenotype. To analyze fetal development, pregnant females were humanely killed by cervical dislocation on embryonic day (E) 18.5 and the fetuses collected. Number of viable fetuses and their position in the uterine horns were recorded. Fetuses were separated from extra-embryonic tissues and washed in warm Phosphate Saline Buffer (PBS) at 37 C, then measured and weighed. Their placentas were also isolated, washed and weighed. To analyze newborn development, some of the pregnant females were allowed to give birth. On postnatal day (PND) 1, litter size and the number of viable newborn pups were recorded, as well as measured and weighed. The number of viable pups was recorded until weaning on PND21-24.

Figure 3:
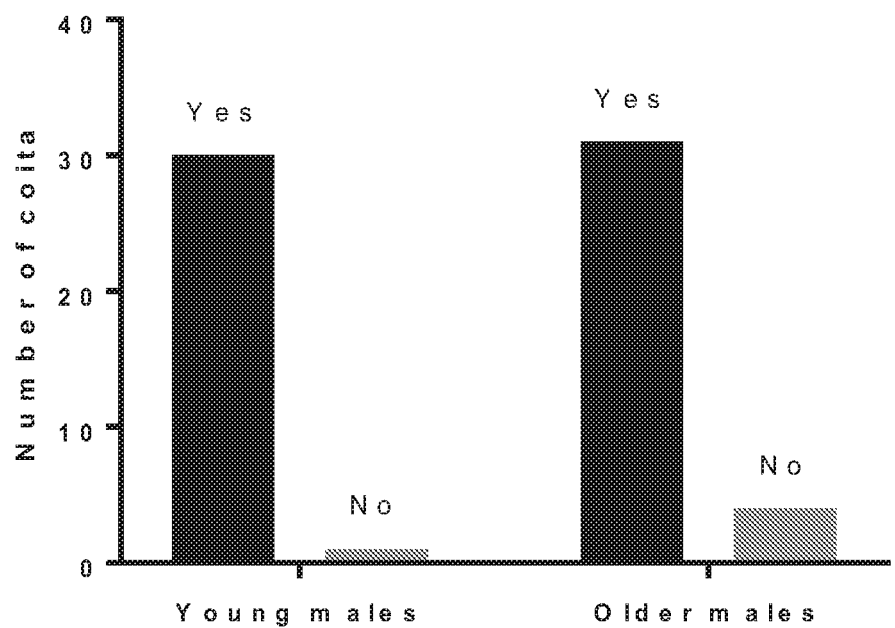
FIG. 3 shows old males produce fewer pregnancies. (A) Both young and older male mice were observed to have similar mating rates (number of coita) when paired with young (6-8 weeks old) females. (B) However, a significantly reduced number of pregnancies were observed on day 18.5 after coitus for older males, compared to young males. Data is shown as mean values. Statistical analysis was Fisher's exact Test (P=0.004; 95% CI 1.75, 19.14; N=25 (Young), 33 (Older) males.
Figure 3:
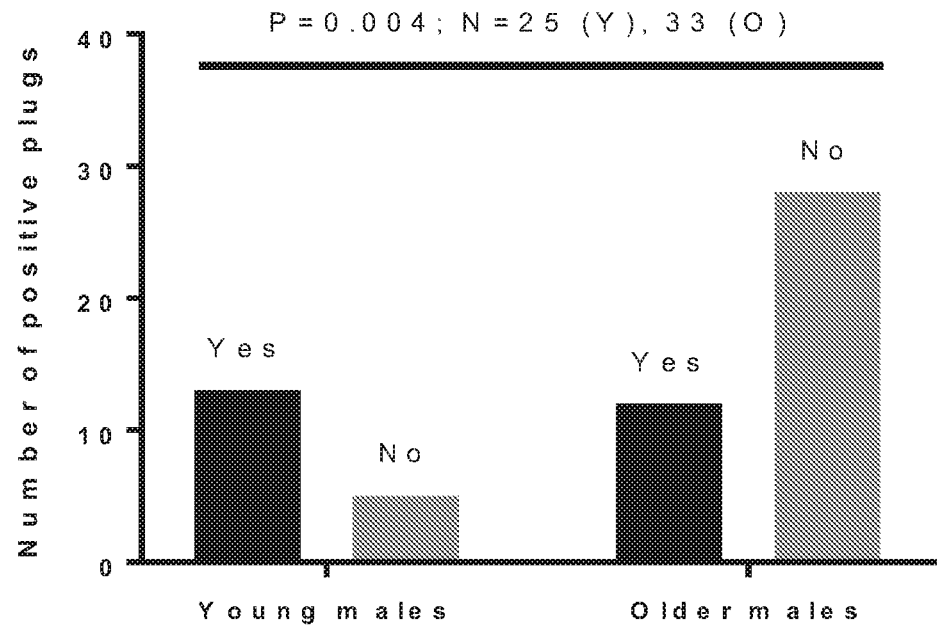

The results provided in FIG. 3 show that older male mice produce approximately 15% fewer pregnancies compared to young males (FIG. 3B), even though they had similar rates of successful mating (FIG. 3A).

Figure 4:
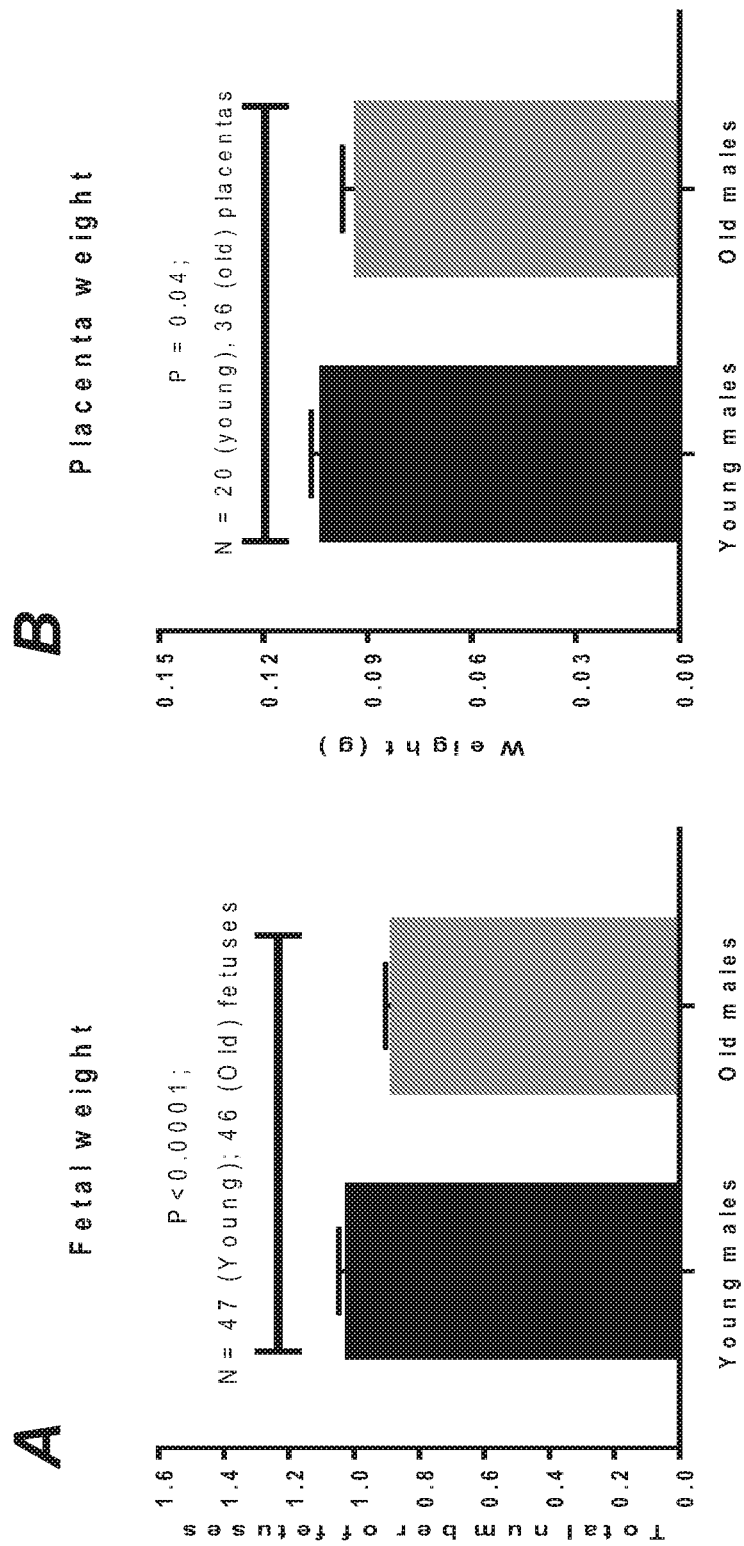
FIG. 4 shows old males sire smaller less health offspring. (A) Older male mice that produced a pregnancy were found to sire fetuses that were lighter that those from younger males on day 18.5 of embryonic development. (B) Fetuses from older males also had smaller placentas. (C) Older males sired newborn pups that were lighter on Postnatal Day 1 than those sired by younger males. (D) Offspring sired by older males experienced higher neonatal mortality rates (ie death before weaning on Postnatal Day 21), than those from younger males. Data is shown as mean values SEM. Statistical analysis was either Linear Mixed Model (A, B, C) or unpaired Student's T-test (D).
Figure 4:
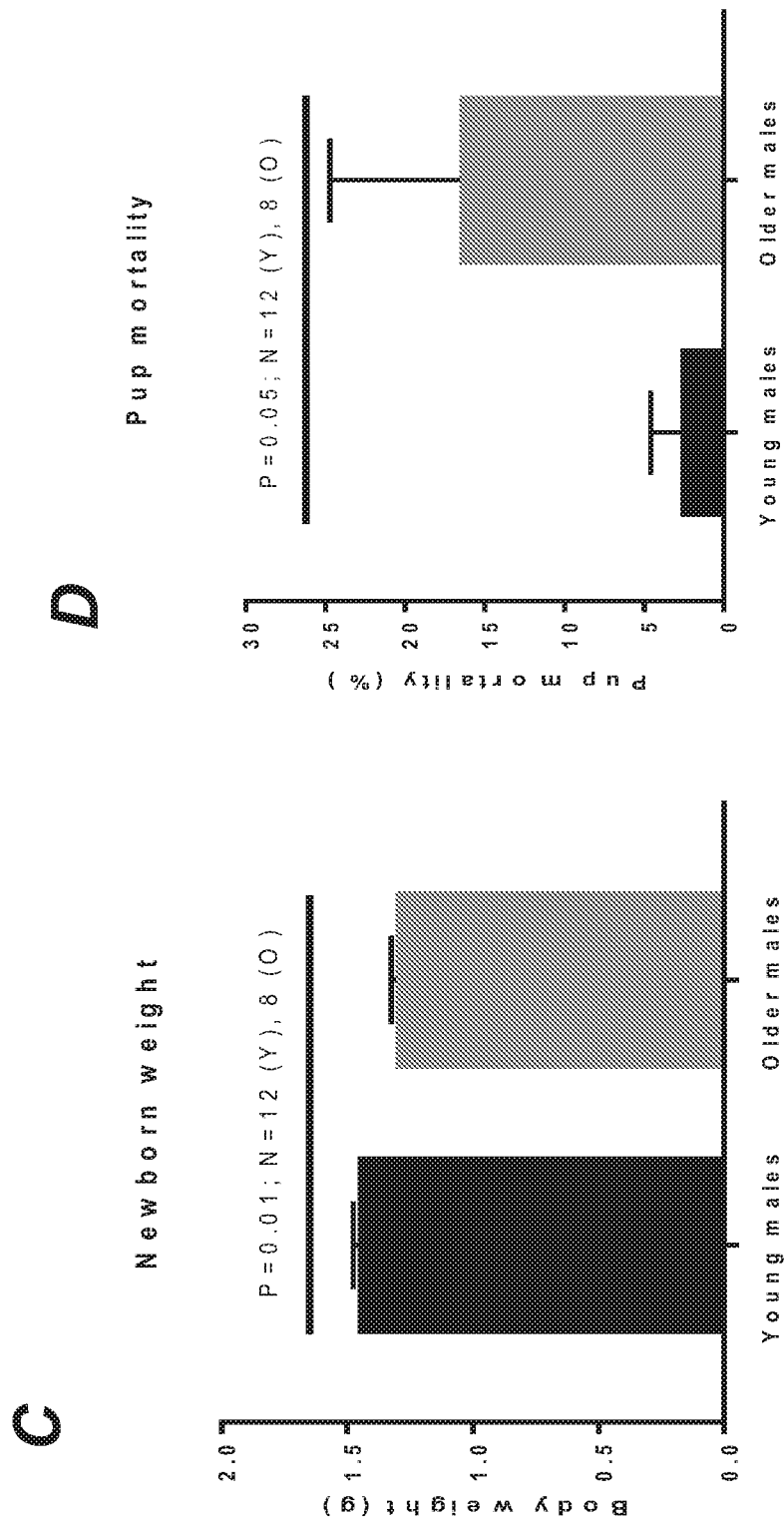

FIG. 4 shows that older mice have smaller offspring and higher neonatal mortality In pregnancies sired by older mice, fetuses were 0.14 g (10%) lighter on E18.5 (FIG. 4A) and placentas were 0.01 g lighter (10%) on E18.5 (FIG. 4B). In litters sired by older mice, newborn pups were 0.6 g lighter (FIG. 4C) and pup mortality before weaning was increased by 14% (FIG. 4D).

These studies show that the phenotype of older male mice mimics that of older men, namely that they have poor fertility and poor neonatal outcomes.

Example 4—In Vitro Treatment with BGP-15 Dies not Modify Sperm Count. Viability or Morphology but Improves Motility in Sperm from Older Males After fertility assessment (as described in the Methodology in Example 3), fertile young males (young controls) and subfertile older males were selected for this study.

Male mice were mated 4-7 days prior to collection of their semen for sperm analysis and in vitro production of embryos. Mice were humanely killed by cervical dislocation and both cauda epididymides and vasa deferentia were collected. One of each pair was placed at random in COOK Research vitro fertilization media K-RVFE-50 (COOK MEDICAL, QLD, Australia) either containing 10 uM BGP-15 or not. The content of the reproductive tracts, containing the seminal fluid and the spermatozoa, was then extracted into the media, and the tissue discarded. Spermatozoa were left to capacitate for 1 hour at 37° C./6% $CO_2$/5% $O_2$.

Sperm count, viability, morphology and motility were performed following the World Health Organization (WHO) guidelines (100 sperm counted for each sample). Sperm count was determined by counting on a haemocytometer (Neubauer Brightline, Livingstone International, NSW, Australia). Sperm viability was assessed blinded to treatment group on samples stained 1:1 with Eosin using a light microscope, classifying 100 sperm per group as either viable (unstained) or non-viable (stained). Viability was expressed as percentage of viable sperm. Sperm motility was assessed under a light microscope, classifying 100 sperm per group as either progressive motile, nonprogressive motile or immotile. Motility was then expressed as percent total motility (progressive and nonprogressive motile sperm) or percent forward motility (progressive motile sperm only). For the assessment of sperm morphology, 100 sperm per group were classified as normal or abnormal (tail or head defect). Morphology is expressed as percentage of morphologically normal sperm. All samples were assessed blinded to treatment group using a light microscope for each analysis.

Figure 5:
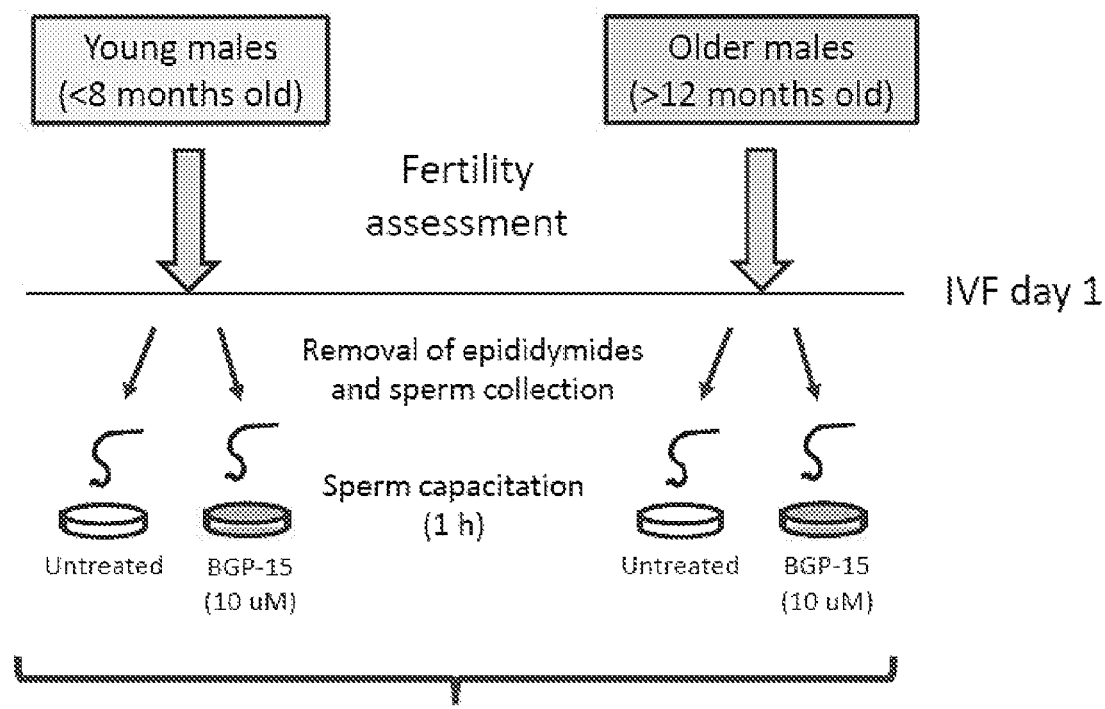
FIG. 5 shows in vitro treatment of sperm with BGP-15. Graphic representation of the experimental design. Ex-breeder male mice of proven fertility were acquired and aged until at least 12 months old; and then compared them to "young controls". Fertility was assessed by mating to naturally cycling young females. Young males that produced pregnancies (ie were fertile), and older males that failed to produce pregnancies (ie were subfertile), were selected as sperm donors for in vitro fertilization (IVF) and production of embryos. On the day of In vitro fertilization (IVF), sperm was collected, and half was treated with BGP-15 for 1 hour during sperm capacitation. Immediately prior to IVF, and aliquot was used for semen analysis and sperm quality assays, namely: sperm count, viability, morphology, motility (including progressive motility), mitochondrial activity and zona-pellucida binding capacity.

We next investigated whether male sperm parameters in aged mice can be improved with the treatment of either sperm prior to IVF, or of aged male mice prior to conception using BGP-15. The study protocol is shown in FIG. 5.

Figure 6:
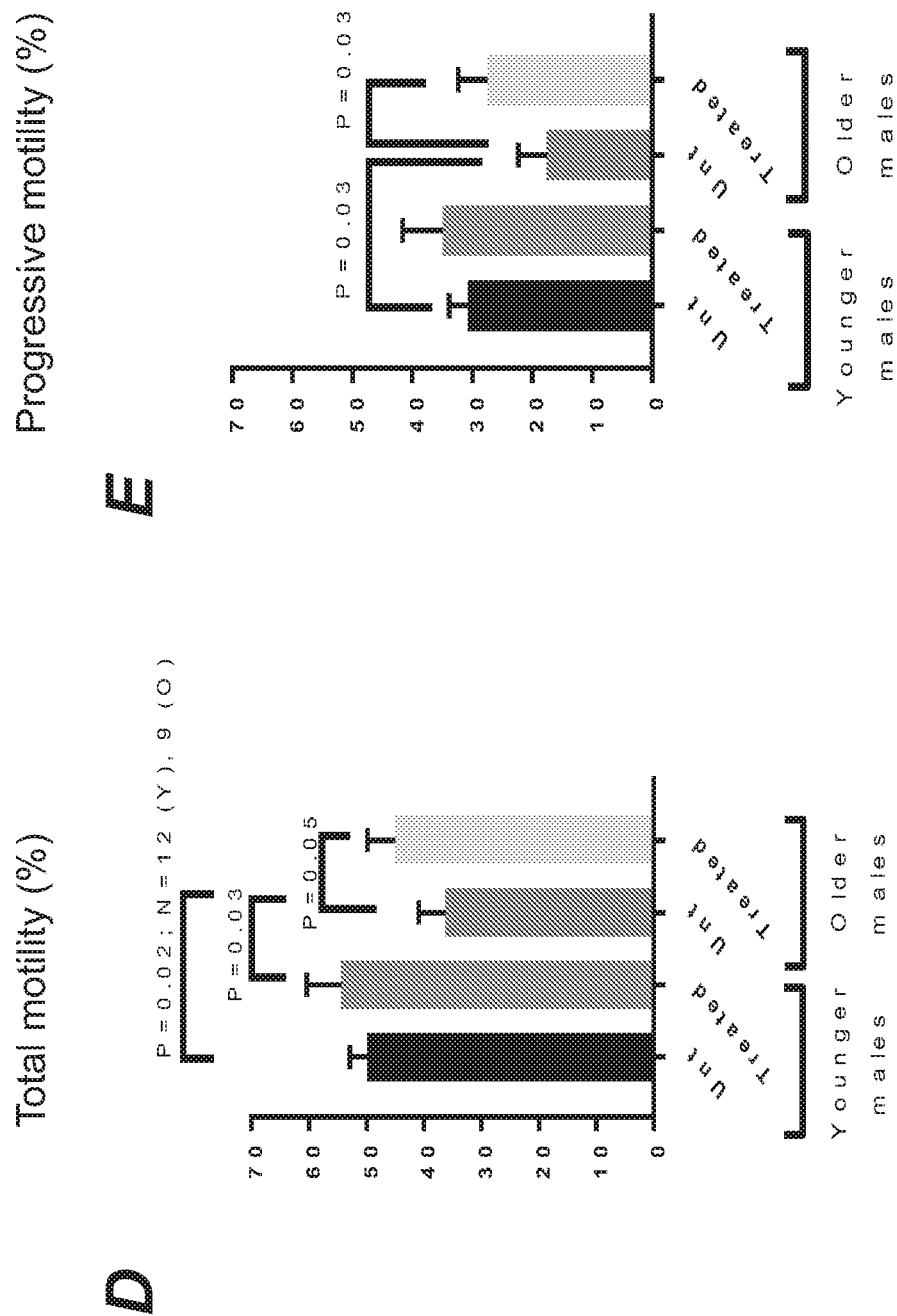
FIG. 6 shows BGP-15 increases sperm motility in older males. Analysis of semen solution after capacitation showed that older males presented lower sperm count (A), but normal rates of viable (B) and morphologically normal sperm (C). Total motility (D) and progressive motility (E) were also decreased. BGP-15 treatment did not have an effect on sperm count, viability or morphology, but increased both total (D) and progressive motility (E) in sperm from older males. Data is shown as mean values SEM. Statistical analysis was either paired (Young unt vs Young treated, Older unt vs Older treated) or unpaired (Young vs Older) Student's T-test.

The results are shown in FIG. 6. The analysis revealed that older males had significantly lower sperm count but similar viability and proportion of morphologically normal spermatozoa. Moreover, their motility was also significantly decreased. While in vitro treatment with BGP-15 did not modify sperm count, viability or morphology, treatment improved motility (both total motility and progressive motility) in sperm from older males by 10%.

Example 5—In Vitro BGP-15 Treatment Increases Sperm Mitochondrial Membrane Potential (MMP)

Sperm motility has been linked to mitochondrial function, therefore sperm Mitochondrial Membrane Potential (MMP) was examined using live cell fluorescent assays to identify and quantify individual viable cells with low MMP and high MMP by FACS using JC-1 potentiometer dye (1H-Benzimidazolium, 5,6-dichloro-2-[3-(5,6-dichloro-1,3-diethyl-1,3-dihydro-2H-benzimidazol-2-ylidene)-1-propenyl]-1,3-diethyl-, iodide, (E)-47729-63-5; ThermoFisher Scientific, MA, USA), according to the manufacturer's instructions. Briefly, approximately one million cells were incubated for 15 min at 37 C with 5 uM of JC-1 working solution in fertilization media. The cells were then washed and analyzed by flow cytometry. For all samples, the sperm population was gated on the basis of light scattering measurements. The viable sperm fraction was detected using Propidium Iodide (PI) live/dead stain (Sigma-Aldrich, MI, USA), a fluorescent dye that only penetrates dead cells. Flow cytometry acquisition for PI stained cells was performed through PE-Cy7 for red fluorescence (~617 nm); while acquisition for JC-1 stained cells was performed through FITC for green (~525 nm) and PE for red/orange fluorescence (~590). For each experiment, at least 10,000 cells were examined. All experiments were performed on FACSCANTO II Flow Cytometry System (BD Biosciences, NSW, Australia).

Next we sought to compare mitochondrial membrane potential in sperm from young and older mice, as MMP has been defined as a regulator of sperm motility and is linked to sperm quality and fertilization potential in both rodents and humans.

Figure 7:
FIG. 7 shows BGP-15 treatment increases sperm mitochondrial membrane potential (MMP) in older males. (A) Representative images of JC-1 stained sperm with either low MMP (top) or high MMP (bottom). (B) Flow cytometry analysis of JC-1 stained sperm. In older males, BGP-15 increases the percentage of live sperm showing high MMP (C). Data is shown as mean values SEM. Statistical analysis was either paired (Young unt vs Young treated, Older unt vs Older treated) or unpaired (Young vs Older) Student's T-test.
Figure 7:
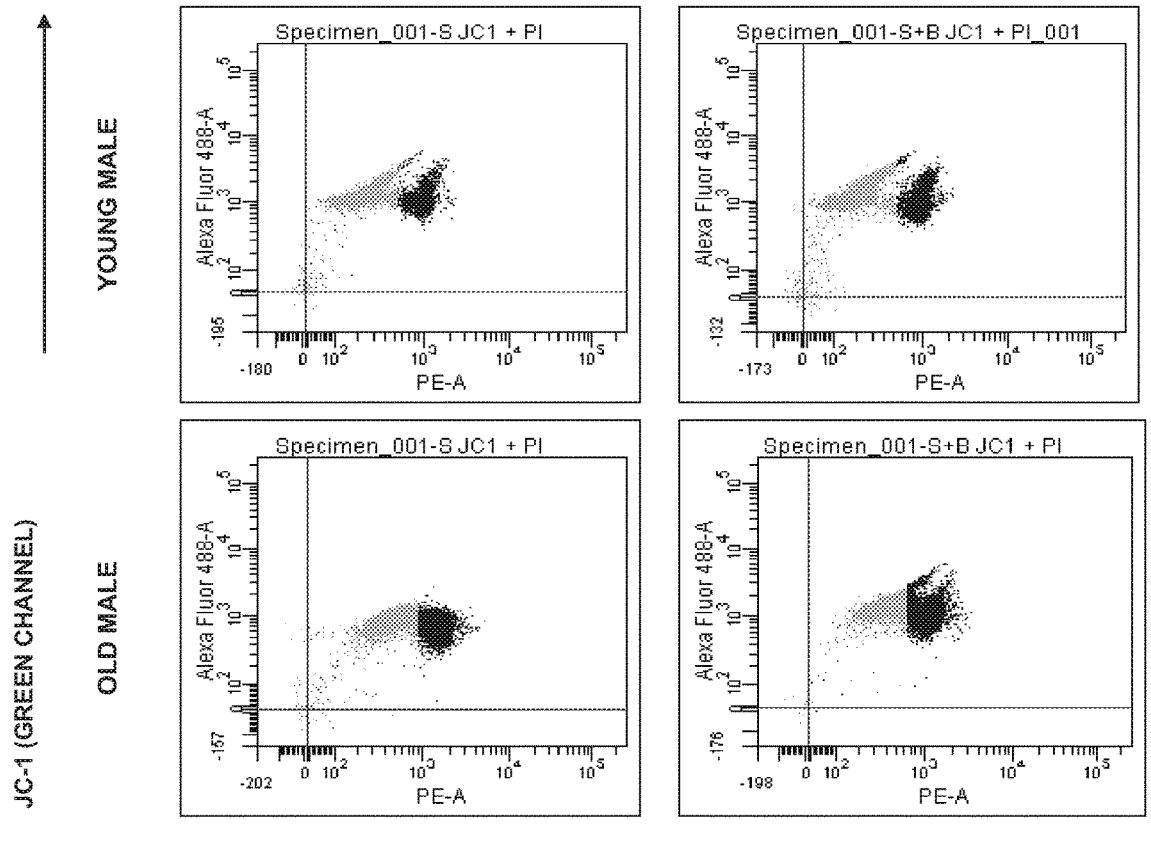
Figure 7:
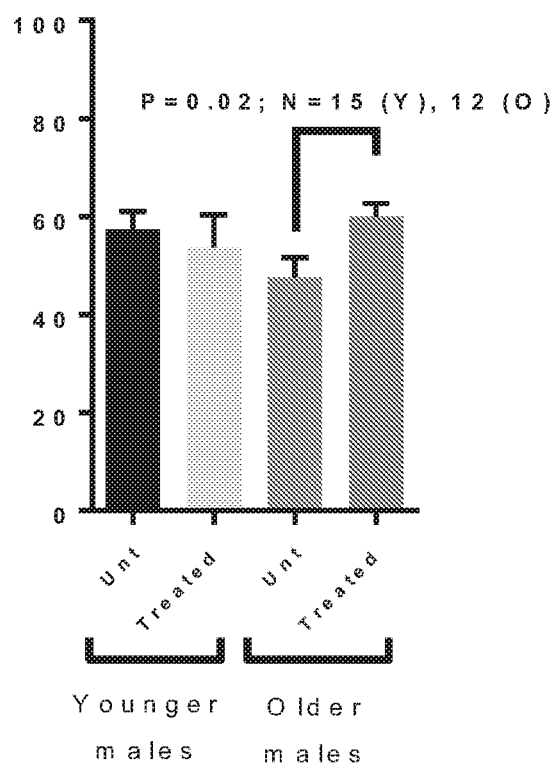

The results are shown in FIG. 7. An example of of sperm cells stained using JC-1 MMP dye, where high MMP is red (FIG. 7A). An example of flow cytometry analysis of sperm population showing those with low MMP in green and those with high MMP in blue is shown in FIG. 7B. We quantified the blue portions in a large number of males (FIG. 7C) and found that even though MMP levels were not different between male groups, it was significantly increased in sperm from older males after treatment, indicating that their increased motility is at least partially explained by higher MMP.

Example 6—Fewer Sperm from Older Males Bind to the Zona Pellucida

To assess the capacity of sperm to bind to the zona pellucida and to fertilize an oocyte, mature cumulus oocytes complexes (COCs) were collected from female C57BL mice at 6 weeks old at 15 hours following superovulation with an intraperitoneal injection of PMSG, followed 48 hours later by hCG. The COCs (N=10 per experimental male) were placed in 80 μL drops of COOK Research vitro fertilization media K-RVFE-50 (COOK MEDICAL, QLD, Australia) at 37° C./6% $CO_2$/5% $O_2$. The oocytes were inseminated with an aliquot of capacitated sperm samples either treated or not with BGP-15, and gametes co-incubated for 4 hours. At this point, sperm binding to the oocyte zona pellucida was assessed by incubation for 5 min in bisbenzimide DNA stain (25 μg/mL) followed by imaging under ultraviolet light. The number of spermatozoa bound to the zona pellucida was assessed by counting sperm nuclei.

Figure 8:
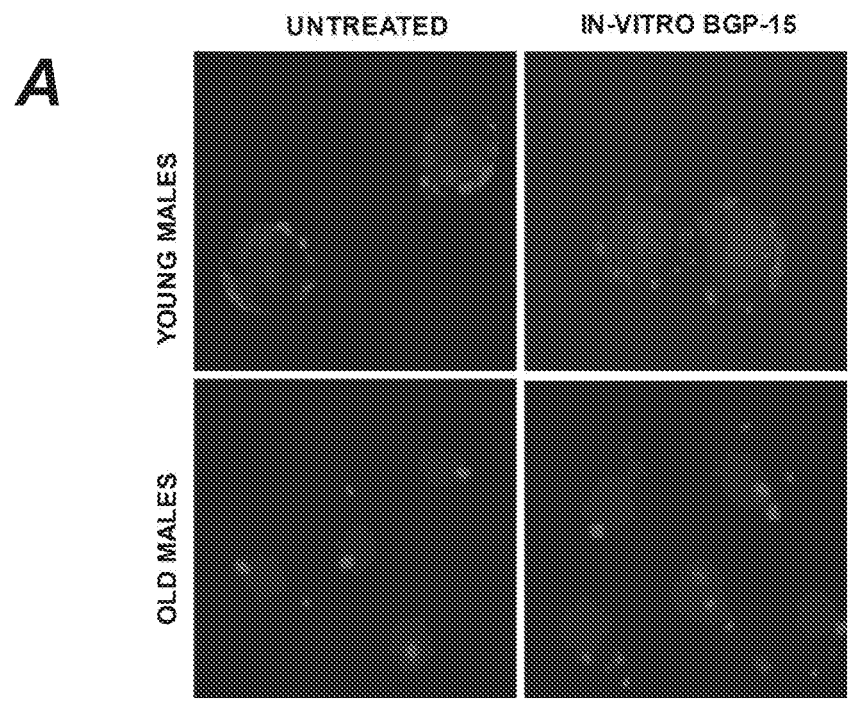
FIG. 8 shows BGP-15 improves zona pellucida-binding capacity in older males. Assessment of the zona pellucida-binding capacity of sperm using bisbenzamide DNA stain (A) showed fewer sperm from older males were bound to the zona pellucida of MII oocytes, but that these were increased by BGP-15 treatment (B). Data is shown as mean values SEM. Statistical analysis was either paired (Young unt vs Young treated, Older unt vs Older treated) or unpaired (Young vs Older) Student's T-test.
Figure 8:
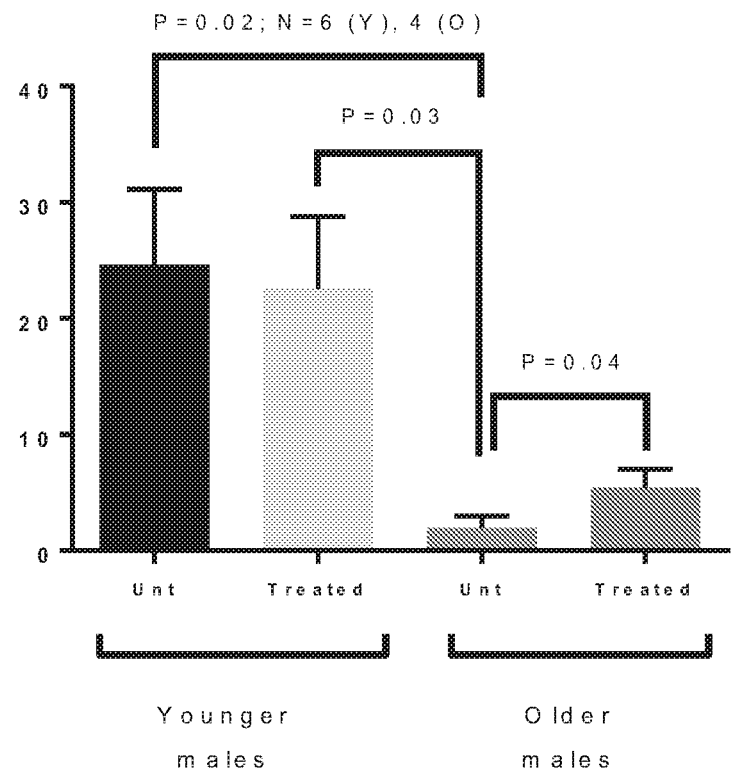

We next investigated the ability of sperm from older males to bind to the zona pellucida of MII oocytes from young females using bisbenzimide nuclear stain, as shown in these examples. The results are shown in FIG. 8.

We found that zona binding capacity was significantly reduced in older males, but also that it increased after treatment with BGP-15.

Example 7—BGP-15 Rescues Embryonic Development in Older Males

To collect oocytes for the in vitro production of embryos, female mice underwent hormonally-induced ovarian hyperstimulation. Briefly, animals received an intraperitoneal (IP) injection of Pregnant Mare Serum Gonadotropin (PMSG; National Hormone and Peptide Program, Torrence, USA) in sterile 0.9% saline at a dose of 5 IU/12 g of body weight; followed 48 hours later by a second IP injection of human chronic Gonadotropin (hCG; Pregnyl, Merck Sharp & Dohme Pty Ltd, Australia) in sterile 0.9% saline at a dose of 5 IU/12 g of body weight. The mice then were humanely killed by cervical dislocation at 14 hours post-hCG injection and the ovulated cumulus-oocyte complexes (COCs) were collected from the oviduct and used to produce embryos by in vitro fertilization. Briefly, COCs were washed twice in Research Vitro Wash Medium (COOK Medical, QLD, Australia), then placed in Research Vitro Fertilization Medium (COOK Medical) with sperm at 1:10 (10 ul:100 uL) concentration. Sperm samples had been previously collected from the epididymis and vas deferens and left to capacitate for 1 hour in Research Vitro Fertilization Medium at 37° C. in 6% $CO_2$, 5% $O_2$. After 4 hours, the presumptive zygotes were collected, washed and placed in Research Vitro Cleave medium (10 zygotes/20 uL drop; COOK Medical) for in-vitro embryo culture to blastocyst stage at 37° C. in 6% $CO_2$, 5% $O_2$. Zygotes were recorded by real-time imaging using the Primovision Time-lapse system (Vitrolife Pty Ltd, Boteborg, Sweden) for detailed analysis of their developmental milestones, including time interval between cell divisions and frequency of adverse events (uneven cell division, presence of multiple nuclei, blastocoel cavity collapse). Embryos from each individual male were kept separate throughout the analysis.

We have shown that sperm from older males present markers of low quality but that motility, mitochondrial activity and zona-binding capacity are improved by in vitro treatment with BGP-15. At the same time as the assessment of male fertility, a group of young females was hormonally stimulated and their cumulus-oocytes complexes collected. These COCs were inseminated using sperm from all treatment groups.

After incubation in the fertilization media for 4 hours, the presumed zygotes were assessed for the presence of pronuclei, and cultured in vitro for 5 days. Embryo development was recorded during this time using time-lapse imaging technology. Development was assessed on days 2 and 5 after IVF for 2-cell and blastocyst stages, respectively.

Figure 9:
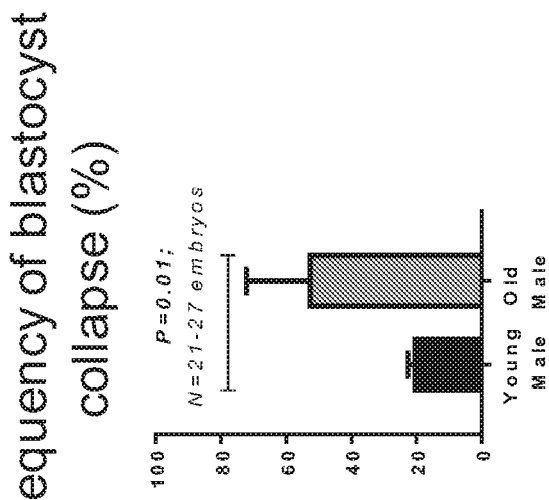
FIG. 9 shows older males have disrupted pre-implantation embryo development. Morphokinetic analysis of time-lapse imaging of pre-implantation embryos after IVF showed that older males had a longer time to 2-cell (A) and a higher frequency of blastocyst collapse (B), compared to younger males. Data is shown as mean values SEM. Statistical analysis was unpaired Student's T-test.
Figure 9:
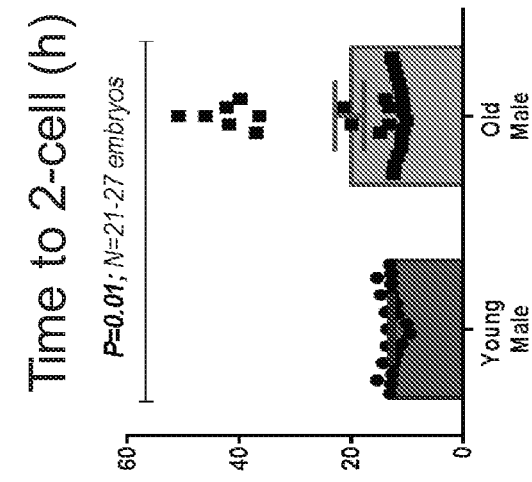

The results are shown in FIG. 9. Older male mice have disrupted pre-implantation embryo development, characterized by a delayed time to first cleave in fertilized embryos and a higher frequency of blastocyst collapse during expansion and before hatching.

Example 8—BGP-15 Rescues Embryonic Development in Older Males

To collect oocytes for the in vitro production of embryos, female mice underwent hormonally-induced ovarian hyperstimulation. Briefly, animals received an intraperitoneal (IP) injection of Pregnant Mare Serum Gonadotropin (PMSG; National Hormone and Peptide Program, Torrence, USA) in sterile 0.9% saline at a dose of 5 IU/12 g of body weight; followed 48 hours later by a second IP injection of human chronic Gonadotropin (hCG; Pregnyl, Merck Sharp & Dohme Pty Ltd, Australia) in sterile 0.9% saline at a dose of 5 IU/12 g of body weight. The mice then were humanely killed by cervical dislocation at 14 hours post-hCG injection and the ovulated cumulus-oocyte complexes (COCs) were collected from the oviduct and used to produce embryos by in vitro fertilization. Briefly, COCs were washed twice in Research Vitro Wash Medium (COOK Medical, QLD, Australia), then placed in Research Vitro Fertilization Medium (COOK Medical) with sperm at 1:10 (10 ul:100 uL) concentration. Sperm samples had been previously collected from the epididymis and vas deferens and left to capacitate for 1 hour in Research Vitro Fertilization Medium at 37° C. in 6% $CO_2$, 5% $O_2$. After 4 hours, the presumptive zygotes were collected, washed and placed in Research Vitro Cleave medium (10 zygotes/20 uL drop; COOK Medical) for in-vitro embryo culture to blastocyst stage at 37° C. in 6% $CO_2$, 5% $O_2$. On-time development of the embryos was analyzed by assessing their developmental stage on day 2 (first cleavage), and on day 5 (blastocyst formation and hatching status). Embryos from each individual male were kept separate throughout the analysis.

Figure 10:
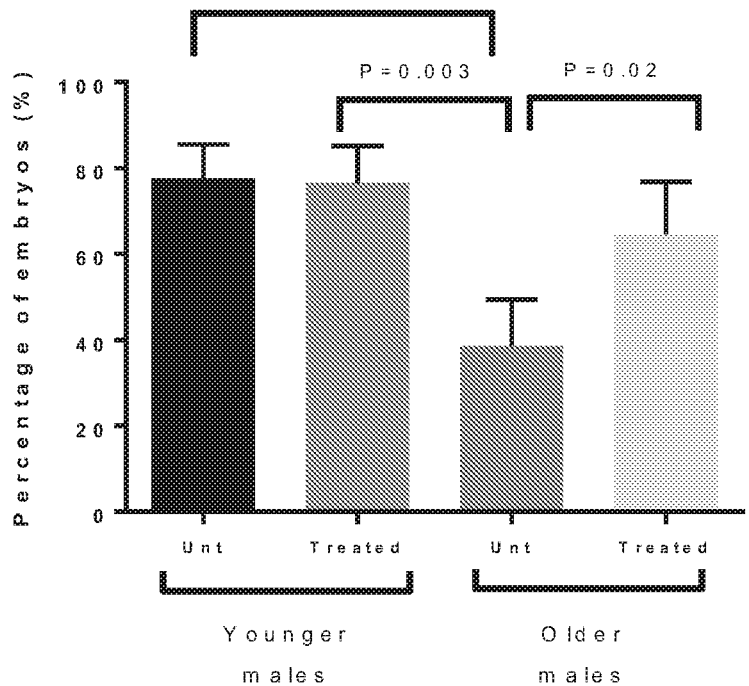
FIG. 10 shows pre-implantation embryos derived from older males present improved development after in vitro treatment of sperm with BGP-15. (A) Older males had a reduced percentage of putative zygotes that reached first cleave (2-cell) on day 2 after IVF (46 h post-hCG injection) compared to younger (untreated and treated) males; but 2-cell rates were improved when old sperm were treated with BGP-15. (B) Older males also showed a decrease in the percentage of 2-cell embryos that reached blastocyst stage on day 5 after IVF (112 h post-hCG injection), which was improved by BGP-15 treatment of sperm. (C) Hatching blastocyst rates on day 5 after IVF were reduced in blastocysts derived from older males but were improved by treatment of the sperm with BGP-15. Data is shown as mean values SEM. Statistical analysis was either paired (Young unt vs Young treated, Older unt vs Older treated) or unpaired (Young vs Older) Student's T-test.
Figure 10:
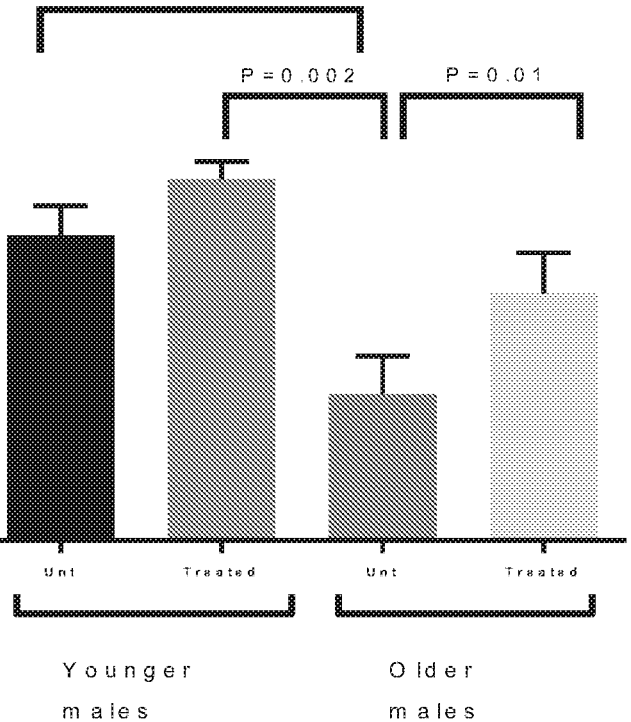
Figure 10:
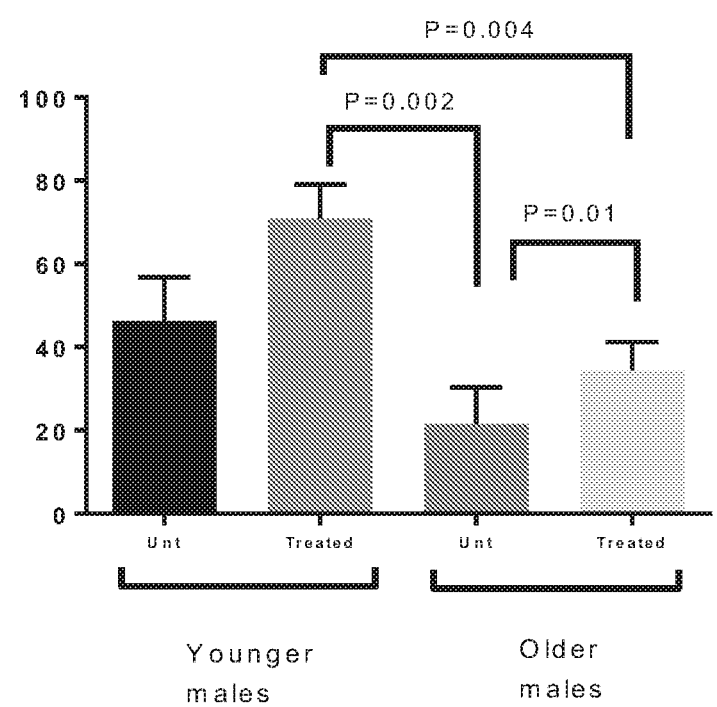

After IVF and in vitro culture, the percentage of 2-cell embryos on day 2 and blastocyst embryos on day 5 were decreased for older fathers. The results are shown in FIG. 10.

After BGP-15 treatment of the sperm during capacitation, the percentage of 2-cell embryos on day 2 and blastocyst and hatching blastocyst embryos on day 5 were improved for older fathers.

Example 9—In Vivo BGP-15 Improves Sperm Morphology and MMP in Older Males

In vitro treatment improved sperm quality and embryo development so next we tested if it would improve sperm quality and developmental competence when used in vivo.

Figure 11:
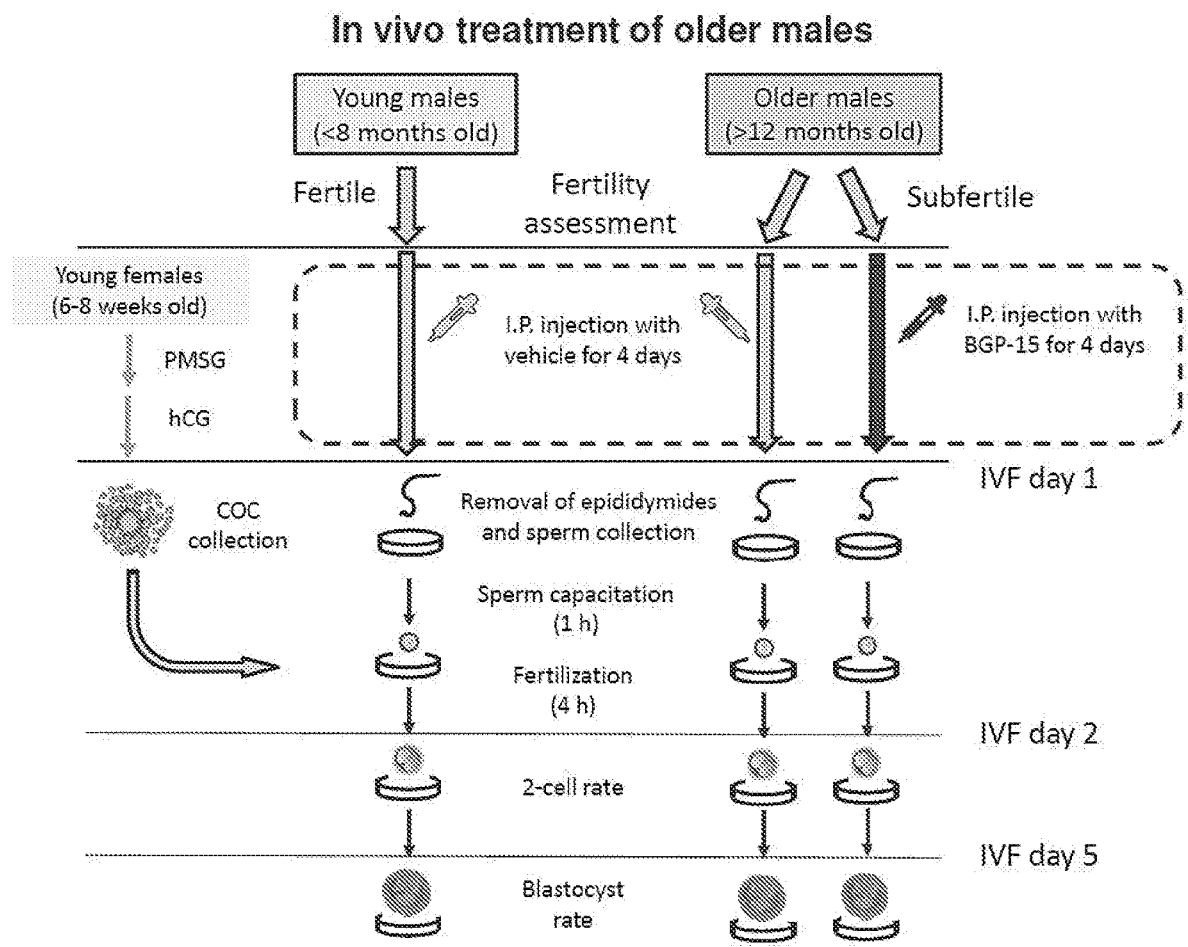
FIG. 11 shows in vivo treatment of male mice with BGP-15. Graphic representation of the experimental design. Ex-breeder male mice of proven fertility were acquired and aged until at least 12 months old; and then compared to "young controls". Fertility was assessed by mating with naturally cycling young females. Young males that produced pregnancies (ie were fertile), and older males that failed to produce pregnancies (ie were subfertile), were selected as sperm donors for in vitro fertilization (IVF) and production of embryos. Half of the males were given BGP-15 (15 mg/kg) by intraperitoneal injection (IP) daily for 4 days prior to IVF. At the same time as the assessment of male fertility, a group of young females was hormonally stimulated to ovulate, and their cumulus-oocytes complexes collected. These COCs were inseminated using sperm from all treatment groups. After incubation in the fertilization media for 4 hours, presumed zygotes were assessed for the presence of pronuclei and further cultured in vitro for 5 days. Development was assessed on day 2 and day 5 after IVF for 2-cell and blastocyst stages, respectively.

We next designed a similar experimental approach where we treated some of those older males that failed to produce a pregnancy with BGP-15 daily for 4 days prior to IVF. The protocol is shown in FIG. 11.

After fertility assessment (as described on the methodology in example 3), fertile young males (young controls) and subfertile older males were selected for this study.

Male mice were mated 5-7 days prior to their use as sperm donor for semen analysis and the in vitro production of embryos. Half of the older males received a daily intraperitoneal injection of BGP-15 at 15 mg/Kg for 4 days prior to semen collection. Mice were humanely killed by cervical dislocation and both cauda epididymides and vasa deferentia were collected, and placed in COOK Research vitro fertilization media K-RVFE-50 (COOK MEDICAL, QLD, Australia). The content of the reproductive tracts, containing the seminal fluid and the spermatozoa, was then extracted in the media, and the tissue removed. Spermatozoa were left to capacitate for 1 hour at 37° C./6% $CO_2$/5% 02.

Sperm count, viability, morphology and motility were performed following the World Health Organization (WHO) guidelines (100 sperm counted for each sample). Sperm count was determined by counting on a haemocytometer (Neubauer Brightline, Livingstone International, NSW, Australia). Sperm viability was assessed on blinded samples stained 1:1 with eosin under a light microscope, classifying 100 sperm per group as either viable or non-viable. Viability was expressed as percentage of viable sperm. Sperm motility was assessed under a light microscope, classifying 100 sperm per group as either progressive motile, nonprogressive motile or immotile. Motility was then expressed as percent total motility (progressive and nonprogressive motile sperm) or percent forward motility (progressive motile sperm only). For the assessment of sperm morphology, 100 sperm per group were classified as normal or abnormal (tail or head defect). Morphology is expressed as percentage of morphologically normal sperm. All samples were assessed blinded to treatment group under a light microscope for each analysis.

To collect oocytes for the in vitro production of embryos, female mice underwent hormonally-induced ovarian hyperstimulation. Briefly, animals received an intraperitoneal (IP) injection of Pregnant Mare Serum Gonadotropin (PMSG; National Hormone and Peptide Program, Torrence, USA) in sterile 0.9% saline at a dose of 5 IU/12 g of body weight; followed 48 hours later by a second IP injection of human chronic Gonadotropin (hCG; Pregnyl, Merck Sharp & Dohme Pty Ltd, Australia) in sterile 0.9% saline at a dose of 5 IU/12 g of body weight. The mice then were humanely killed by cervical dislocation at 14 hours post-hCG injection and the ovulated cumulus-oocyte complexes (COCs) were collected from the oviduct and used to produce embryos by in vitro fertilization. Briefly, COCs were washed twice in Research Vitro Wash Medium (COOK Medical, QLD, Australia), then placed in Research Vitro Fertilization Medium (COOK Medical) with sperm at 1:10 (10 ul:100 uL) concentration. Sperm samples had been previously collected from the epididymis and vas deferens and left to capacitate for 1 hour in Research Vitro Fertilization Medium at 37° C. in 6% $CO_2$, 5% $O_2$. After 4 hours, the presumptive zygotes were collected, washed and placed in Research Vitro Cleave medium (10 zygotes/20 uL drop; COOK Medical) for in-vitro embryo culture to blastocyst stage at 37° C. in 6% $CO_2$, 5% $O_2$. On-time development of the embryos was analyzed by assessing their developmental stage on day 2 (first cleavage), and on day 5 (blastocyst formation and hatching status).

Membrane Potential (MMP) was examined using live cell fluorescent assays to identify and quantify individual viable cells with low and high MMP by FACS using JC-1 potentiometric dye (1H-Benzimidazolium, 5,6-dichloro-2-[3-(5, 6-dichloro-1,3-diethyl-1,3-dihydro-2H-benzimidazol-2-ylidene)-1-propenyl]-1,3-diethyl-, iodide, (E)-47729-63-5; ThermoFisher Scientific, MA, USA), according to the manufacturer's instructions. Briefly, approximately one million cells were incubated for 15 min at 37 C with 5 uM of JC-1 working solution in fertilization media. The cells were then washed and analyzed by flow cytometry. For all samples, the sperm population was gated on the basis of light scattering measurements. The viable sperm fraction was detected using Propidium Iodide (PI) live/dead stain (Sigma-Aldrich, MI, USA), a fluorescent dye that only penetrates dead cells. Flow cytometry acquisition for PI stained cells was performed through PE-Cy7 for red fluorescence (~617 nm); while acquisition for JC-1 stained cells was performed through FITC for green (~525 nm) and PE for red/orange fluorescence (~590). For each experiment, at least 10,000 cells were examined. All experiments were performed on FACSCANTO II Flow Cytometry System (BD Biosciences, NSW, Australia).

Figure 12:
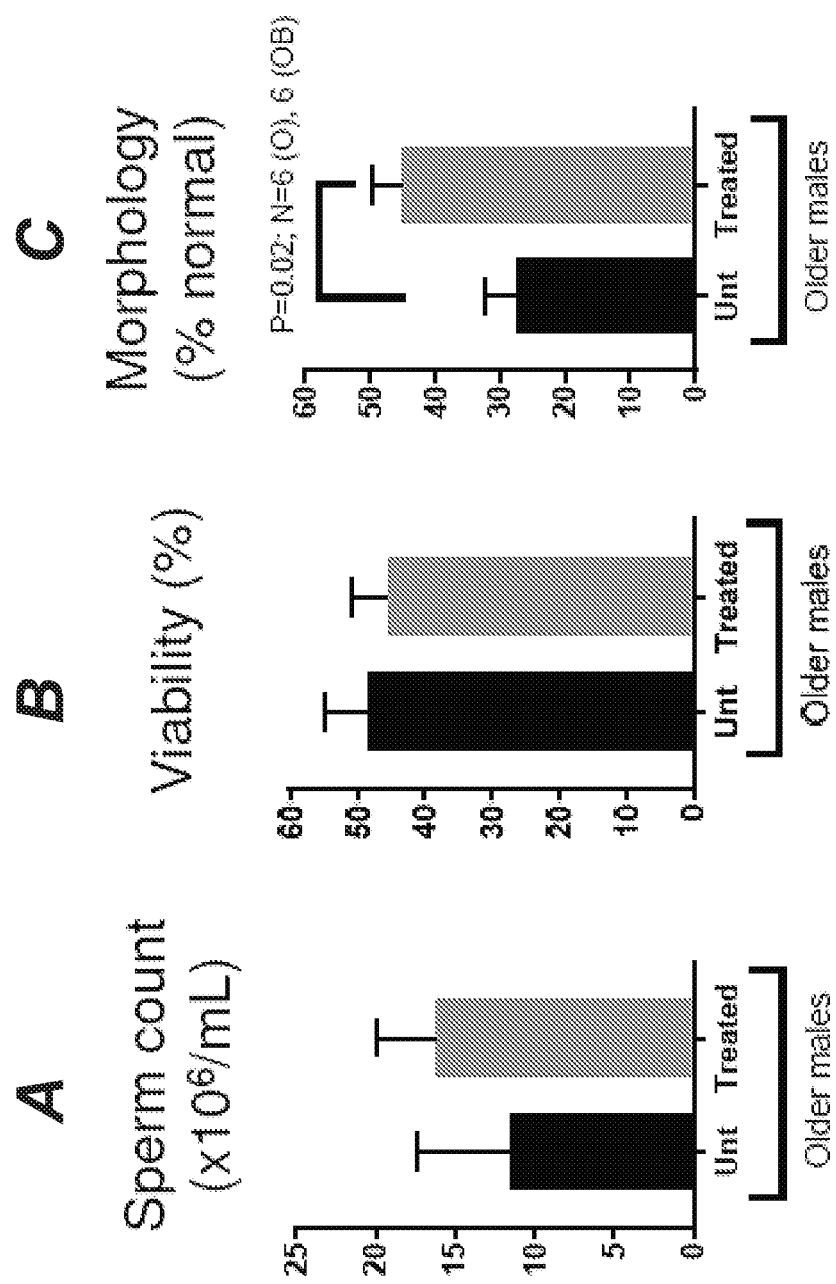
FIG. 12 shows BGP-15 improves sperm morphology and mitochondrial membrane potential (MMP) in sperm from older males. In vivo treatment with BGP-15 did not significantly affect sperm count (A), viability (B) or motility (D, E) in older males but, surprisingly, it increased the proportion of morphologically normal sperm (C) as well as the sperm population with high MMP (F). Data is shown as mean values SEM. Statistical analysis was unpaired Student's T-test.
Figure 12:
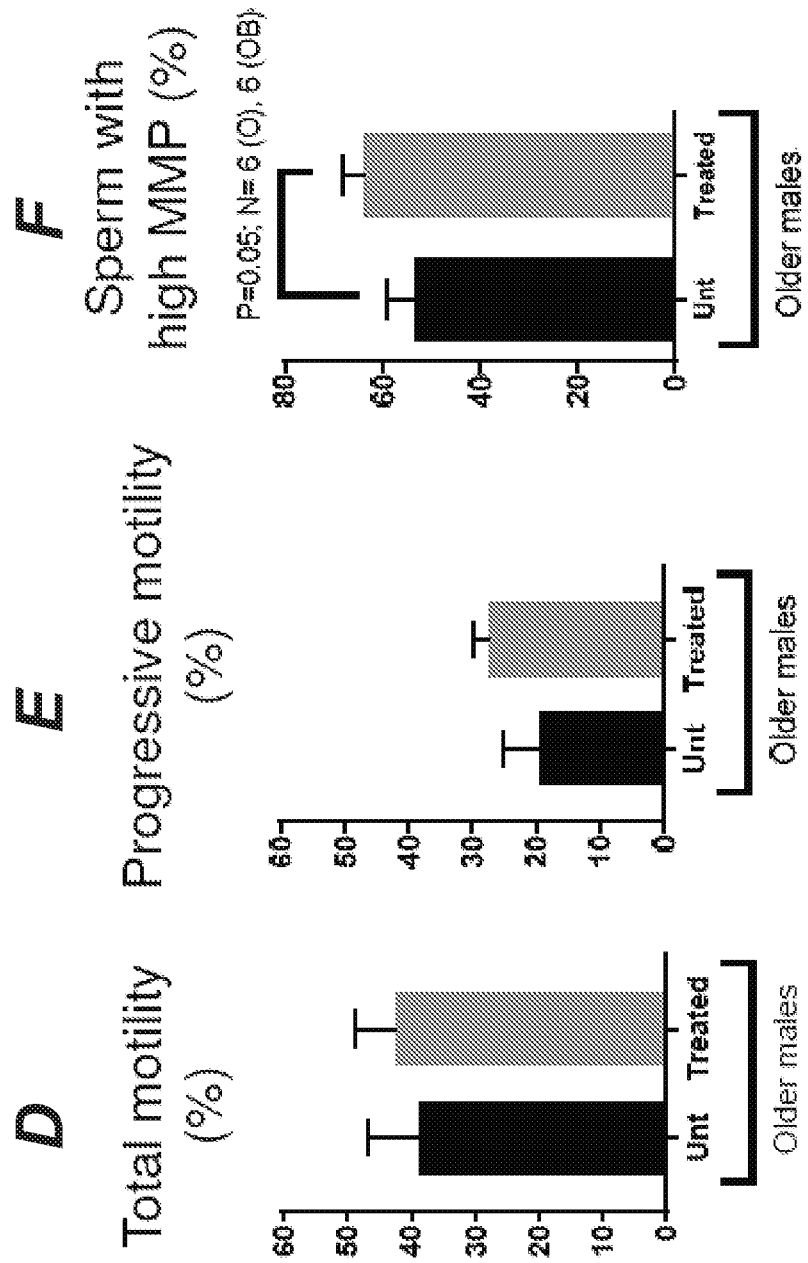

The results are shown in FIG. 12. In vivo treatment with BGP-15 did not significantly affect sperm count, viability or motility in older males but, surprisingly, it increased the proportion of morphologically normal sperm, suggesting that it may be affecting spermiogenesis. And it also increased the sperm population with high MMP.

Figure 13:
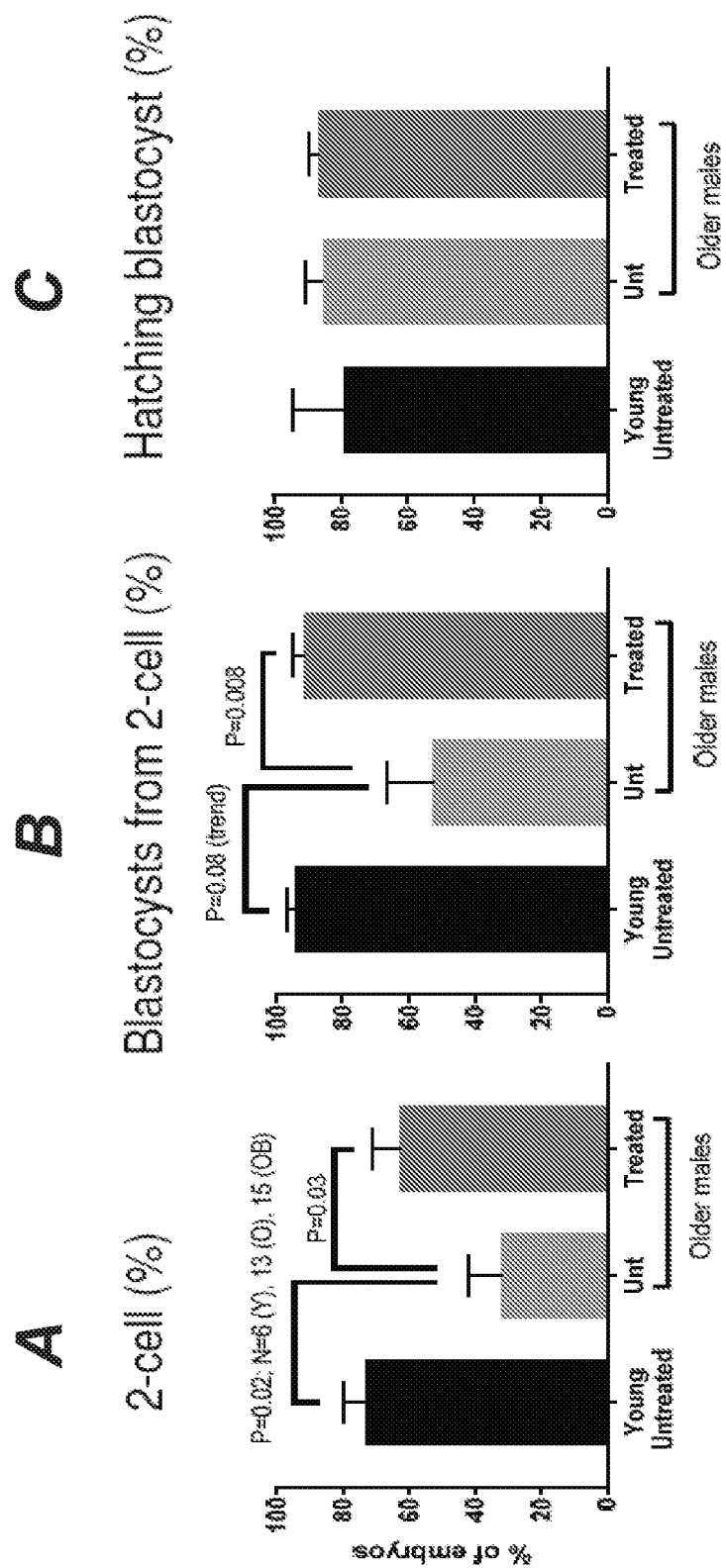
FIG. 13 shows improved pre-implantation embryo development after in vivo treatment of older males with BGP-15. (A) Untreated older males had a reduced percentage of putative zygotes that reached first cleave (2-cell) on day 2 after IVF (46 h post-hCG injection) compared to untreated, young males, but 2-cell rates were improved in older males treated with BGP-15. (B) Untreated older males also showed a decrease in the percentage of 2-cell embryos that reached blastocyst stage on day 5 after IVF (112 h post-hCG injection), which was also improved in those that received BGP-15 treatment. (C) Hatching rates on day 5 after IVF were similar across all groups. Data is shown as mean values SEM. Statistical analysis was unpaired Student's T-test.

We also found that treatment prior to IVF rescued embryo development in older males to levels similar to young males. Development of 2-cell embryos and blastocysts of older males was increased to levels identical to those of embryos from young male mice. This finding indicates that in vivo treatment with BGP-15 can potentially restore reproductive potential in older males (FIG. 13).

In conclusion, we show that age negatively impacts sperm quality and developmental potential, and these are associated with failure to produce a pregnancy in older mice. However, treatment with BGP-15 improves sperm quality and rescues embryo development after IVF, indicating that it could be a potential therapy to treat age-related infertility or other types of male subfertility.

Example 10—Treatment with BGP-15 In Vitro on Human Sperm

Male patients at Fertility SA (South Australia) consented to donate semen samples that were excess to their treatment. These discarded samples were used to test the effect of BGP-15 on human sperm. Sample volume, sperm count, viability, morphology and motility were performed following the World Health Organization (WHO) guidelines (100 sperm counted for each sample for each test). Sperm was diluted 1:20 in sperm diluting fluid, then 10 uL was used to count the number of sperm per mL using a haemocytometer (Neubauer Brightline, Livingstone International, NSW, Australia). Sperm viability was assessed, blinded to treatment group, on samples stained 1:1 with eosin under a light microscope, classifying 100 sperm per group as either viable (non-stained) or non-viable (stained). Viability was expressed as percentage of total sperm. Sperm motility was assessed under a light microscope, classifying 100 sperm per group as either progressive motile, nonprogressive motile or immotile. Motility was then expressed as percent total motility (progressive and nonprogressive motile sperm) or percent forward motility (progressive motile sperm only). For the assessment of sperm morphology, 100 sperm per group were classified as normal or abnormal (tail or head defect). Morphology is expressed as percentage of morphologically normal sperm. All samples were assessed blinded to treatment group using a light microscope for each analysis.

Human semen samples were aliquoted into two, and one half remained intact (neat semen) while the other half was centrifuge washed (washed sperm). Washing was in the cell medium Biggers, Whitten and Whittingham (BWW) containing 1 mg/ml polyvinyl alcohol (PVA) with an osmolarity between 290-310 mOsmo/kg, at 500 g for 10 minutes to remove any seminal plasma. The pellet containing the sperm cells was gently resuspended in 1 mL of warm BWW/PVA media. Sperm count, viability and motility were assessed as described previously. After this, both neat and washed samples were further divided in half and either treated or not with 10 uM BGP-15. Following a 30 minute incubation, cells were washed in BWW/PVA then split into the following assays: MitoSox Red (MSR), Membrane Potential (JC-1 and TMRM), 8-oxoguanine (8OHdG), Chromomycin A3 (CMA3) and Sperm Chromatin Dispersion Test (SCD/Halo), which are further described below.

Flow cytometry analyses were conducted on a FACS-Canto II Flow cytometer (Becton Dickinson, CA) with a 488 nm argon laser. Forward scatter and side scatter measurements were taken to generate a scatter plot, which was used to gate for sperm cells only, excluding any contaminating cells or debris. A total of 10,000 events were recorded for each sample. All data was analyzed using BD FACSDiva Software (Becton Dickinson).

Materials: MitoSox Red (#M36008), SYTOX Green Nucleic Acid Stain (#S7020), Live/Dead Fixable Far red dead cell stain kit (#L10120), JC-1 (T3168) and Alexa Fluor 488 Goat anti Mouse IgG (#A11001) are from Life Technologies, now Thermo Fisher (Waltham, Mass., USA).

DNA/RNA Damage Antibody (NB110-96878) is sourced from Novus Biologicals (Littleton, Colo., USA) and Chromomycin A3 (#230752) is from Calbiochem, now Merck Millipore (Burlington, Mass., USA). DAPI (#D9542), Tetramethylrhodamine methyl ester perchlorate (#T5428) and BWW media reagents are from Sigma Aldrich (Sigma Chemical Co., St. Louis, Mo., USA).

Mitochondrial ROS production assay (Mitosox Red): Cells were stained with MitoSOX Red (MSR) (2 µM) and Sytox Green (0.05 µM) for 15 minutes at 37° C., protected from light. This was followed by centrifugation at 500 g for 5 minutes and resuspension in BWW/PVA for flow cytometry analysis.

Mitochondrial Membrane Potential (MMP) assay (JC-1): Cells were stained with JC-1 (2 uM) and with Live/Dead Fixable Far red dead cell stain kit for 15 minutes at 37° C., shielded from light. This was followed by centrifugation at 500 g for 5 minutes and resuspension in BWW/PVA for flow cytometry analysis.

Mitochondrial Membrane Potential (MMP) assay (TMRM): Cells were stained with Tetramethylrhodamine methyl ester perchlorate (TMRM) (25 nM) and the vitality stain Sytox Green (0.05 M) for 30 minutes at 37° C., in the dark. This was followed by centrifugation at 500 g for 5 minutes and resuspension in BWW/PVA for flow cytometry analysis.

DNA damage assay (8OHdG): Cells were centrifuged at 500 g and resuspended into decondensation buffer (2 mM DL-Dithiothreitol and 0.5% Triton X-100 in PBS) for 10 minutes at room temperature. Cells were fixed in 4% paraformaldehyde for 15 minutes at 4° C. Cells were then blocked using 1.5% goat serum/PBS for 1 hour at room temperature and then incubated with DNA/RNA Damage Antibody (Novus Biologicals, NB110-96878) overnight at 4° C. Secondary antibody was Goat a Mouse coupled to Alexa Fluor 488 dye. Cells were counted under a fluorescent microscope as positive or not positive for 8OHdG staining.

DNA damage assay (CMA3): Human spermatozoa were fixed in 2% paraformaldehyde for 15 minutes at 4° C. Cells were centrifuged at 500 g and permeabilsed with 0.2% triton for 15 minutes at room temperature. Cells were centrifuged at 500 g for 5 minutes and the cell pellet was resuspended into Mc'Ilvaines buffer (18 mL of 0.1 mol/L citric acid mixed with 82 mL of 0.2 mol/L Na2HPO4 and 10 mmol/L MgCl2, pH 7.0). The CMA3 was dissolved in Mc'Ilvaines buffer to a concentration of 0.25 mg/mL. The chromatin of sperm cells was labelled by incubating with CMA3 for 20 minutes in the dark at room temperature. Cells were washed with Mc'Ilvaines buffer by centrifuging at 500 g for 5 minutes and resuspending the cell pellet in Mc'Ilvaines buffer before counting labelled cells with a fluorescent microscope.

DNA damage assay (HALO): Human spermatozoa were frozen in liquid nitrogen and thawed at room temperature. Cells were mixed with 1% low melting agarose to a final concentration of agarose 0.7% at 37° C. The cell-agarose mixture was put on to a slide pre-coated with 0.65% standard agarose. Slides were solidified at 4° C. for 4 minutes. Coverslip was carefully removed and slide placed horizontally in acid denaturation solution (0.08 N HCL) for 7 minutes at room temperature. Slides were then incubated in a neutralizing and lysing solution 1 (0.4 M Tris, 0.8 M DTT, 1% SDS, and 50 mM EDTA, pH 7) for 10 minutes at room temperature, then into neutralizing and lysing solution 2 (0.4 M Tris, 2 M NaCl, and 1% SDS, pH 7.5) for 5 minutes at room temperature. Slides were then washed in Tris-borate-EDTA buffer (0.09 M Tris-borate and 0.002 M EDTA, pH 7.5) for 2 minutes, dehydrated in 70%, 90%, and 100% ethanol for 2 minutes each at room temperature and air dried. Slides were stained with DAPI (1/2000) for 10 minutes at room temperature. Slides were counted under a fluorescent microscope for 'halo' or 'no halo'.

The characteristics of the neat semen samples of the subjects used for analysis are shown in Table 1.

TABLE 1

|  | Number | Age (yrs) | | Volume (mL) | | Count ($\times 10^6$ sperm/mL) | | Motility (%) | | Viability (%) | | Morphology (%) | |
|---|---|---|---|---|---|---|---|---|---|---|---|---|---|
|  |  | Mean | SD | Mean | SD | Mean | SD | Mean | SD | Mean | SD | Mean | SD |
| Total | 35 | 38.1 | 6.4 | 1.5 | 1.0 | 115.8 | 84.4 | 64.9 | 14.7 | 75.0 | 14.5 | 24.1 | 10.6 |

Figure 14:
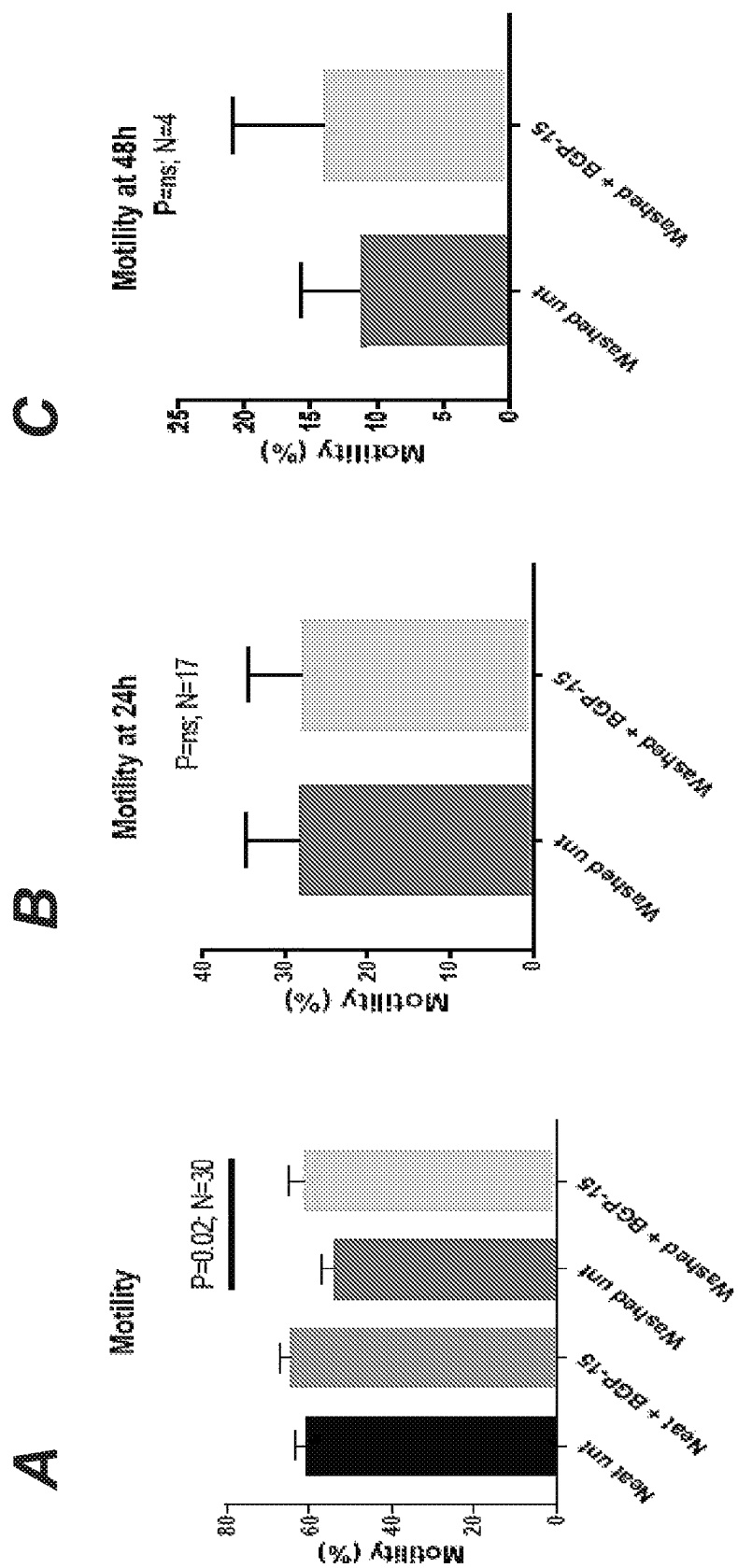
FIG. 14 shows BGP-15 increases motility in human sperm. (A) While BGP-15 treatment for 30 minutes had no effect on the motility of sperm from neat semen samples (containing seminal plasma), it increased motility of sperm from washed samples (seminal plasma removed) from the same donor. There was no effect of BGP-15 treatment on sperm motility from washed samples at 24 (B) or 48 (C) hours. Vitality (or membrane impermeability) was not affected by BGP-15 treatment of sperm from neat samples but vitality was decreased in sperm from washed samples from the same donor, following 30 minutes of BGP-15 treatment (D). There was no effect of BGP-15 treatment on sperm vitality from washed samples at 24 (E) or 48 (F) hours. Data is shown as mean values SEM. Statistical analysis was paired Student's T-test.
Figure 14:
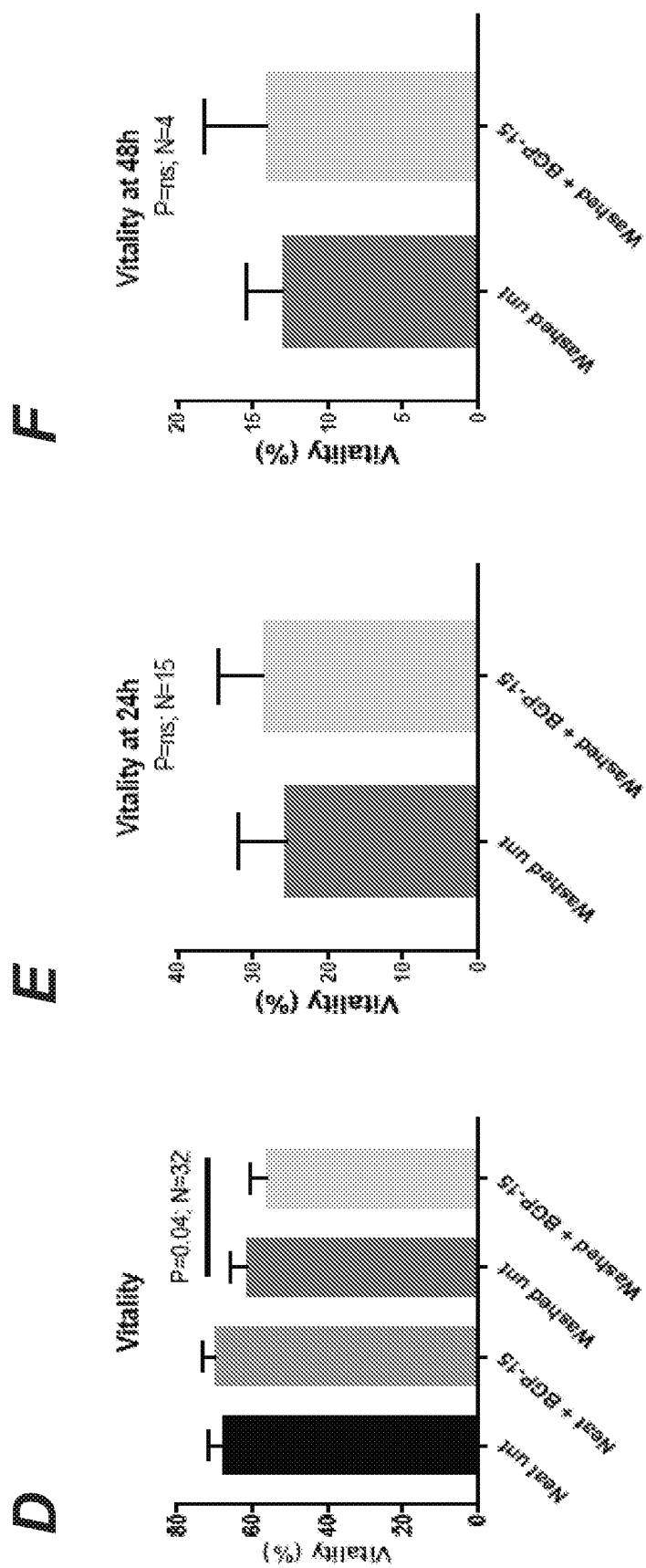

The results are shown in FIG. 14. As can be seen BGP-15 increased motility in washed sperm by 7.8%

No effect was observed on the mitochondrial profile, including ROS (data not shown).

Table 2 shows the characteristics of the neat semen samples of the subjects used for analysis based on age.

TABLE 2

|  | Number | Age (yrs) | | Volume (mL) | | Count ($\times 10^6$ sperm/mL) | | Motility (%) | | Viability (%) | | Morphology (%) | |
|---|---|---|---|---|---|---|---|---|---|---|---|---|---|
|  |  | Mean | SD | Mean | SD | Mean | SD | Mean | SD | Mean | SD | Mean | SD |
| Total | 35 | 38.1 | 6.4 | 1.5 | 1.0 | 115.8 | 84.4 | 64.9 | 14.7 | 75.0 | 14.5 | 24.1 | 10.6 |
| Men <40 years old | 19 | 34.4 | 2.6 | 1.3 | 0.8 | 114.4 | 99.6 | 67.4 | 14.7 | 80.7 | 8.6 | 19.6 | 10.8 |
| Men >40 years old | 11 | 44.5 | 3.5 | 1.5 | 1.0 | 117.0 | 70.0 | 60.2 | 15.9 | 67.5 | 16.9 | 28.4 | 7.4 |
| P (men <40 vs >40 yrs old) | | <0.0001 | | 0.5 | | 0.9 | | 0.2 | | 0.01 | | 0.02 | |
| Sig. | | **** | | ns | | ns | | ns | | * | | ns | |

As can be seen, 13.2% reduced sperm viability in neat semen samples from men over 40 years old.

Figure 15:
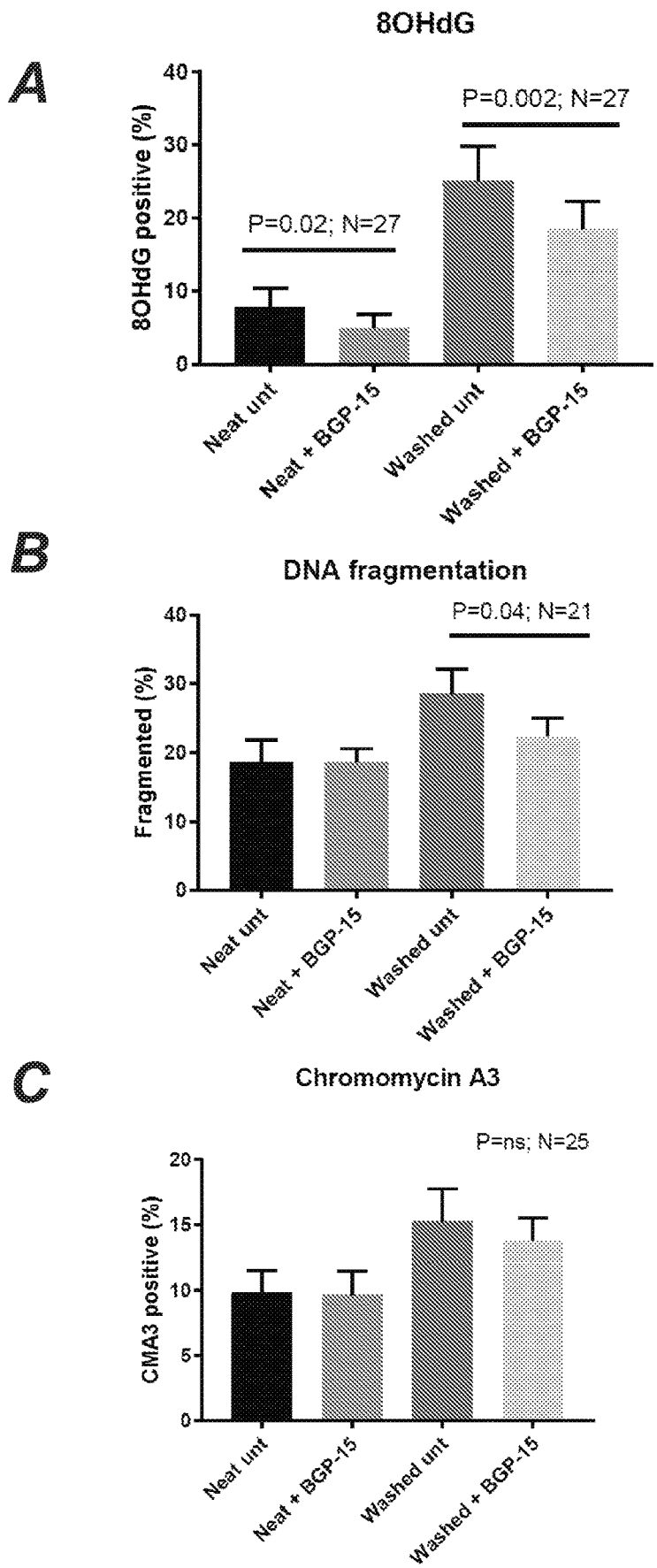
FIG. 15 shows BGP-15 reduces DNA damage in human sperm. (A) Quantification of the DNA oxidation damage marker 8-Oxo-2'-deoxyguanosine (8OHdG) in untreated and treated samples showed that washing increased sperm 8OHdG levels but that this was reduced after BGP-15 treatment for 30 minutes in sperm from both neat and washed samples from the same donor. (B) Quantification of DNA fragmentation by HALO assay using DAPI DNA stain showed that washing increased sperm DNA fragmentation that was reduced by BGP-15 treatment. (C) Quantification of chromatin structural damage marker Chromomycin A3 (CMA3) showed that while washing increased sperm CMA3 levels, there was no effect of BGP-15. DNA damage analysis at 24 and 48 hours showed no effect of BGP-15 treatment on sperm DNA 8OhdG (D, G), fragmentation (E H) or CMA3 (F, I) levels respectively. Data is shown as mean values SEM. Statistical analysis was paired Student's T-test.
Figure 15:
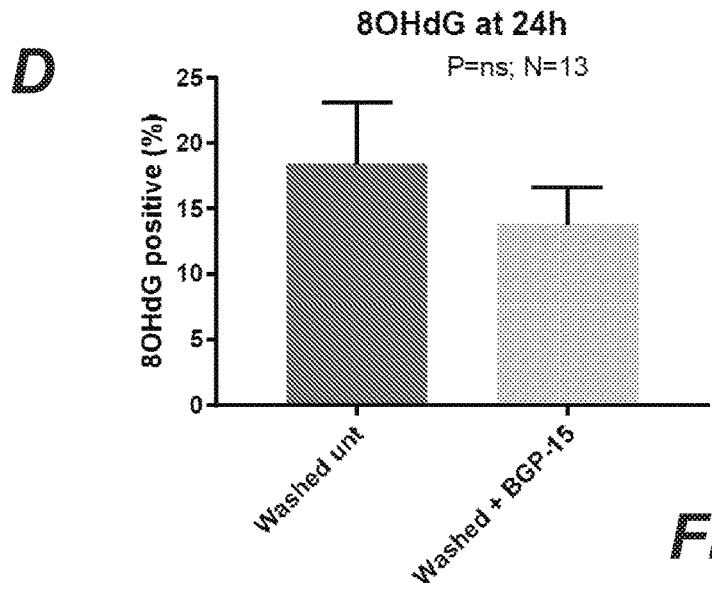
Figure 15:
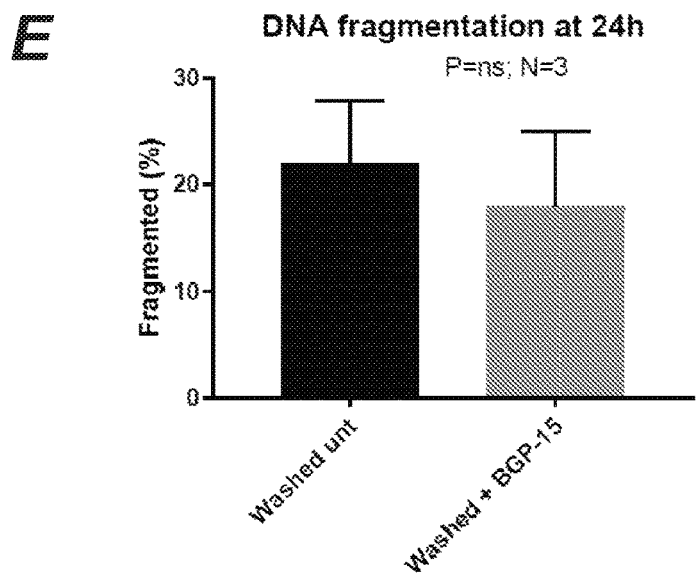
Figure 15:
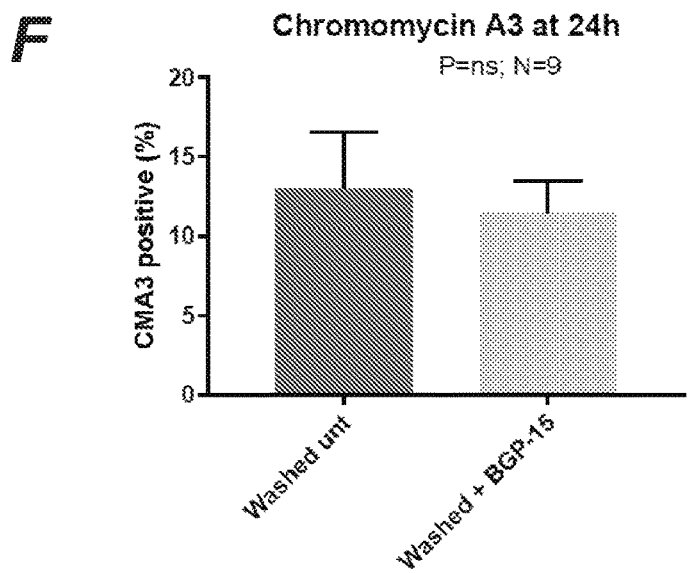
Figure 15:
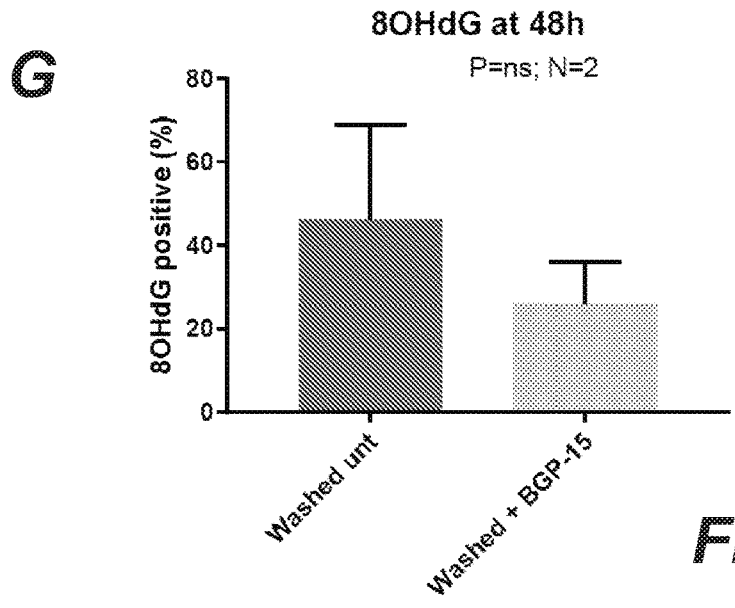
Figure 15:
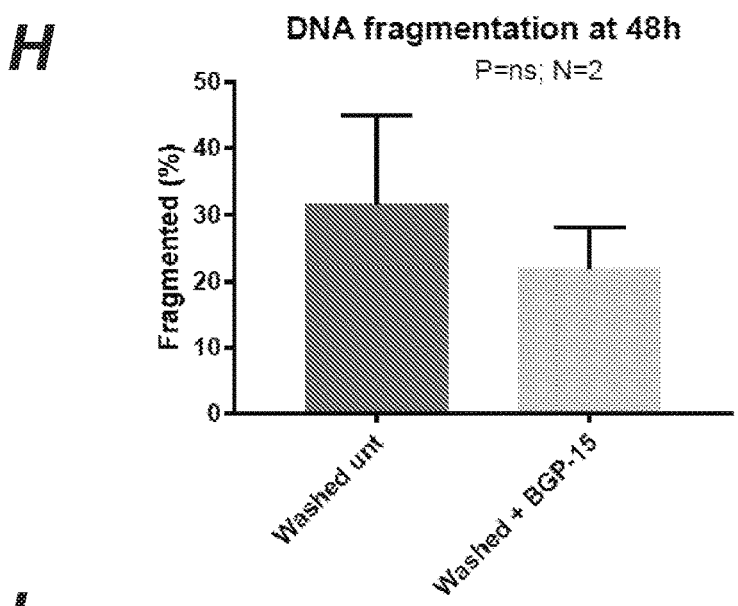
Figure 15:
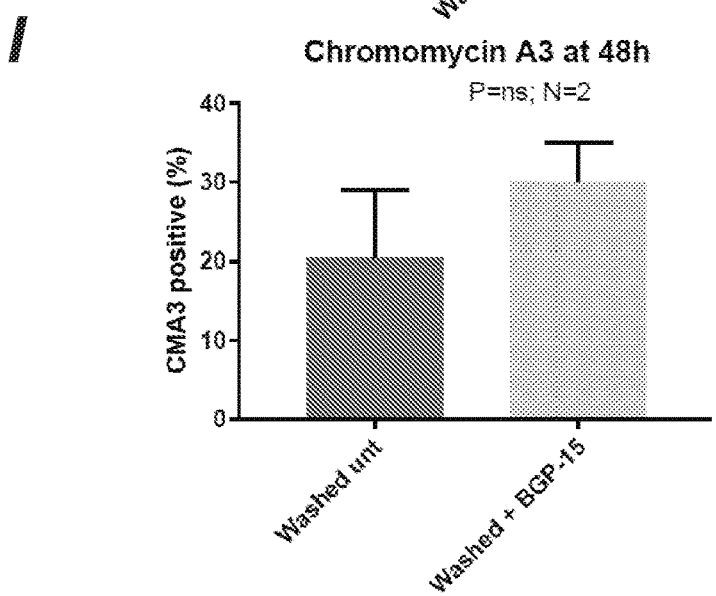

It was also found that BGP-15 prevents DNA damage in human sperm (FIG. 15). This was demonstrated using 3 different assays of DNA damage: 8-OHdg detection, DNA fragmentation (halo) assay and chromomycin A3 staining.

Figure 16:
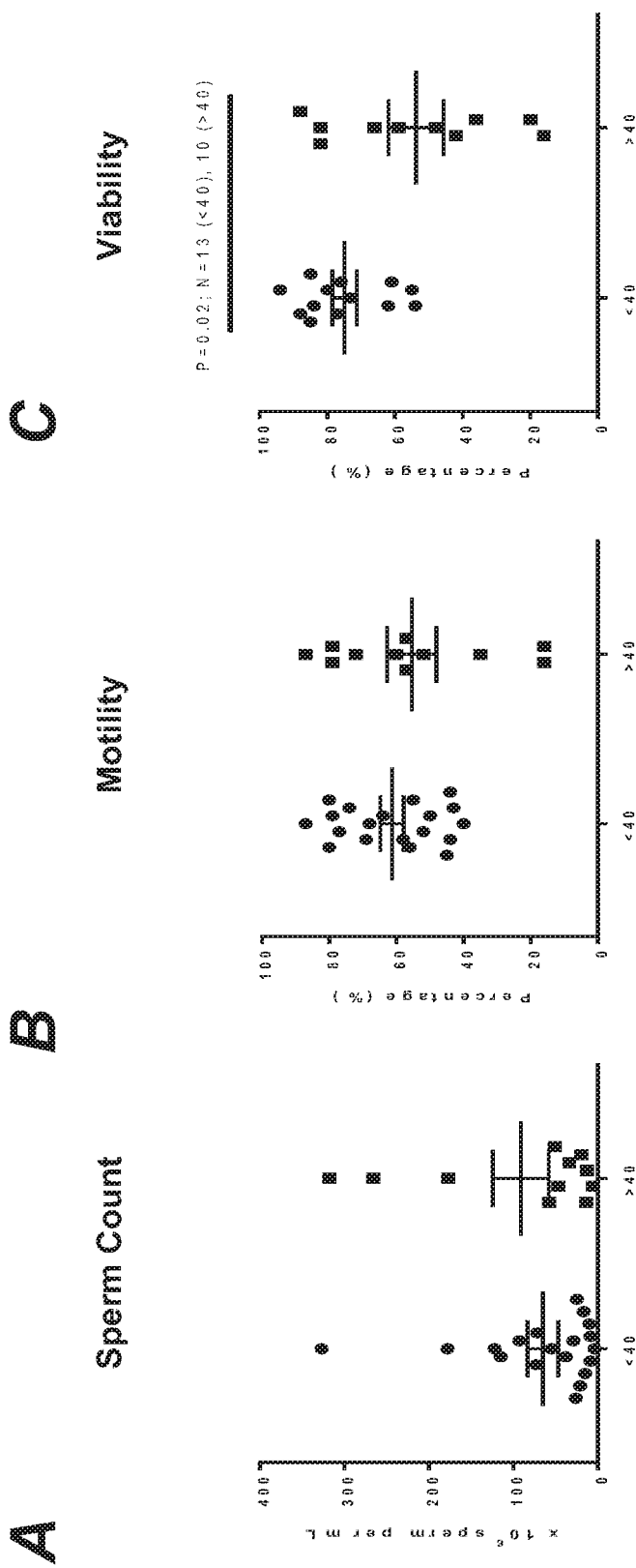
FIG. 16 shows sperm selection by washing reduces sperm vitality in older men. Semen analysis after removal of the seminal plasma in semen samples by washing showed similar sperm count (A) and motility (B) between young (<40 years old) and older (>40 years old) men, but significantly decreased viability (membrane impermeability) in older men (C). Comparison of sperm vitality in neat and washed samples, showed that washing had no effect in younger men (D) but decreased sperm vitality in older men (E). Data is shown as mean values SEM. Statistical analysis was paired Student's T-test.
Figure 16:
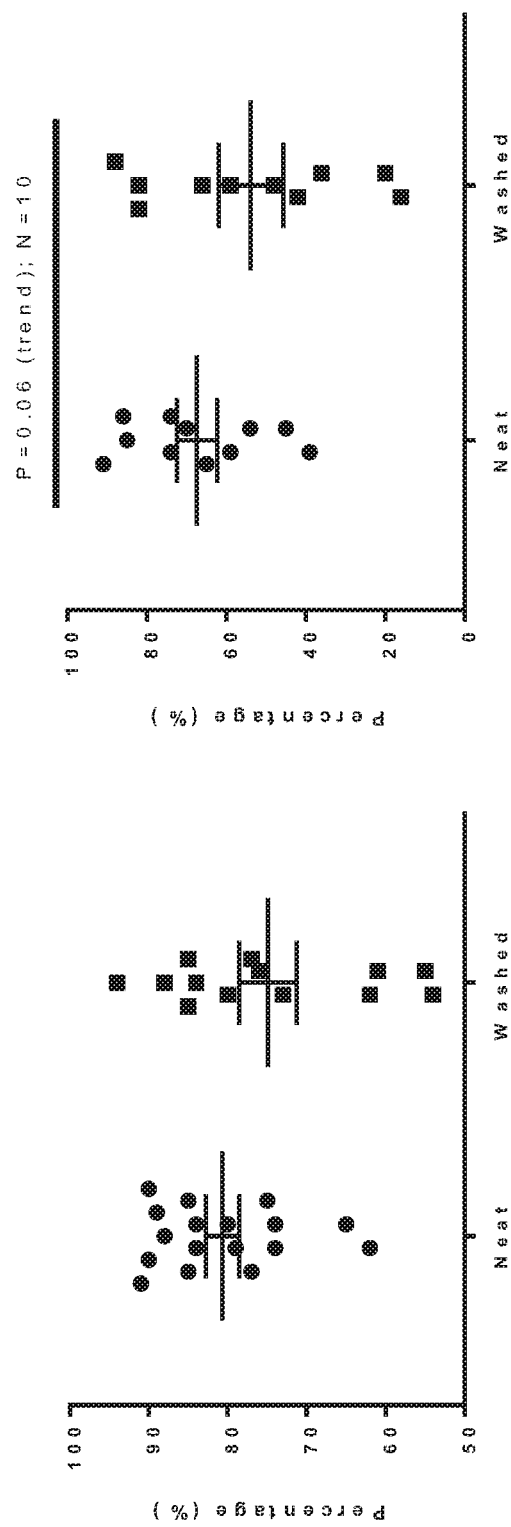
Figure 17:
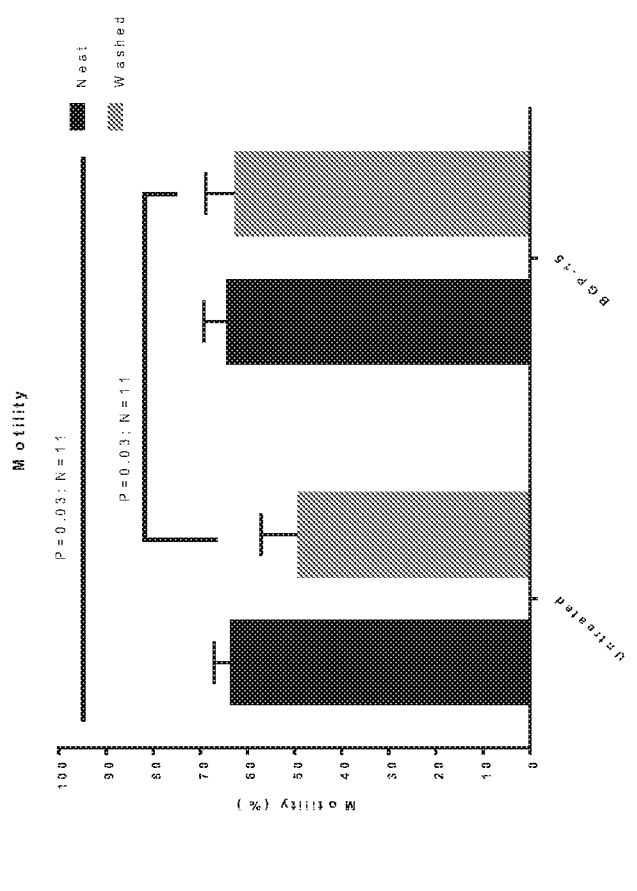
FIG. 17 shows BGP-15 improves sperm motility in older men. (A) While neither washing nor BGP-15 treatment affected sperm motility in younger men (<40 years old); (B) in older men (>40 years old), washing reduced sperm motility, but it was increased with 30 minute treatment with BGP-15. Data is shown as mean values±SEM. Statistical analysis was Two-way ANOVA and post-hoc multiple comparison tests.
Figure 17:
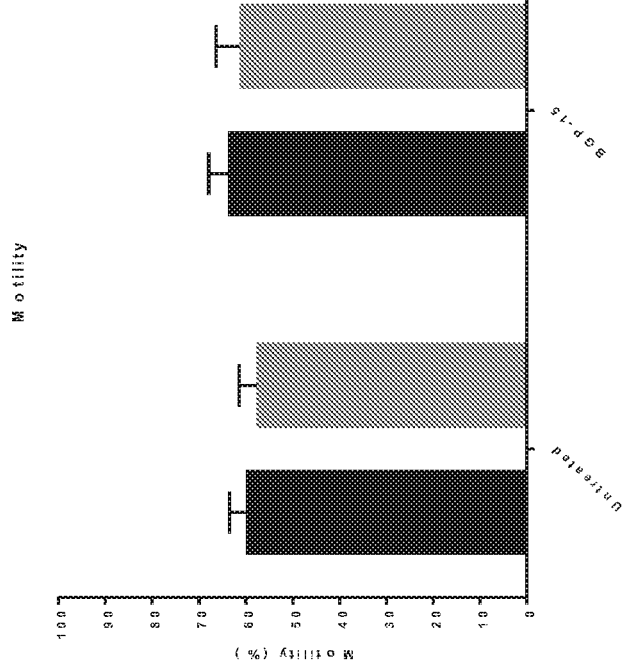
Figure 18:
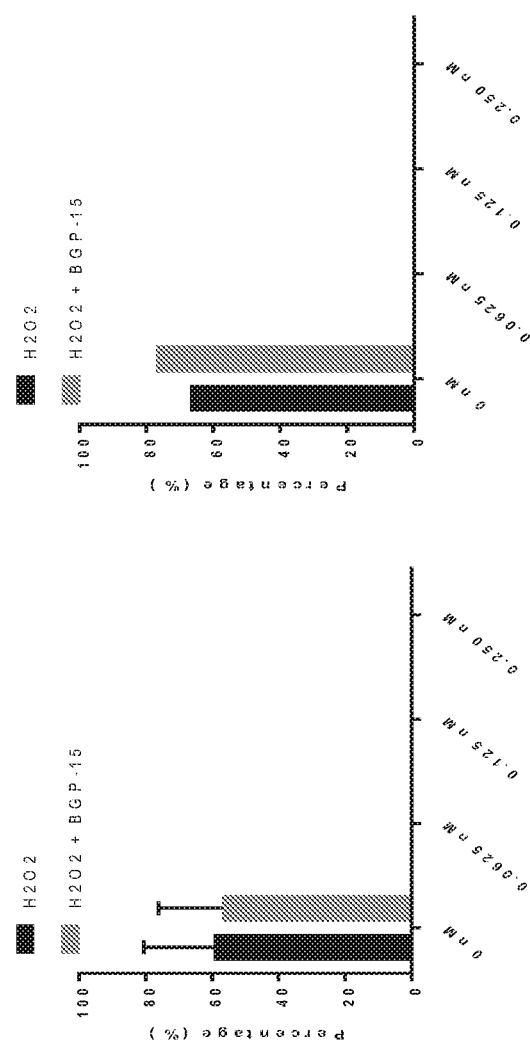
FIG. 18 shows BGP-15 protects sperm from DNA damage caused by oxidative stress. Sperm from young men (<40 years old) was incubated with increasing doses of $H_2O_2$ (0, 0.0625 nM, 0.125 nM and 0.250 nM), and either treated or untreated with BGP-15 (10 uM) for 1 hour. Sperm motility (A) and viability (B) were annulled by the $H_2O_2$ treatment. (C) Quantification of DNA oxidation damage marker 8-Oxo-2'-deoxyguanosine (8OHdG) showed that $H_2O_2$ treatment increased sperm oxidative damage in a dose dependent manner, while the addition of BGP-15 prevented the accumulation of DNA oxidative damage. Data is shown as mean values SEM. Statistical analysis was Two-way ANOVA and post-hoc multiple comparison tests.

FIG. 16 shows that 21.02% reduced sperm viability in washed semen samples from men over 40 years old (FIG. 16C) and that washing affected sperm viability in men over 40 years old (FIG. 16E), reducing it by 11.7%.

Using 'young normal' semen we induced ROS in vitro (using H2O2) and tested if BGP-15 had any protective effect. BGP-15 treatment for 1 h prevented DNA damage against increasing concentrations of $H_2O_2$.

Sperm selection methods that use centrifugation to separate the sperm cells from the seminal plasma, such as washing, affect sperm vitality and motility, while increasing DNA damage.

A 30-minute in vitro treatment with BGP-15 improved motility in washed sperm from older men, while also reducing DNA damage in both neat and washed samples. Additionally, co-incubation with BGP-15 for 1 hour can protect sperm DNA from oxidative damage against oxidative stress in vitro.

Example 11—Sperm Preparation Medium Containing BGP-15

Example 1 provides experimental support for use of BGP-15 in a medium that allows capacitation of sperm.

Typically, because capacitation of sperm is essential for assisted reproduction technologies, sperm are separated from seminal plasma as soon as possible after ejaculation and placed in a medium capable of supporting capacitation.

For human assisted reproductive technologies, methods for preparing and using sperm are described, for example, in Chapter 7 of "A Practical Guide to Basic Laboratory Andrology" 2010 by by Lars Björndahl, David Mortimer, Christopher L. R. Barratt, Jose Antonio Castilla, Roelof Menkveld, Ulrik Kvist, Juan G. Alvarez, Trine B. Haugen; Cambridge University Press.

BGP-15 and/or a derivative thereof as described herein may be added to media for semen collection or preparing human sperm for use in an assisted reproductive technology:

A sperm preparation method utilizing medium containing BGP-15 is described below.

Typically a culture medium utilizing a bicarbonate buffered culture medium containing human serum albumin or a synthetic serum replacement is used. For example, Sperm Preparation Medium (Cat #10690010A) available from Origio may be used and BGP-15 added to a concentration of 10 µM BGP-15.

Procedures for sperm washing and isolation of motile viable spermatozoa may be either by the swim-up method or by a density gradient method (for example SupraSperm® density gradient method (Origio Ref 1091/1092/1097).

This procedure may be used to produce sperm suitable for IVF treatment of women, whether the cause of infertility is male or female.

Composition: BGP-15 (eg 10 µM); Synthetic Serum Replacement (USA: ART Supplement), human serum albumin (HSA); glucose; sodium pyruvate; physiological salts; sodium bicarbonate; HEPES and gentamicin sulphate 10 µg/ml.

Methodology: Equilibrate sperm preparation medium for a minimum of 2 hours in 5-6% $CO_2$ at 37° C. prior to use. Soon after collection, a semen sample is thoroughly mixed at room temperature. After the mixing process is completed, sperm concentration and motility should be assessed (under the microscope). Layer 0.5-1 ml of the liquefied semen in a tube underneath 1-2 ml pre-equilibrated sperm preparation medium. Incubate in a $CO_2$ environment at 37° C. for 30-60 minutes. After swim-up, the upper 0.2-1 ml is aspirated and assessed for sperm concentration and motility. If the sperm count is too low, the next 0.5 ml is included as well. Pool aspirates together. If further concentration of the aspirated sperm medium is needed, add 5 ml of sperm preparation medium to the pooled aspirates, mix and centrifuge at 400 g for 10 minutes. Aspirate the supernatant and re-suspend the remaining pellet in a suitable volume of pre-equilibrated sperm preparation medium.

This composition and method may be particularly suitable for improving the quality of sperm from donors suffering from sub-fertility, suffering from sperm of reduced quality, or aged greater than 40 years.

Kits and/or products utilizing the above reagents and/or instructions for performing the method may be produced.

Example 12—IVF Medium Containing BGP-15

The use of BGP-15 and/or a derivative thereof in a human IVF medium suitable for fertilization of an oocyte is also contemplated.

A human IVF medium, such as the Universal IVF Medium commercially available from Origio (Universal IVF Medium, Cat #1030/1031), and containing BGP-15 (10 µM) may be utilized. Such a medium may be used for fertilization of the oocyte with untreated sperm, and the resultant embryo cultured until the 2-8 cell stage.

Composition: Synthetic Serum Replacement (USA: ART Supplement), human serum albumin (HSA), physiological salts, glucose, sodium pyruvate, sodium bicarbonate and gentamicin sulphate (10 µg/ml); and BGP-15 (eg 10 µM).

Methodology: Equilibrate medium for a minimum of 2 hours in 5-6% $CO_2$ at 37° C. prior to use. Recover oocytes as usual and prepare sperm. Sperm may be prepared utilizing a medium with BGP-15 or without BGP-15, for example as described in Example 11. Fertilize oocytes (Day 0) in preequilibrated IVF Medium containing BGP-15. Where ICSI is required the injection is performed in pre-warmed holding medium containing BGP-15. At 16-20 hours (Day 1), check for formation of pronuclei, then carefully wash and transfer zygotes to fresh 50 µl microdrops or 0.5 ml wells/dishes of Universal IVF Medium covered with Liquid Paraffin. The embryos should be cultured singly or in multiples to a maximum of 4 per well. Embryo transfer at Day 2 or Day 3. The embryos are prepared and transferred to the uterus in 20 to 30 µl of pre-equilibrated transfer medium or fresh Universal IVF Medium. Flush transfer catheter with chosen transfer medium prior to use.

Kits and/or products utilizing the above reagents and/or instructions for performing the method may be produced.

Example 13—Cryopreservation of Sperm

The use of BGP-15 and/or a derivative thereof to assist with freezing of human spermatozoa is also contemplated. The improvements in the spermatozoa as described in the Examples herein by exposure to BGP-15 and/or a derivative thereof are contemplated to produce spermatozoa with improve ability to be cryopreserved.

A human sperm freezing medium, such as commercially available Cryosperm freezing medium (Origio Cryosperm; product #1101), and containing BGP-15 (eg 10 µM) may be utilized. Such a medium may be used for freezing of spermatozoa, to assist with maintaining quality of the sperm.

Composition: Glycerol, raffinose, glucose, sodium pyruvate; sodium lactate, physiological salts; amino acids; sodium bicarbonate; HEPES; gentamicin sulphate (10 μg/ml); BGP-15 (10 μM).

Methodology: A. Freezing. Ensure that both semen sample and freezing medium are at room temperature and dilute semen 1:1 (v/v) with the freezing medium. The medium should be added drop by drop onto the semen and the solution carefully mixed after each addition of medium. The mixture is left at room temperature for a minimum of ten minutes. Load the diluted semen into straws or cryo-tubes and seal according to the manufacturer's recommendations. Suspend straws horizontally for 30 minutes, just above the surface of liquid nitrogen. Cryo-tubes should be attached to a cane and then suspended above the surface of the liquid nitrogen for the same period of time. Transfer the straws or cryo-tubes into liquid nitrogen and store at −196° C. B. Thawing. Warm straws or cryotubes at room temperature for 5 minutes. Open the straws or cryo-tubes and remove the thawed sperm. Immediately prepare sperm by the density gradient or the swim-up procedure.

Kits and/or products utilizing the above reagents and/or instructions for performing the method may be produced.

Example 14—Treatment of Male Subjects with Reduced Fertility

A composition for intravenous administration of BGP-15 and/or a derivative thereof may be prepared by combining a therapeutically effective amount of the agent in a suitable amount of isotonic saline, for administration to a male subject with reduced sperm quality. For example, a dose of 20 mg/kg of BGP-15 may be administered intravenously to a subject once a day for 8 weeks.

Alternatively, for example two 100 mg BGP-15 in capsules may be orally administered twice a day to a male subject with reduced fertility for 8 weeks.

The male subject will be monitored following administration. Effectiveness of the administration may be by assessing parameters such as motility (total and progressive), viability, morphology, mitochondrial activity, DNA integrity and capacity to support embryo developmental competence.

It is anticipated that the above procedure will improve the fertility of the male subject, and also will improve the quality of sperm isolated from the subject for use in assisted reproduction technologies.

Although the present disclosure has been described with reference to particular embodiments, it will be appreciated that the disclosure may be embodied in many other forms. It will also be appreciated that the disclosure described herein is susceptible to variations and modifications other than those specifically described. It is to be understood that the disclosure includes all such variations and modifications. The disclosure also includes all of the steps, features, compositions and compounds referred to, or indicated in this specification, individually or collectively, and any and all combinations of any two or more of the steps or features.

Also, it is to be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Reference to any prior art in this specification is not, and should not be taken as, an acknowledgment or any form of suggestion that this prior art forms part of the common general knowledge in any country.

The subject headings used herein are included only for the ease of reference of the reader and should not be used to limit the subject matter found throughout the disclosure or the claims. The subject headings should not be used in construing the scope of the claims or the claim limitations.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Future patent applications may be filed on the basis of the present application, for example by claiming priority from the present application, by claiming a divisional status and/or by claiming a continuation status. It is to be understood that the following claims are provided by way of example only, and are not intended to limit the scope of what may be claimed in any such future application. Nor should the claims be considered to limit the understanding of (or exclude other understandings of) the present disclosure. Features may be added to or omitted from the example claims at a later date.

What is claimed is:

1. A method of improving sperm quality, the method comprising:
    incubating a population of sperm within a media comprising BGP-15 or a salt thereof in vitro for an effective duration of time at an effective dose, thereby improving one or more indicators of sperm quality selected from sperm motility, viability, DNA integrity, and mitochondrial function, as compared to a population of sperm incubated within a same media in vitro for the same effective duration but without the BGP-15 or salt thereof within the media.

2. The method of claim 1, wherein the effective duration is 6 hours or less.

3. The method of claim 1, wherein the effective duration is 3 hours or less.

4. The method of claim 1, wherein the effective duration is 1 hour.

5. The method of claim 1, wherein the effective dose is 1 to 50 uM.

6. The method of claim 1, wherein the effective dose is 10 uM.

7. The method of claim 1, wherein the effective duration is 3 hours or less and the effective dose is 1 to 50 uM.

8. The method of claim 1, wherein the effective duration is 3 hours or less and the effective dose is 10 uM.

9. The method of claim 1, wherein the effective duration is 1 hour and the effective dose is 1 to 50 uM.

10. The method of claim 1, wherein the effective duration is 1 hour and the effective dose is 10 uM.

11. The method of claim 1, wherein the media comprises human serum albumin, glucose, sodium pyruvate, sodium bicarbonate, and gentamicin sulphate.

12. The method of claim 1, wherein the effective duration is 1 hour, the effective dose is 10 uM, and the media comprises human serum albumin, glucose, sodium pyruvate, sodium bicarbonate, and gentamicin sulphate.

13. The method of claim 1, further comprising isolating the population of sperm by a swim-up method, a density gradient method, centrifugation with buffered media, magnetic-activated cell sorting (MACS), or microfluidic sorting.

* * * * *